(12) United States Patent
Najmabadi et al.

(10) Patent No.: US 12,554,110 B2
(45) Date of Patent: Feb. 17, 2026

(54) SLIDE-SCANNER CONTROL

(71) Applicant: Leica Biosystems Imaging, Inc., Vista, CA (US)

(72) Inventors: Peyman Najmabadi, Vista, CA (US); Nicholas Newberg, Vista, CA (US); Prentash Djelosevic, Vista, CA (US); Aaron Stearrett, Vista, CA (US)

(73) Assignee: Leica Biosystems Imaging, Inc., Vista, CA (US)

( * ) Notice: Subject to any disclaimer, the term of this patent is extended or adjusted under 35 U.S.C. 154(b) by 1048 days.

(21) Appl. No.: 17/631,385

(22) PCT Filed: Aug. 5, 2020

(86) PCT No.: PCT/US2020/045071
§ 371 (c)(1),
(2) Date: Jan. 28, 2022

(87) PCT Pub. No.: WO2021/026276
PCT Pub. Date: Feb. 11, 2021

(65) Prior Publication Data
US 2022/0326494 A1 Oct. 13, 2022

Related U.S. Application Data

(60) Provisional application No. 62/883,340, filed on Aug. 6, 2019.

(51) Int. Cl.
*G02B 21/00* (2006.01)
*G01N 35/00* (2006.01)
(Continued)

(52) U.S. Cl.
CPC ... *G02B 21/0036* (2013.01); *G01N 35/00029* (2013.01); *G01N 35/025* (2013.01);
(Continued)

(58) Field of Classification Search
CPC .. G02B 21/0036; G02B 21/086; G02B 21/34; G02B 21/361; G02B 21/26;
(Continued)

(56) References Cited

U.S. PATENT DOCUMENTS

| | | | | |
|---|---|---|---|---|
| 4,693,373 A | * | 9/1987 | Lamb | B07C 5/3412 414/268 |
| 5,303,214 A | * | 4/1994 | Kulakowski | G11B 17/225 |

(Continued)

FOREIGN PATENT DOCUMENTS

| | | |
|---|---|---|
| JP | 2004-348350 A | 12/2004 |
| WO | WO 2017/053891 A1 | 3/2017 |

(Continued)

OTHER PUBLICATIONS

Aperio GT 450, screenshot of Google image search results, accessed on Jan. 17, 2019.

(Continued)

*Primary Examiner* — Marrit Eyassu
(74) *Attorney, Agent, or Firm* — FBT Gibbons LLP

(57) ABSTRACT

Control processes for a slide-scanning system comprising a carousel with a plurality of rack slots configured to receive slide racks via an exposed portion of the scanning system. In an embodiment, initializing the scanning system comprises automatically homing back-end and front-end components, wherein the front-end components comprise the carousel. An inventory of all slide racks in the carousel is automatically generated. If any slide rack was being processed by any back-end components, the slide rack is automatically unloaded into a corresponding rack slot. In addition, the carousel is automatically positioned to expose a starting subset of the rack slots within the exposed portion. This starting subset may comprise a maximum segment of adjacent empty rack slots.

20 Claims, 34 Drawing Sheets

(51) Int. Cl.
*G01N 35/02* (2006.01)
*G01V 8/20* (2006.01)
*G02B 21/08* (2006.01)
*G02B 21/34* (2006.01)

(52) U.S. Cl.
CPC ............. *G01V 8/20* (2013.01); *G02B 21/086* (2013.01); *G02B 21/34* (2013.01); *G01N 2035/00049* (2013.01); *G01N 2035/00138* (2013.01)

(58) Field of Classification Search
CPC ........... G02B 21/002; G01N 35/00029; G01N 35/025; G01N 2035/00049; G01N 2035/00138; G01N 2035/00089; G01N 21/84; G01V 8/20
USPC ...................................................... 73/864.91
See application file for complete search history.

(56) References Cited

U.S. PATENT DOCUMENTS

| | | | |
|---|---|---|---|
| D852,976 S | 7/2019 | Newberg et al. | |
| D853,579 S | 7/2019 | Newberg et al. | |
| D870,142 S | 12/2019 | Dailey et al. | |
| D891,637 S | 7/2020 | Newberg et al. | |
| 2006/0173575 A1 | 8/2006 | Lefebvre et al. | |
| 2006/0259195 A1* | 11/2006 | Eliuk | B01F 33/8442 700/245 |
| 2017/0176480 A1* | 6/2017 | Moschell | G01N 35/00722 |
| 2019/0101554 A1 | 4/2019 | Newberg et al. | |
| 2019/0162741 A1 | 5/2019 | Newberg et al. | |
| 2019/0170777 A1 | 6/2019 | Newberg et al. | |
| 2020/0011889 A1* | 1/2020 | Toyoda | G06K 7/1417 |
| 2020/0278362 A1* | 9/2020 | Hayut | G01N 35/00029 |

FOREIGN PATENT DOCUMENTS

| | | | | |
|---|---|---|---|---|
| WO | WO 2017/184821 A1 | 10/2017 | | |
| WO | WO 2018/126138 A1 | 7/2018 | | |
| WO | WO-2018190055 A1 * | 10/2018 | ............. | B01L 3/545 |
| WO | WO 2019/036647 A1 | 2/2019 | | |
| WO | WO 2019/068038 A1 | 4/2019 | | |
| WO | WO 2019/068039 A1 | 4/2019 | | |
| WO | WO 2019/068043 A1 | 4/2019 | | |
| WO | WO 2019/071040 A1 | 4/2019 | | |
| WO | WO 2019/071042 A1 | 4/2019 | | |
| WO | WO 2019/071044 A1 | 4/2019 | | |
| WO | WO 2019/071049 A1 | 4/2019 | | |
| WO | WO 2019/104342 A1 | 5/2019 | | |
| WO | WO 2019/108691 A1 | 6/2019 | | |
| WO | WO 2019/108854 A1 | 6/2019 | | |
| WO | WO 2019/109020 A1 | 6/2019 | | |
| WO | WO 2019/109024 A1 | 6/2019 | | |
| WO | WO 2019/109027 A1 | 6/2019 | | |
| WO | WO 2019/109028 A1 | 6/2019 | | |
| WO | WO 2019/109031 A1 | 6/2019 | | |
| WO | WO 2019/109032 A1 | 6/2019 | | |
| WO | WO 2019/109034 A1 | 6/2019 | | |
| WO | WO 2019/169337 A1 | 9/2019 | | |

OTHER PUBLICATIONS

Leica Biosystems: "Leica Aperio GT 450 RUO", uploaded Jul. 30, 2019, retrieved from the internet <https://vimeo.com/350887835>, accessed Sep. 8, 2022.
European Communication dated Oct. 10, 2023, for Application No. 20761005.6, 13 pages.
International Search Report and Written Opinion dated Nov. 10, 2020, for International Application No. PCT/US2020/045071, 14 pages.
Japanese First Office Action dated Apr. 2, 2024, for Application No. 2021-538318, 4 pages.

* cited by examiner

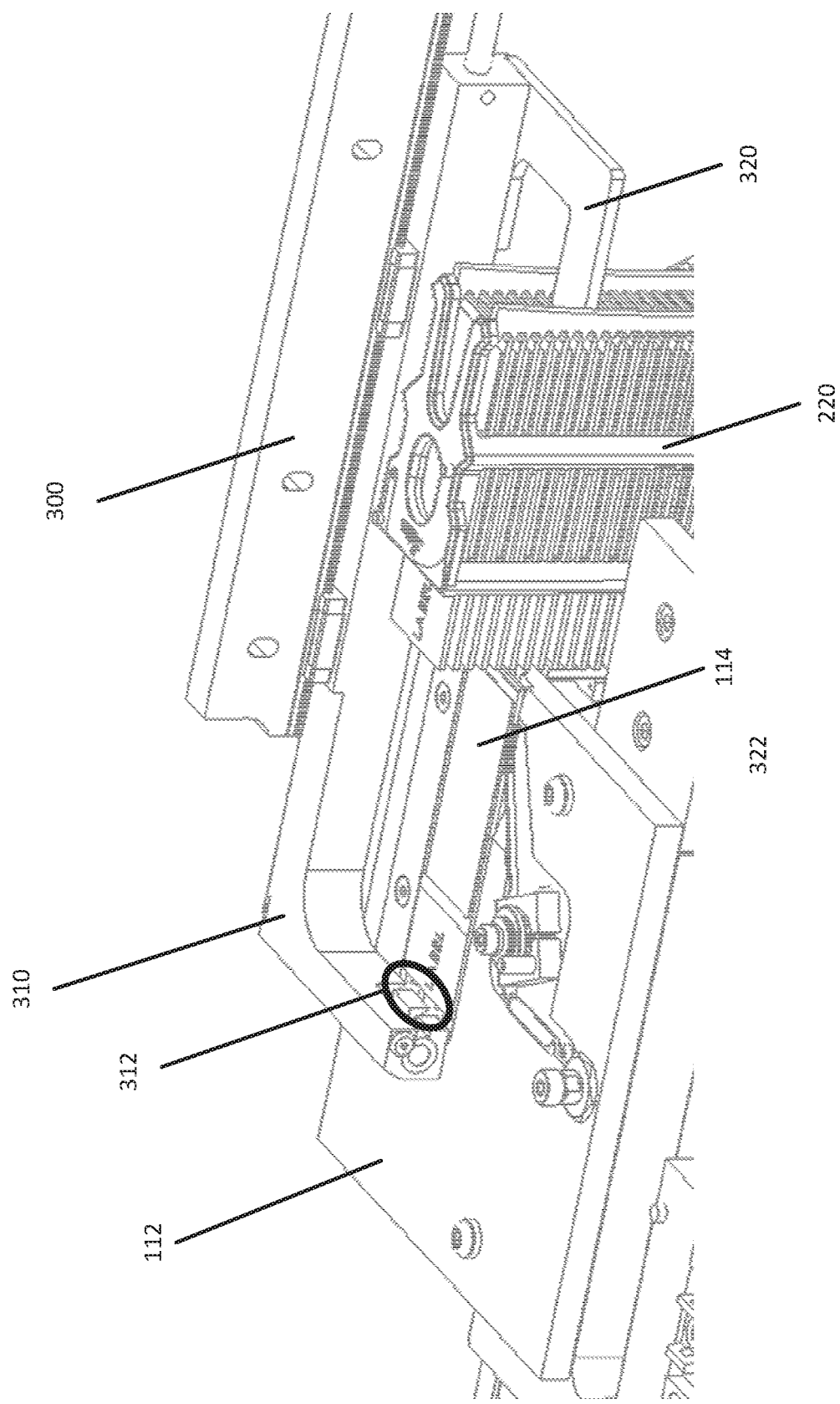

Indexed

Non-Indexed

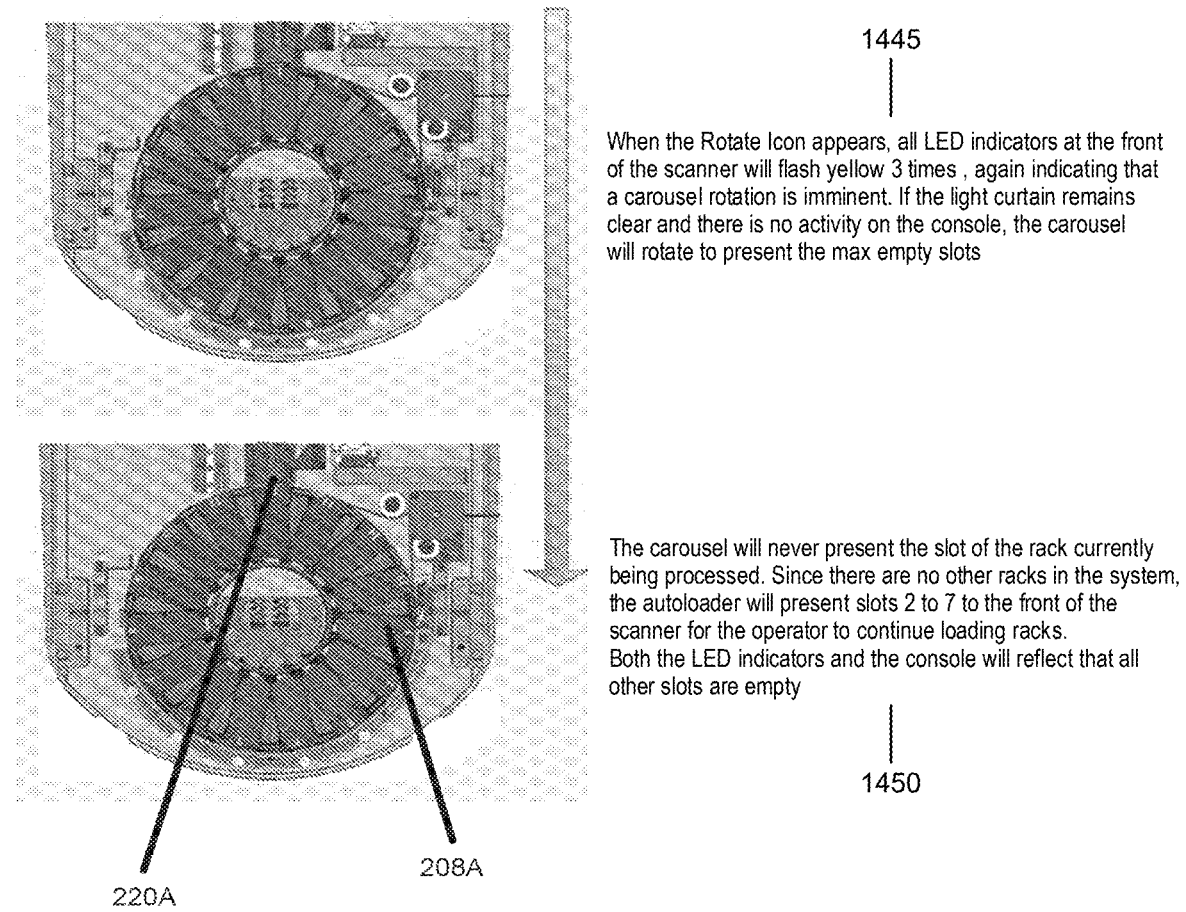

1445

When the Rotate Icon appears, all LED indicators at the front of the scanner will flash yellow 3 times, again indicating that a carousel rotation is imminent. If the light curtain remains clear and there is no activity on the console, the carousel will rotate to present the max empty slots The carousel will never present the slot of the rack currently being processed. Since there are no other racks in the system, the autoloader will present slots 2 to 7 to the front of the scanner for the operator to continue loading racks.
Both the LED indicators and the console will reflect that all other slots are empty

| LED Color | Rack Status: | Status Weight: |
|---|---|---|
| | Unknown | 0 |
| | Present | 100 |
| | Absent | -600 |
| | Active | 1000000 |
| | Pending | 100 |
| | Complete | 0 |
| | Error | -10 |

| | |
|---|---|
| Rack Pos 1 = -600<br>Rack Pos 2 = -600<br>Rack Pos 3 = -600<br>Rack Pos 4 = -600<br>Rack Pos 5 = -600<br>Rack Pos 6 = -600<br>Rack Pos 7 = -600<br>Rack Pos 8 = -600<br>Rack Pos 9 = -600<br>Rack Pos 10 = -600<br>Rack Pos 11 = -600<br>Rack Pos 12 = -600<br>Rack Pos 13 = -600<br>Rack Pos 14 = -600<br>Rack Pos 15 = -600 | After inventory each rack position is assigned a value depending on if a rack is detected. To determine which racks to present to the front after home, the AL presents the smallest sum and the lowest rack position.<br><br>In this instance rack 3 through 6 are presented |

FIG. 16A

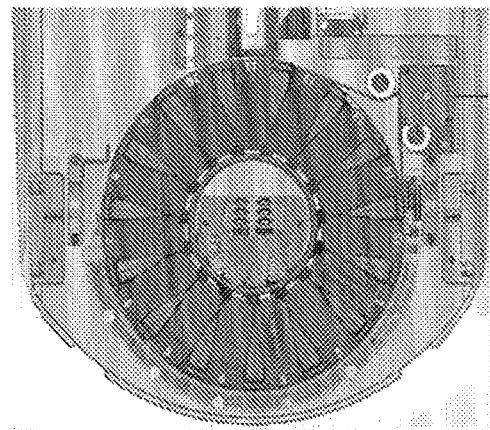

| Rack Pos 1 = 100 | The Autoloader assigns a rack |
| Rack Pos 2 = -600 | status and value when detecting |
| Rack Pos 3 = 100 | racks being inserted or removed |
| Rack Pos 4 = -600 | from the carousel. In this instance, |
| Rack Pos 5 = -600 | both rack 1 and 3 are inserted |
| Rack Pos 6 = -600 | and get assigned a value of 100. |
| Rack Pos 7 = -600 | After the user stops interacting |
| Rack Pos 8 = -600 | with the carousel, all present |
| Rack Pos 9 = -600 | racks are added to the queue. |
| Rack Pos 10 = -600 | If there is currently no active rack, |
| Rack Pos 11 = -600 | the first rack that gets inserted |
| Rack Pos 12 = -600 | is assigned as the active rack. |
| Rack Pos 13 = -600 | In this example rack 1 will have |
| Rack Pos 14 = -600 | been inserted first and become |
| Rack Pos 15 = -600 | the active rack |

FIG. 16B

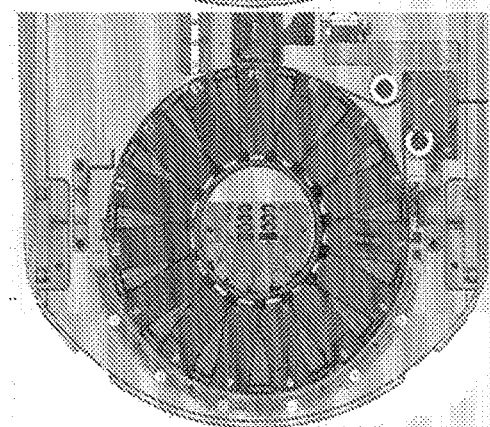

| Rack Pos 1 = 1E6 | After unloading the active rack |
| Rack Pos 2 = -600 | from the carousel to the scan |
| Rack Pos 3 = 100 | engine, the AL attempts to |
| Rack Pos 4 = -600 | determine which rack slots to |
| Rack Pos 5 = -600 | present to the front of the |
| Rack Pos 6 = -600 | scanner. With the new rack |
| Rack Pos 7 = -600 | values it presents the smallest |
| Rack Pos 8 = -600 | sum and the lowest |
| Rack Pos 9 = -600 | rack position. |
| Rack Pos 10 = -600 | In this instance rack 4 through |
| Rack Pos 11 = -600 | 9 are presented |
| Rack Pos 12 = -600 | |
| Rack Pos 13 = -600 | |
| Rack Pos 14 = -600 | |
| Rack Pos 15 = -600 | |

FIG. 16C

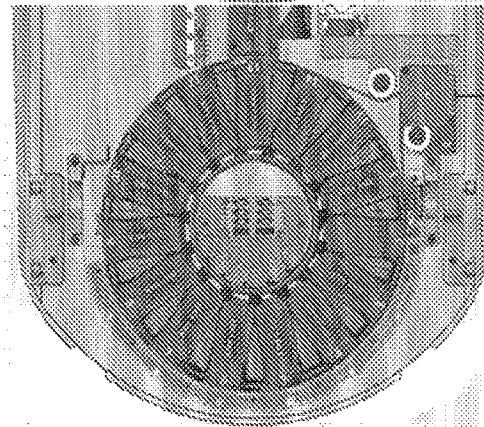

| Rack Pos 1 = 100 | Processed Racks are assigned a |
| Rack Pos 2 = 1E6 | value that is smaller than present |
| Rack Pos 3 = 0 | racks but larger than absent racks. |
| Rack Pos 4 = 100 | This means that if all slots are |
| Rack Pos 5 = 100 | occupied, racks that have |
| Rack Pos 6 = 100 | completed being processed will |
| Rack Pos 7 = 100 | be presented to the front of the |
| Rack Pos 8 = 100 | scanner. |
| Rack Pos 9 = 100 | In this example, the active rack 2 is |
| Rack Pos 10 = 100 | being scanned, rack 3 has been |
| Rack Pos 11 = 100 | processed and all other racks are |
| Rack Pos 12 = 100 | waiting to be processed. |
| Rack Pos 13 = 100 | In this instance rack 3 through |
| Rack Pos 14 = 100 | 8 are presented |
| Rack Pos 15 = 100 | |

FIG. 16D

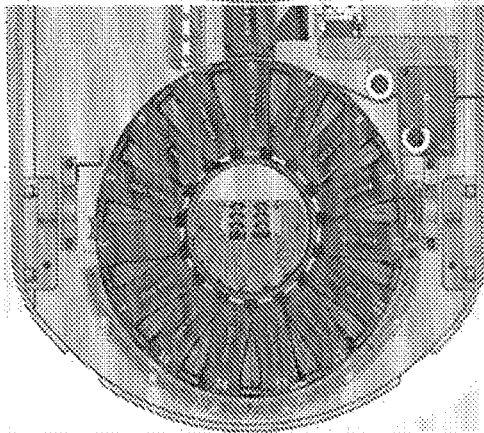

| Rack Pos 1 = 0 | The active rack will never be |
| Rack Pos 2 = 1E6 | presented to the user. In this |
| Rack Pos 3 = 100 | example Rack 1 has been |
| Rack Pos 4 = 100 | processed. Rack 2 is active |
| Rack Pos 5 = 100 | and all other racks are present |
| Rack Pos 6 = 100 | in the queue. The carousel |
| Rack Pos 7 = 100 | rotates in both directions to |
| Rack Pos 8 = 100 | prevent exposing the |
| Rack Pos 9 = 100 | active rack. |
| Rack Pos 10 = 100 | In this instance rack 11 |
| Rack Pos 11 = 100 | through 1 are presented |
| Rack Pos 12 = 100 | |
| Rack Pos 13 = 100 | |
| Rack Pos 14 = 100 | |
| Rack Pos 15 = 100 | |

FIG. 16E

SLIDE-SCANNER CONTROL

CROSS-REFERENCE TO RELATED APPLICATIONS

The present application claims priority to U.S. Provisional Patent App. No. 62/883,340, filed Aug. 6, 2019 which is hereby incorporated herein by reference as if set forth in full.

In addition, the present application is related to the following applications, are all hereby incorporated herein by reference as if set forth in full:

International Patent App. No. PCT/US2016/053581, filed Sep. 23, 2016;
International Patent App. No. PCT/US2017/028532, filed Apr. 20, 2017;
International Patent App. No. PCT/US2018/063456, filed Nov. 30, 2018;
International Patent App. No. PCT/US2018/063460, filed Nov. 30, 2018;
International Patent App. No. PCT/US2018/063450, filed Nov. 30, 2018;
International Patent App. No. PCT/US2018/063461, filed Nov. 30, 2018;
International Patent App. No. PCT/US2018/062659, filed Nov. 27, 2018;
International Patent App. No. PCT/US2018/063464, filed Nov. 30, 2018;
International Patent App. No. PCT/US2018/054460, filed Oct. 4, 2018;
International Patent App. No. PCT/US2018/063465, filed Nov. 30, 2018;
International Patent App. No. PCT/US2018/054462, filed Oct. 4, 2018;
International Patent App. No. PCT/US2018/063469, filed Nov. 30, 2018;
International Patent App. No. PCT/US2018/054464, filed Oct. 4, 2018;
International Patent App. No. PCT/US2018/046944, filed Aug. 17, 2018;
International Patent App. No. PCT/US2018/054470, filed Oct. 4, 2018;
International Patent App. No. PCT/US2018/053632, filed Sep. 28, 2018;
International Patent App. No. PCT/US2018/053629, filed Sep. 28, 2018;
International Patent App. No. PCT/US2018/053637, filed Sep. 28, 2018;
International Patent App. No. PCT/US2018/062905, filed Nov. 28, 2018;
International Patent App. No. PCT/US2018/063163, filed Nov. 29, 2018;
International Patent App. No. PCT/US2017/068963, filed Dec. 29, 2017;
International Patent App. No. PCT/US2019/020411, filed Mar. 1, 2019;
U.S. patent application Ser. No. 29/631,492, filed Dec. 29, 2017;
U.S. patent application Ser. No. 29/631,495, filed Dec. 29, 2017;
U.S. patent application Ser. No. 29/631,499, filed Dec. 29, 2017; and
U.S. patent application Ser. No. 29/631,501, filed Dec. 29, 2017.

BACKGROUND

The embodiments described herein are generally directed to control of a slide scanning system, and, more particularly, to control processes for a workflow of a slide scanning system.

SUMMARY

Systems, methods, and non-transitory computer-readable media are disclosed for control processes that manage a workflow of a slide-scanning system.

In an embodiment, a method is disclosed for control in a scanning system, which comprises a carousel comprising a plurality of rack slots configured to receive slide racks via an exposed portion in which a portion of the carousel is accessible from an external environment of the scanning system, the method comprising using at least one hardware processor to, when the scanning system is started, initialize the scanning system by, automatically: homing back-end components and front-end components of the scanning system, wherein the front-end components comprise the carousel; generating an inventory of all slide racks within the plurality of rack slots of the carousel; if any slide rack was being processed by any back-end components, unloading the slide rack into a corresponding one of the plurality of rack slots of the carousel; and positioning the carousel to expose a starting subset of the plurality of rack slots within the exposed portion.

Each of the plurality of rack slots may be associated with an index representing its order among the plurality of rack slots, wherein the starting subset of the plurality of rack slots consists of a maximum segment of adjacent empty rack slots, arid wherein positioning the carousel comprises, when there are two or more maximum segments of adjacent empty rack slots, selecting one of the two or more maximum segments, as the starting subset, based on the indexes associated with the rack slots within the two or more maximum segments.

Homing front-end components may comprise homing the carousel by: rotating the carousel in a first direction until a limit switch is triggered; rotating the carousel in a second direction, opposite the first direction, to back off the limit switch; rotating the carousel in the first direction to trigger the limit switch; and zeroing at least one position of an encoder that governs positioning of the carousel.

Unloading the slide rack into a corresponding rack slot may comprise unloading a slide from a scanning stage into a corresponding slide slot in the slide rack, prior to unloading the slide rack into the corresponding rack slot.

The method may further comprise using the at least one hardware processor to, after initializing the scanning system and during operation of the scanning system, automatically position the carousel to expose a maximum segment of adjacent empty ones of the plurality of rack slots within the exposed portion of the scanning system.

The method may further comprise using the at least one hardware processor to, while a slide rack is being processed by back-end components of the scanning system, rotate the carousel. Rotating the carousel may comprise automatically positioning the carousel to expose a maximum segment of adjacent empty ones of the plurality of rack slots within the exposed portion of the scanning system. Rotating the carousel may comprise positioning the carousel in response to a user operation. Positioning the carousel in response to a user operation may comprise, in response to a user selection of a slide rack corresponding to one of the plurality of rack slots: if the selected slide rack is being processed by the back-end components of scanning system, interrupting processing of the selected slide rack, and unloading the slide rack into the corresponding rack slot; and positioning the carousel so as to expose the corresponding rack slot within the exposed portion of the scanning system.

The scanning system may comprise a plurality of visual indicators that are each associated with one of the plurality of rack slots positioned within the exposed portion of the scanning system, and the method may further comprise using the at least one hardware processor, for each of the plurality of rack slots positioned within the exposed portion of the scanning system: detect a status of the rack slot or a slide rack within the rack slot; and control the visual indicator associated with the rack slot to indicate the detected status. Each of the plurality of visual indicators may be a light, wherein the at least one processor, for each of the plurality of rack slots positioned within the exposed portion of the scanning system, controls each light to shine in a color associated with the detected status.

Positioning the carousel may comprise rotating the carousel to one of a plurality of indexed positions. The plurality of indexed positions may consist of a number of indexed positions that is equal to a number of the plurality of rack slots.

The method my further comprise using the at least one hardware processor to: detect insertion of a slide rack into one of the plurality of rack slots in the exposed portion of the scanning system; and in response to detecting insertion of the slide rack into the one rack slot, update a status of the one rack slot to reflect that the one rack slot is occupied by the slide rack.

The scanning system may comprise a light curtain around the exposed portion of the scanning system, and the method may further comprise using the at least one hardware processor to: detect interruption of the light curtain; and prevent rotation while the interruption of the light curtain is detected. The method may further comprise using the at least one hardware processor to, when determining to rotating the carousel, automatically: delay rotation of the carousel for a delay period; and, reset the delay period whenever an interruption of the light curtain is detected. The scanning system may comprise a display, and the method may further comprise using the at least one hardware processor to indicate a remaining amount of the delay period within a graphical user interface on the display.

The method may further comprise using the at least one hardware processor to, when rotating the carousel while a slide rack is being processed by the back-end components of the scanning system, rotate the carousel so as to prevent one of the plurality of rack slots corresponding to the slide rack being processed from being exposed within the exposed portion of the scanning system.

The method may further comprise using the at least one hardware processor to: monitor a rotational distance traveled h the carousel; and in response to determining that the rotational distance exceeds a predetermined threshold, execute drift correction for the carousel.

The scanning system may comprise a pinch-point sensor at pinch points between the carousel and a frame around the exposed portion of the scanning system, and wherein the method further comprises using the at least one hardware processor to: detect an obstruction at a pinch point via the pinch-point sensor; and prevent rotation while the obstruction is detected.

The method may further comprise using the at least one hardware processor to: control the back-end components according to a back-end state machine; and control the front-end components according to a front-end state machine that operates independently from the back-end state machine. The back-end state machine may be configured to send commands to the front-end state machine to control one or more front-end components, including the carousel.

In an embodiment, a scanning system is disclosed that comprises: at least one hardware processor; a carousel comprising a plurality of rack slots configured to receive slide racks; an exposed portion in which a portion of the carousel is accessible from an external environment of the scanning system; and one or more software modules that are configured to, when executed by the at least one hardware processor, when the scanning system is started, initialize the scanning system by, automatically, homing back-end components and front-end components of the scanning system, wherein the front-end components comprise the carousel, generating an inventory of all slide racks within the plurality of rack slots of the carousel, if any slide rack was being processed by any back-end components, unloading the slide rack into a corresponding one of the plurality of rack slots of the carousel, and positioning the carousel to expose a starting subset of the plurality of rack slots within the exposed portion.

In an embodiment, a non-transitory computer-readable medium having instructions stored thereon is disclosed, wherein the instructions, when executed by a processor of a scanning system, which comprises a carousel comprising a plurality of rack slots configured to receive slide racks via an exposed portion in which a portion of the carousel is accessible from an external environment of the scanning system, cause the processor to, when the scanning system is started, initialize the scanning system by, automatically: homing back-end components and front-end components of the scanning system, wherein the front-end components comprise the carousel; generating an inventory of all slide racks within the plurality of rack slots of the carousel; if any slide rack was being processed by any back-end components, unloading the slide rack into a corresponding one of the plurality of rack slots of the carousel; and positioning the carousel to expose a starting subset of the plurality of rack slots within the exposed portion.

BRIEF DESCRIPTION OF THE DRAWINGS

The details of the present invention, both as to its structure and operation, may be gleaned in part by study of the accompanying drawings, in which like reference numerals refer to like parts, and in which:

FIGS. 3A and 3B illustrate perspective views of an example push/pull assembly, slide rack, and scanning stage of a scanning system, according to an embodiment;

FIGS. 14A-14C illustrate a process for loading a slide rack, according to an embodiment;

FIGS. 16A-16E illustrate example rack slot values for identifying a segment of adjacent rack slots to be exposed, according to an embodiment;

DETAILED DESCRIPTION

In an embodiment, systems, methods, and non-transitory computer-readable media are disclosed for control processes for managing a workflow of a slide-scanning system. In an embodiment, the disclosed slide-scanning system is a high throughput, whole-slide imaging, scanner, designed for large-scale clinical histology labs. As described herein, the slide-scanning system may interact with various software modules throughout its life cycle, including to complete standard operations, as well as operations for development, manufacturing, and technical support and trouble-shooting.

After reading this description, it will become apparent to one skilled in the art how to implement the invention in various alternative embodiments and alternative applications. However, although various embodiments of the present invention will be described herein, it is understood that these embodiments are presented by way of example and illustration only, and not limitation. As such, this detailed description of various embodiments should not be construed to limit the scope or breadth of the present invention as set forth in the appended claims.

1. Example Scanning System

1.1. Overview

Figure 1A:
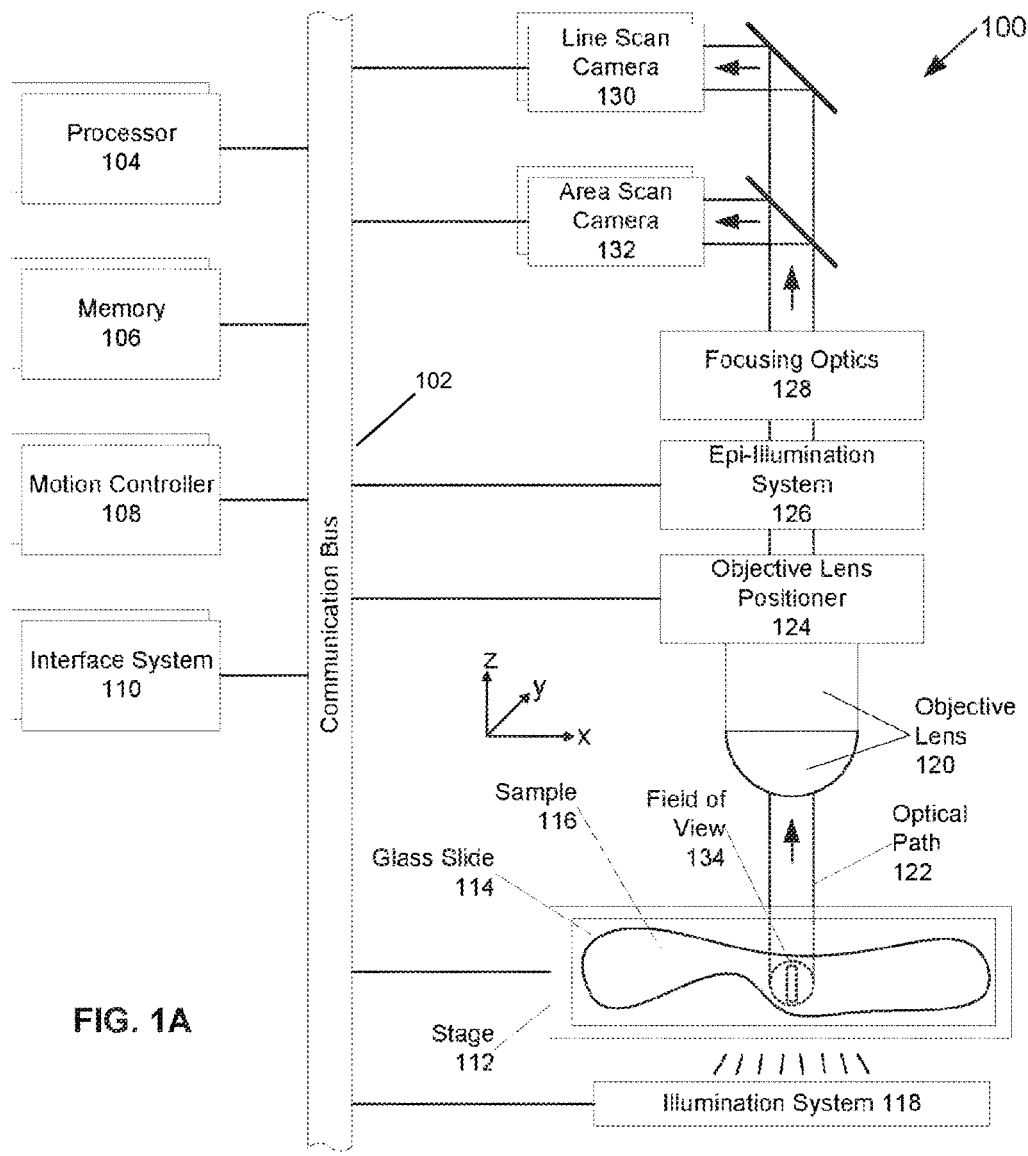
FIG. 1A illustrates an example processor-enabled device that may be used in connection with the various embodiments described herein, according to an embodiment.

FIG. 1A is a block diagram illustrating an example processor-enabled slide-scanning system 100 that may be used in connection with various embodiments described herein. Alternative forms of scanning system 100 may also be used as will be understood by the skilled artisan. In the illustrated embodiment, scanning system 100 is presented as a digital imaging device that comprises one or more processors 104, one or more memories 106, one or more motion controllers 108, one or more interface systems 110, one or more movable stages 112 that each support one or more glass slides 114 with one or more samples 116, one or more illumination systems 118 that illuminate sample 116, one or more objective lenses 120 that each define an optical path 122 that travels along an optical axis, one or more objective lens positioners 124, one or more optional epi-illumination systems 126 (e.g., included in a fluorescence-scanning embodiment), one or more focusing optics 128, one or more line-scan cameras 130, and/or one or more area-scan cameras 132, each of which define a separate field of view 134 on sample 116 and/or glass slide 114. The various elements of scanning system 100 are communicatively coupled via one or more communication busses 102. Although there may be a plurality of each of the various elements of scanning system 100, for simplicity in the description that follows, these elements will be described in the singular, except when needed to be described in the plural to convey the appropriate information.

Processor 104 may include, for example, a central processing unit (CPU) and a separate graphics processing unit (GPU) capable of processing instructions in parallel, or a multicore processor capable of processing instructions in parallel. Additional separate processors may also be provided to control particular components or perform particular functions, such as image processing. For example, additional processors may include an auxiliary processor to manage data input, an auxiliary processor to perform floating-point mathematical operations, a special-purpose processor having an architecture suitable for fast execution of signal-processing algorithms (e.g., digital-signal processor), a slave processor subordinate to the main processor back-end processor), an additional processor for controlling line-scan camera 130, stage 112, objective lens 120, and/or a display (e.g., a console comprising a touch panel display integral to scanning system 100). Such additional processors may be separate discrete processors or may be integrated into a single processor.

Memory 106 provides storage of data and instructions for programs that can be executed by processor 104. Memory 106 may include one or more volatile and/or non-volatile computer-readable storage mediums that store the data and instructions. These mediums may include, for example, random-access memory (RAM), read-only memory (ROM), a hard disk drive, a removable storage drive (e.g., comprising flash memory), and/or the like. Processor 104 is configured to execute instructions that are stored in memory 106, and communicate via communication bus 102 with the various elements of scanning system 100 to carry out the overall function of scanning system 100.

Communication bus 102 may be configured to convey analog electrical signals and/or digital data. Accordingly, communications from processor 104, motion controller 108, and/or interface system 110, via communication bus 102, may include both electrical signals and digital data. Processor 104, motion controller 108, and/or interface system 110 may also be configured to communicate with one or more of the various elements of scanning system 100 via a wireless communication link.

Motion control system 108 is configured to precisely control and coordinate X, Y, and/or Z movement of stage 112 (e.g., within an X-Y plane), X, Y, and/or Z movement of objective lens 120 (e.g., along a Z axis orthogonal to the X-Y plane, via objective lens positioner 124), rotational movement of a carousel described elsewhere herein, lateral movement of a push/pull assembly described elsewhere herein, and/or any other moving component of scanning system 100. For example, in a fluorescence-scanning embodiment comprising epi-illumination system 126, motion control system 108 may be configured to coordinate movement of optical filters and/or the like in epi-illumination system 126.

Interface system 110 allows scanning system 100 to interface with other systems and human operators. For example, interface system 110 may include a console (e.g., a touch panel display) to provide information directly to an operator via a graphical user interface and/or allow direct input from an operator via a touch sensor. Interface system 110 may also be configured to facilitate communication and data transfer between scanning system 100 and one or more external devices that are directly connected to scanning system 100 (e.g., a printer, removable storage medium, etc.), and/or one or more external devices that are indirectly connected to scanning, system 100, for example, via one or more networks (e.g., an image storage system, a Scanner Administration Manager (SAM) server and/or other administrative server, an operator station, a user station, etc.).

Illumination system 118 is configured to illuminate at least a portion of sample 116. Illumination system 118 may include, for example, one or more light sources and illumination optics. The light source(s) could comprise a variable intensity halogen light source with a concave reflective mirror to maximize light output and a KG-1 filter to suppress heat. The light source(s) could comprise any type of arc-lamp, laser, or other source of light. In an embodiment, illumination system 118 illuminates sample 116 in transmission mode, such that line-scan camera 130 and/or area-scan camera 132 sense optical energy that is transmitted through sample 116. Alternatively or additionally, illumination system 118 may be configured to illuminate sample 116 in reflection mode, such that line-scan camera 130 and/or area-scan camera 132 sense optical energy that is reflected from sample 116. Illumination system 118 may be configured to be suitable for interrogation of sample 116 in any known mode of optical microscopy.

In an embodiment, scanning system 100 includes an epi-illumination system 126 to optimize scanning system 100 for fluorescence scanning. It should be understood that, if fluorescence scanning is not supported by scanning system 100, epi-illumination system 126 may be omitted. Fluorescence scanning is the scanning of samples 116 that include fluorescence molecules, which are photon-sensitive molecules that can absorb light at a specific wavelength (i.e., excitation). These photon-sensitive molecules also emit light at a higher wavelength (i.e., emission). Because the efficiency of this photoluminescence phenomenon is very low, the amount of emitted light is often very low. This low amount of emitted light typically frustrates conventional techniques for scanning and digitizing sample 116 (e.g., transmission-mode microscopy).

Advantageously, in an embodiment of scanning system 100 that utilizes fluorescence scanning, use of a line-scan camera 130 that includes multiple linear sensor arrays (e.g., a time-delay-integration (TDI) line-scan camera) increases the sensitivity to light of line-scan camera 130 by exposing the same area of sample 116 to each of the plurality of linear sensor arrays of line-scan camera 130. This is particularly useful when scanning faint fluorescence samples with low levels of emitted light. Accordingly, in a fluorescence-scanning embodiment, line-scan camera 130 is preferably a monochrome TDI line-scan camera. Monochrome images are ideal in fluorescence microscopy because they provide a more accurate representation of the actual signals from the various channels present on sample 116. As will be understood by those skilled in the art, a fluorescence sample can be labeled with multiple florescence dyes that emit light at different wavelengths, which are also referred to as "channels."

Furthermore, because the low-end and high-end signal levels of various fluorescence samples present a wide spectrum of wavelengths for line-scan camera 130 to sense, it is desirable for the low-end and high-end signal levels that line-scan camera 130 can sense to be similarly wide. Accordingly, in a fluorescence-scanning embodiment, line-scan camera 130 may comprise a monochrome 10-bit 64-linear-array TDI line-scan camera. It should be noted that a variety of bit depths for line-scan camera 130 can be employed for use with such an embodiment.

Movable stage 112 is configured for precise X-Y movement under control of processor 104 or motion controller 108. Movable stage 112 may also be configured for Z movement under control of processor 104 or motion controller 108. Movable stage 112 is configured to position sample 116 in a desired location during image data capture by line-scan camera 130 and/or area-scan camera 132. Movable stage 112 is also configured to accelerate sample 116 in a scanning direction to a substantially constant velocity, and then maintain the substantially constant velocity during image data capture by line-scan camera 130. In an embodiment, scanning system 100 may employ a high-precision and tightly coordinated X-Y grid to aid in the location of sample 116 on movable stage 112. In an embodiment, movable stage 112 is a linear-motor-based X-Y stage with high-precision encoders employed on both the X and the Y axes. For example, very precise nanometer encoders can be used on the axis in the scanning direction and on the axis that is in the direction perpendicular to the scanning direction and on the same plane as the scanning direction. Stage 112 is also configured to support glass slide 114 upon which sample 116 is disposed.

Sample 116 can be anything that may be interrogated by optical microscopy. For example, glass microscope slide 114 is frequently used as a viewing substrate for specimens that include tissues and cells, chromosomes, deoxyribonucleic acid (DNA), protein, blood, hone marrow, urine, bacteria, beads, biopsy materials, or any other type of biological material or substance that is either dead or alive, stained or unstained, labeled or unlabeled. Sample 116 may also be an array of any type of DNA or DNA-related material, such as complementary DNA (cDNA) or ribonucleic acid (RNA), or protein that is deposited on any type of slide or other substrate, including any and all samples commonly known as microarrays. Sample 116 may be a microtiter plate (e.g., a 96-well plate). Other examples of sample 116 include integrated circuit boards, electrophoresis records, petri dishes, film, semiconductor materials, forensic materials, and machined parts.

Objective lens 120 is mounted on objective positioner 124, which, in an embodiment, employs a very precise linear motor to move objective lens 120 along the optical axis defined by objective lens 120. For example, the linear motor of objective lens positioner 124 may include a fifty-nanometer encoder. The relative positions of stage 112 and objective lens 120 in X, Y, and/or Z axes are coordinated and controlled in a closed-loop manner using motion controller 108 under the control of processor 104 that employs memory 106 for storing information and instructions, including the computer-executable programmed steps for overall operation of scanning system 100.

In an embodiment, objective lens 120 is a plan apochromatic ("APO") infinity-corrected objective lens which is suitable for transmission-mode illumination microscopy, reflection-mode illumination microscopy, and/or epi-illumination-mode fluorescence microscopy (e.g., an Olympus 40×, 0.75 NA or 20×, 0.75 NA). Advantageously, objective lens 120 is capable of correcting for chromatic and spherical aberrations. Because objective lens 120 is infinity-corrected, focusing optics 128 can be placed in optical path 122 above objective lens 120 where the light beam passing through objective lens 120 becomes a collimated light beam. Focusing optics 128 focus the optical signal captured by objective lens 120 onto the light-responsive elements of line-scan camera 130 and/or area-scan camera 132, and may include optical components such as filters, magnification changer lenses, and/or the like. Objective lens 120, combined with focusing optics 128, provides the total magnification for scanning system 100. In an embodiment, focusing optics 128 may contain a tube lens and an optional 2× magnification changer. Advantageously, the 2× magnification changer allows a native 20× objective lens 120 to scan sample 116 at 40× magnification.

Line-scan camera 130 comprises at least one linear array of picture elements 142 ("pixels"). Line-scan camera 130 may be monochrome or color. Color line-scan cameras typically have at least three linear arrays, while monochrome line-scan cameras may have a single linear array or plural linear arrays. Any type of singular or plural linear array, whether packaged as part of a camera or custom-integrated into an imaging electronic module, can also be used. For example, a three linear array ("red-green-blue" or "RGB") color line-scan camera or a ninety-six linear array monochrome TDI may also be used. TDI line-scan cameras typically provide a substantially better signal-to-noise ratio ("SNR") in the output signal by summing intensity data from previously imaged regions of a specimen, yielding an increase in the SNR that is in proportion to the square-root of the number of integration stages. TDI line-scan cameras comprise multiple linear arrays. For example, TDI line-scan cameras are available with 24, 32, 48, 64, 96, or even more linear arrays. Scanning system 100 also supports linear arrays that are manufactured in a variety of formats including some with 512 pixels, some with 1,024 pixels, and others having as many as 4,096 pixels. Similarly, linear arrays with a variety of pixel sizes can also be used in scanning system 100. The salient requirement for the selection of any type of line-scan camera 130 is that the motion of stage 112 can be synchronized with the line rate of line-scan camera 130, so that stage 112 can be in motion with respect to line-scan camera 130 during the digital image capture of sample 116.

In an embodiment, the image data generated by line-scan camera 130 is stored in a portion of memory 106 and processed by processor 104 to generate a contiguous digital image of at least a portion of sample 116. The contiguous digital image can be further processed by processor 104, and the processed contiguous digital image can also be stored in memory 106.

In an embodiment with two or more line-scan cameras 130, at least one of the line-scan cameras 130 can be configured to function as a focusing sensor that operates in combination with at least one of the other line-scan cameras 130 that is configured to function as an imaging sensor. The focusing sensor can be logically positioned on the same optical axis as the imaging sensor or the focusing sensor may be logically positioned before or after the imaging sensor with respect to the scanning direction of scanning system 100. In such an embodiment with at least one line-scan camera 130 functioning as a focusing sensor, the image data generated by the focusing sensor may be stored in a portion of memory 106 and processed by processor 104 to generate focus information, to allow scanning system 100 to adjust the relative distance between sample 116 and objective lens 120 to maintain focus on sample 116 during scanning. Additionally, in an embodiment, the at least one line-scan camera 130 functioning as a focusing sensor may be oriented such that each of a plurality of individual pixels 142 of the focusing sensor is positioned at a different logical height along the optical path 122.

In operation, the various components of scanning system 100 and the programmed modules stored in memory 106 enable automatic scanning and digitizing of sample 116, which is disposed on glass slide 114. Glass slide 114 is securely placed on movable stage 112 of scanning system 100 for scanning sample 116. Under control of processor 104, movable stage 112 accelerates sample 116 to a substantially constant velocity for sensing by line-scan camera 130, where the speed of stage 112 is synchronized with the line rate of line-scan camera 130. After scanning a stripe of image data, movable stage 112 decelerates and brings sample 116 to a substantially complete stop. Movable stage 112 then moves orthogonal to the scanning direction to position sample 116 for scanning of a subsequent stripe of image data (e.g., an adjacent stripe). Additional stripes are subsequently scanned until an entire portion of sample 116 or the entire sample 116 is scanned.

For example, during digital scanning of sample 116, a contiguous digital image of sample 116 is acquired as a plurality of contiguous fields of view that are combined together to form an image stripe. A plurality of adjacent image stripes are similarly combined together to form a contiguous digital image of a portion or the entire sample 116. The scanning of sample 116 may include acquiring vertical image stripes or horizontal image stripes. The scanning of sample 116 may be either top-to-bottom, bottom-to-top, or both (i.e., bi-directional), and may start at any point on sample 116. Alternatively, the scanning of sample 116 may be either left-to-right, right-to-left, or both (i.e., bi-directional), and may start at any point on sample 116. It is not necessary that image stripes be acquired in an adjacent or contiguous manner. Furthermore, the resulting image of sample 116 may be an image of the entire sample 116 or only a portion of the sample 116.

In an embodiment, computer-executable instructions (e.g., programmed modules and software) are stored in memory 106 and, when executed, enable scanning system 100 to perform the various functions (e.g., display the graphical user interface, execute the disclosed processes, control the components of scanning system 100, etc.) described herein. In this description, the term "computer-readable storage medium" is used to refer to any media used to store and provide computer-executable instructions to scanning system 100 for execution by processor 104. Examples of these media include memory 106 and any removable or external storage medium (not shown) communicatively coupled with scanning system 100 either directly (e.g., via a universal serial bus (USB), a wireless communication protocol, etc.) or indirectly (e.g., via a wired and/or wireless network).

Figure 1B:
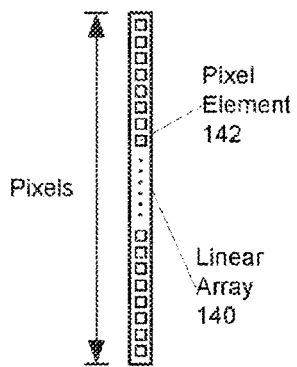
FIG. 1B illustrates an example line-scan camera having a single linear array, according to an embodiment.

FIG. 1B illustrates a line-scan camera 130 having a single linear array 140, which may be implemented as a charge-coupled device ("CCD") array. Single linear array 140 comprises a plurality of individual pixels 142. In the illustrated embodiment, the single linear array 140 has 4,096 pixels 142. In alternative embodiments, linear array 140 may have more or fewer pixels. For example, common formats of linear arrays include 512, 1,024, and 4,096 pixels. Pixels 142 are arranged in a linear fashion to define a field of view 134 for linear array 140. The size of field of view 134 varies in accordance with the magnification of scanning system 100.

Figure 1C:
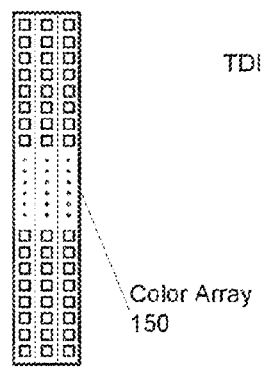
FIG. 1C illustrates an example line-scan camera having three linear arrays, according to an embodiment.

FIG. 1C illustrates a line-scan camera 130 having three linear arrays 140, each of which may be implemented as a CCD array. The three linear arrays 140 combine to form a color array 150. In an embodiment, each individual linear array in color array 150 detects a different color intensity, including, for example, red, green, or blue. The color image data from each individual linear array 140 in color array 150 is combined to form a single field of view 134 of color image data.

Figure 1D:
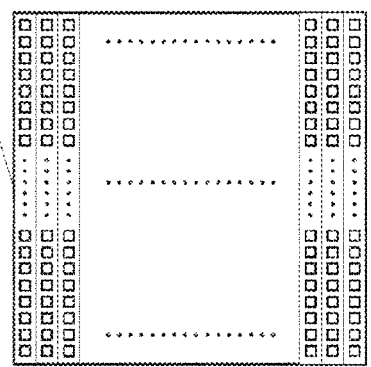
FIG. 1D illustrates an example line-scan camera having a plurality of linear arrays, according to an embodiment.

FIG. 1D illustrates a line-scan camera 130 having a plurality of linear arrays 140, each of which may be implemented as a CCD array. The plurality of linear arrays 140 combine to form a TDI array 160. Advantageously, a TDI line-scan camera may provide a substantially better SNR in its output signal by summing intensity data from previously imaged regions of a specimen, yielding an increase in the SNR that is in proportion to the square-root of the number of linear arrays 140 (also referred to as integration stages). A TDI line-scan camera may comprise a larger variety of numbers of linear arrays 140. For example, common formats of TDI line-scan cameras include 24, 32, 48, 64, 96, 120, and even more linear arrays 140.

1.2. Carousel for Slide Racks

In an embodiment, scanning system 100 comprises a carousel configured to hold a plurality of slide racks and rotate the slide racks from an exposed portion of scanning system 100 to an interior portion of scanning system 100. Each slide rack is configured to hold a plurality of glass slides 114. The carousel may be configured to hold slide racks of different sizes, including slide racks which hold different numbers of glass slides 114 and/or different sizes of glass slides 114 (e.g., 25 mm×75 mm or "1×3" slides, and 50 mm×75 mm or "2×3" slides).

Figure 2A:
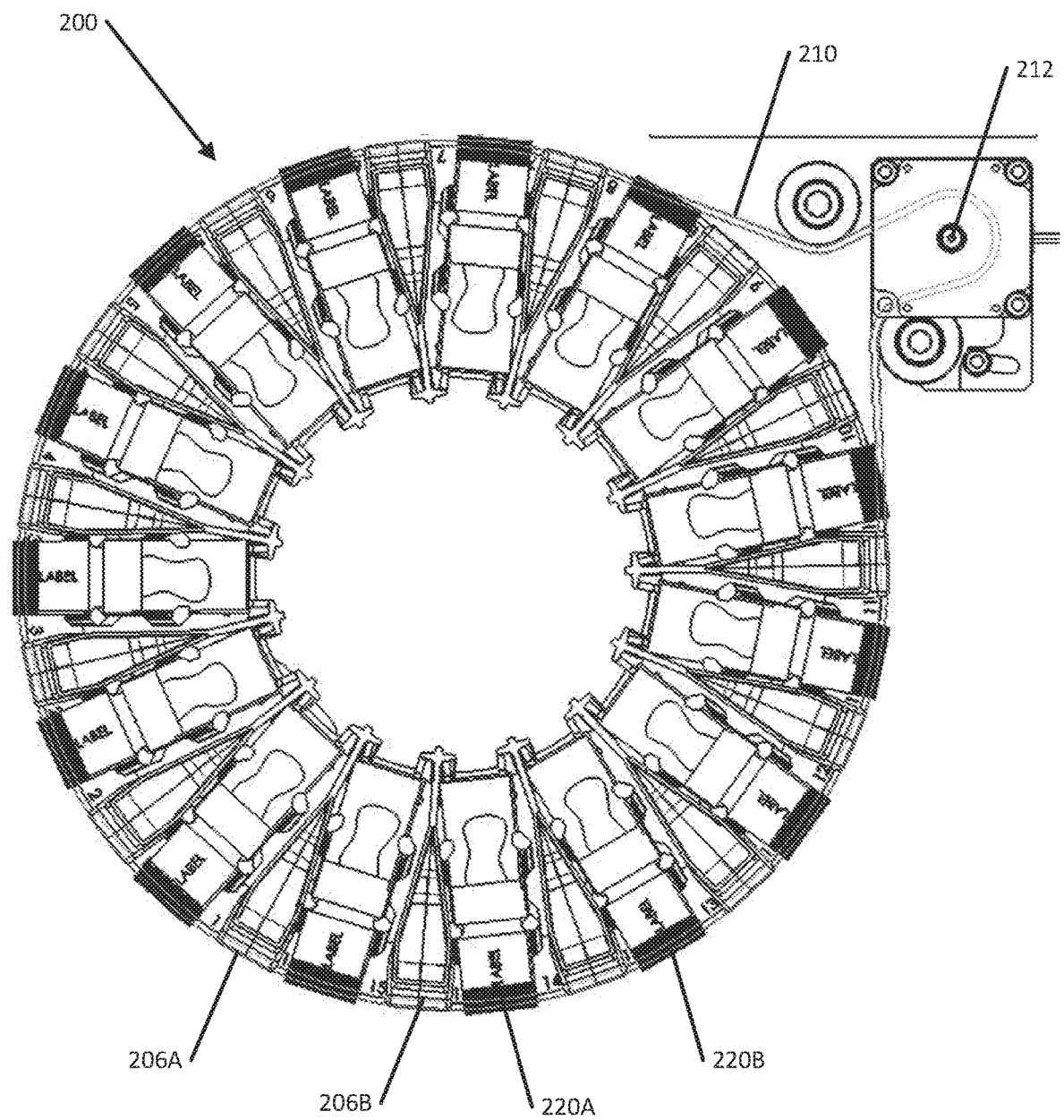
FIGS. 2A and 2B illustrate a top view and perspective view, respectively, of an example carousel, according to an embodiment.
Figure 2B:
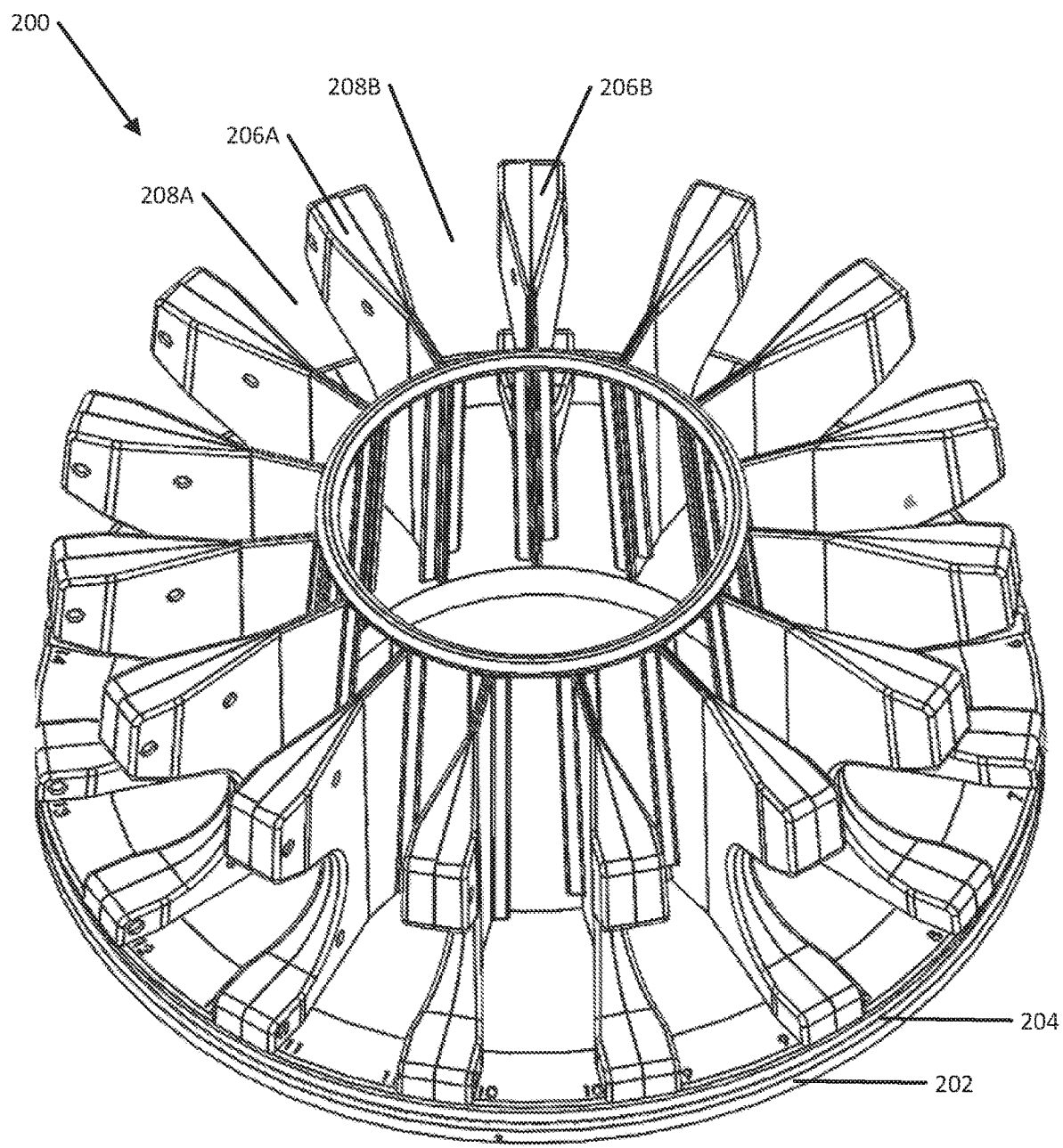

FIGS. 2A and 2B illustrate a top view and perspective view, respectively, of an example carousel 200, according to an embodiment. As illustrated, carousel 200 may be engaged with a carousel belt 210, which rotates carousel 200 around a fixed point. In an embodiment, carousel belt 210 may be positioned in a belt recess 204 around the circumference of base 202 of carousel 200, such that carousel belt 210 extends around the circumference of base 202. In addition, carousel belt 210 may extend around at least one rotor 212 that is rotated by a carousel motor (not shown). The carousel motor may be controlled by a motion controller 108 (e.g., under the control of a processor 104) that spins the carousel motor in each of two directions (e.g., clockwise and counterclockwise), to rotate rotor 212, which in turn rotates carousel belt 210, which thereby rotates carousel 200 in the chosen direction. In an alternative embodiment, carousel 200 may have a drive system that employs a belt or another mechanism, such as direct gearing or direct drive. Advantageously, the drive system may be paired with a variety of types of bearing systems to implement movement of carousel 200.

In an embodiment, carousel 200 comprises a plurality of rack spacers 206 extending upward from the top surface of base 202. Each pair of adjacent rack spacers 206 form a rack slot 208. Each rack slot 208 is configured to hold a slide rack 220, and may be configured to hold each of a plurality of different sizes and/or types of slide racks 220 (e.g., manufactured by different manufacturers). For example, slide racks 220 may be of different heights and/or widths, and each rack slot 208 may be sized to hold slide racks 220 having all of these different heights and/or widths. In addition, each rack slot 208 may be associated or associable with a detector (e.g., an optical sensor) that is positioned to determine whether or not the rack slot 208 is occupied by a slide rack 220. In an embodiment, when carousel 200 is in an indexed position, each rack slot 208 in the exposed portion of carousel 200 is aligned with at least one such detector, so as to detect the insertion or removal of any slide rack 220 from each exposed rack slot 208. Based on an output of the detector, while a rack slot 208 is in an exposed portion of carousel 200, a processor 104 of scanning system 100 may, for that rack slot 208, determine whether or not the rack slot 208 is occupied by a slide rack 220.

Figure 2C:
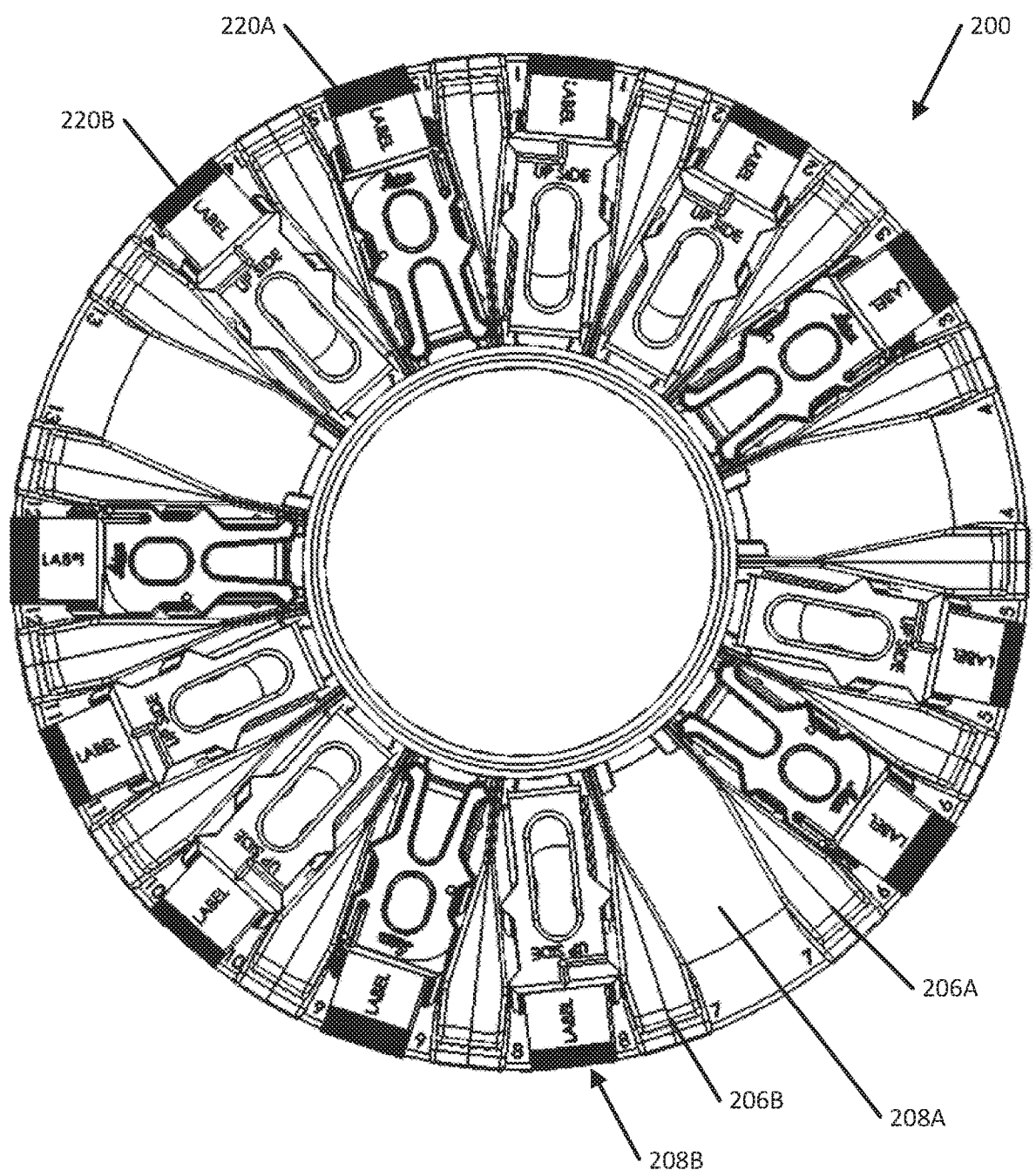
FIGS. 2C and 2D illustrate a top view and perspective view, respectively, of an example carousel, loaded with a plurality of slide racks, according to an embodiment.
Figure 2D:
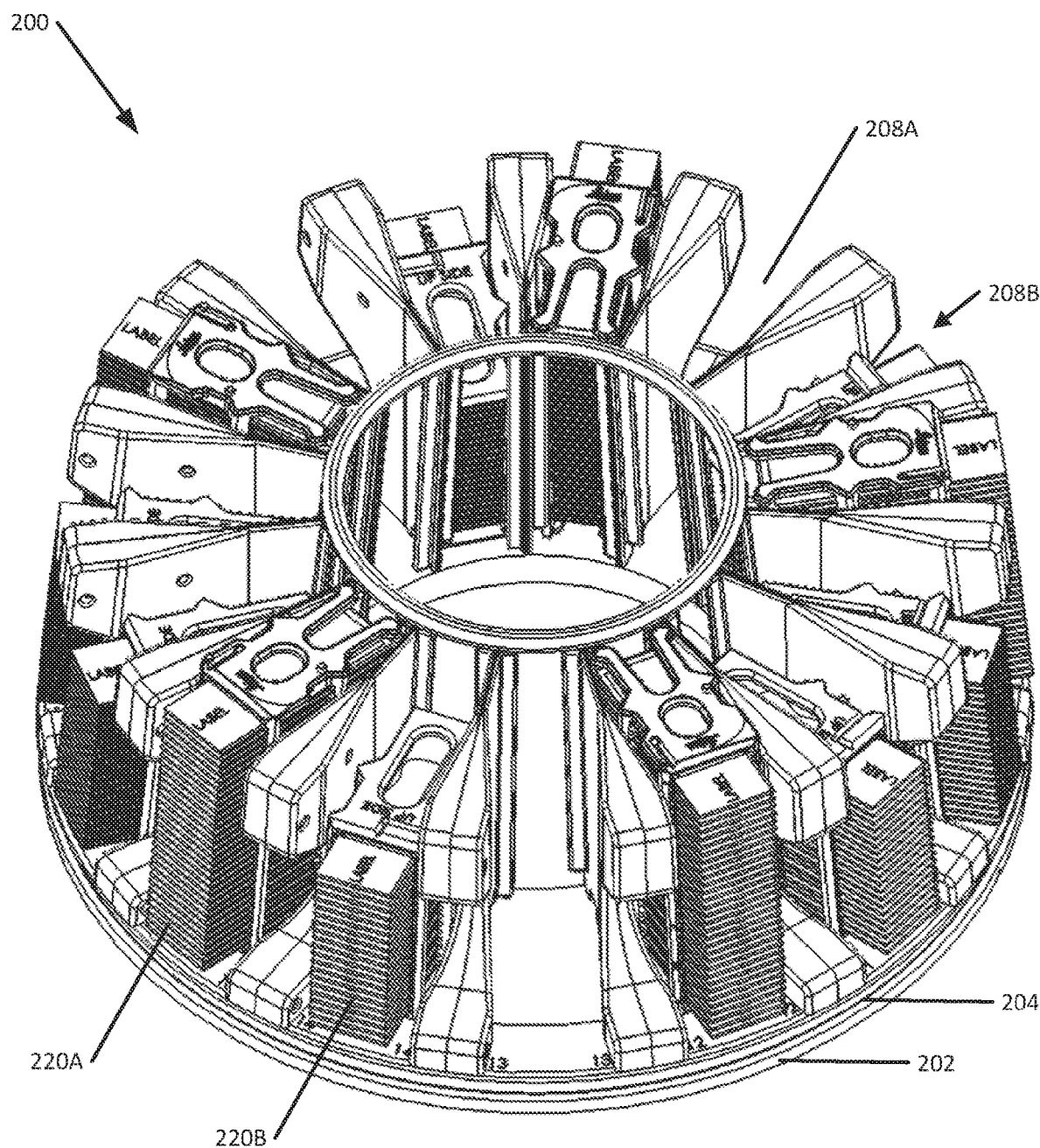

FIGS. 2C and 2D illustrate a top view and perspective view, respectively, of an example carousel 200, loaded with a plurality of slide racks 220, according to an embodiment. As shown, rack slot 208A is not occupied by any slide rack 220, whereas rack slot 208B is occupied by a slide rack 220. Thus, processor 104, via a detector aligned within each rack slot 208, would determine that rack slot 208A is not occupied by a slide rack 220, and would determine that rack slot 208B is occupied by a slide rack 220. In addition, as shown, slide racks 220 can be of different sizes. For example, slide rack 220A is taller than slide rack 220B and holds more glass slides 114.

Figure 2E:
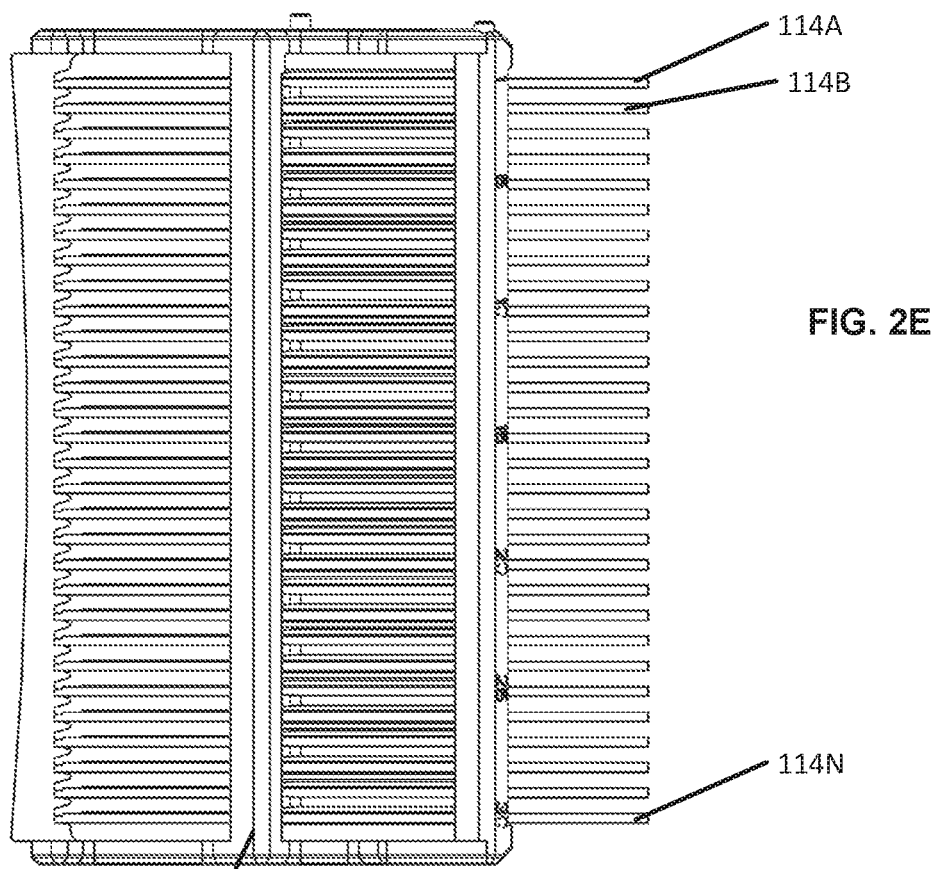
FIGS. 2E and 2F illustrate a side view of an example slide rack and a perspective view of an example slide rack, respectively, according to an embodiment.
Figure 2F:
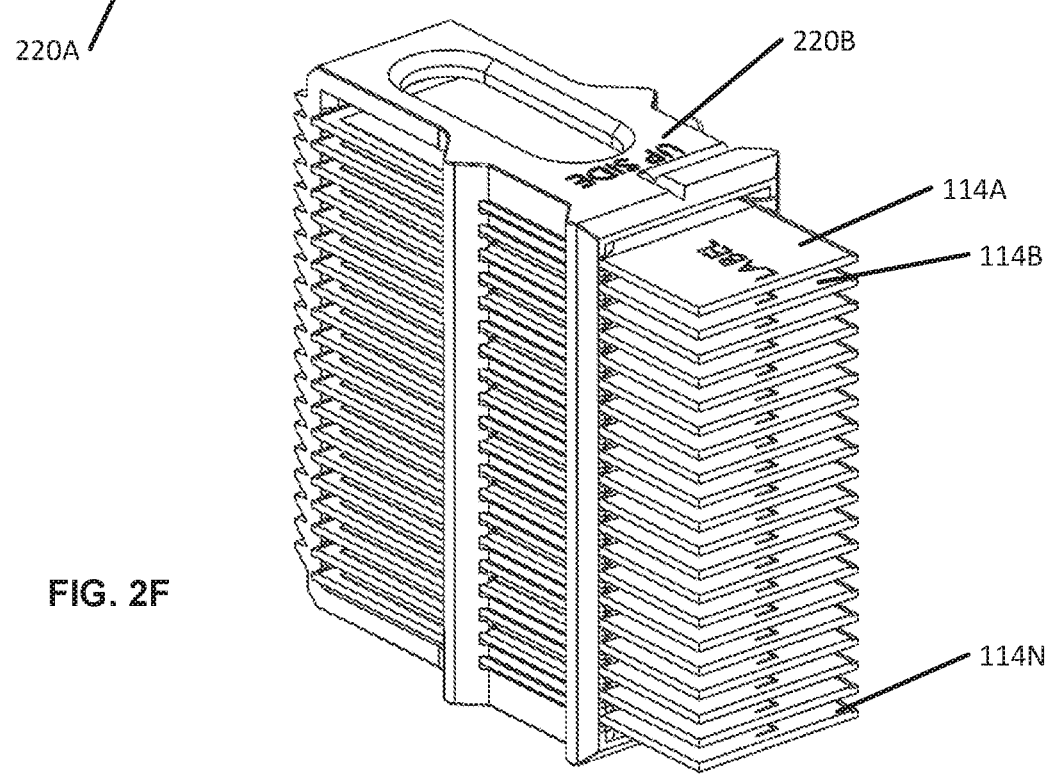

FIGS. 2E and 2F illustrate a side view of example slide rack 220A and a perspective view of example slide rack 220B, respectively, according to an embodiment. Slide rack 220A is taller and holds thirty glass slides 114, whereas slide rack 220B is shorter and holds twenty glass slides 114. Slide racks 220A and 220B may be manufactured by different manufacturers. However, each rack slot 208 is configured to receive both of slide racks 220A and 220B.

As mentioned above, in an embodiment, a portion of carousel 200 is exposed or exposable to an exterior of scanning system 100. In other words, a certain number of adjacent rack slots 208 may be always be in an exposed position. For example, in a carousel of fifteen rack slots 208, six of the rack slots 208 may be exposed, while the remaining nine rack slots 208 are unexposed within an interior of scanning system 100. It should be understood that carousel 200 may rotate to change which subset of adjacent rack slots 208 are exposed and which subset of adjacent rack slots 208 are not exposed, at any given time.

In an embodiment, in order to facilitate loading, a processor 104 of scanning system 100 automatically controls carousel 200 to maximize the number of empty rack slots 208 that are exposed. For example, processor 104 may determine which rack slots 208 are occupied by slide racks 220, via a detector in each rack slot 208 or detectors aligned with the exposed rack slots 208. Processor 104 may then identify the maximum contiguous segment of empty rack slots 208, and rotate carousel 200 to position as many empty rack slots 208, in that maximum contiguous segment, as possible, within an exposed portion of scanning system 100.

1.3 Push-Pull Assembly

Figure 3B:
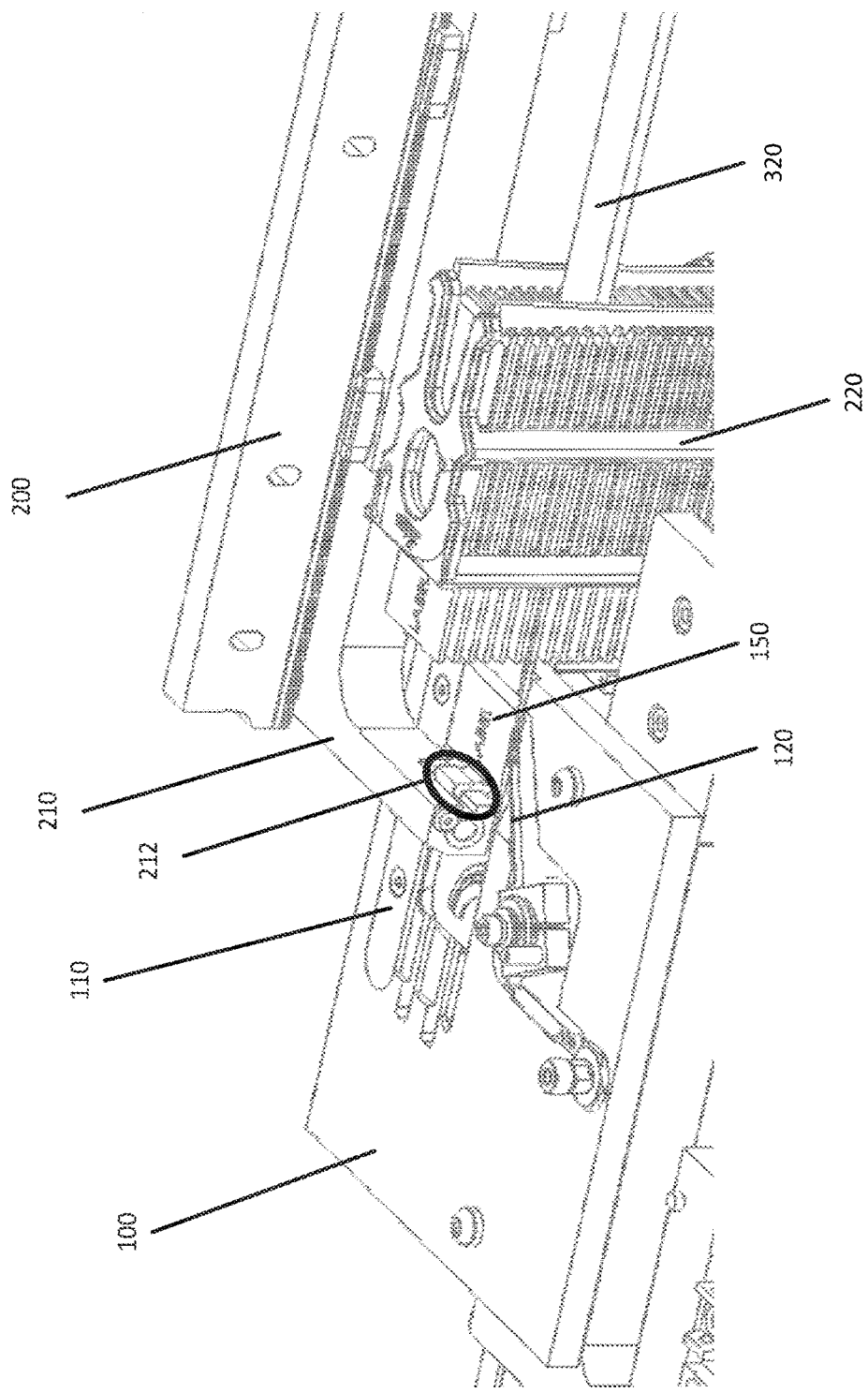

In an embodiment, scanning system 100 comprises a push/pull assembly configured to load each glass slide 114 from a slide rack 220 onto stage 112, and unload each glass slide 114 from stage 112 back into slide rack 220. FIGS. 3A and 3B illustrate perspective views of an example push/pull assembly 300, slide rack 220, and scanning stage 112 of scanning system 100, according to an embodiment. In the illustrated embodiment, push/pull assembly 300 is shown as comprising a push bar 320 that is extendable into slide rack 220. The illustrated push/pull assembly 300 also comprises a pull bar 310 with an open end comprising one or more pull fingers 312. Pull finger(s) 312 are configured to move within corresponding pull finger groove(s) in stage 112.

In an embodiment, push bar 320 and pull fingers 312 work in combination to push a glass slide 114, to be scanned, out from slide rack 220 and into a slide recess in stage 112. After glass slide 114 is scanned, push bar 320 and pull fingers 312 again work in combination to push glass slide 114 off of stage 112 and into an empty slot in slide rack 220 that is aligned with and in the same plane as the slide recess in stage 112. FIG. 3A illustrates push/pull assembly 300 when a glass slide 114 is entirely supported on stage 112, whereas FIG. 3B illustrates push/pull assembly 300 when glass slide 114 is partially supported on stage 110 and partially within a slot of slide rack 220 (e.g., during loading or unloading of glass slide 114).

1.4. Example Vision Processing Unit

In an embodiment, scanning system 100 is designed with the objective of maximizing throughput and image quality, while minimizing the time that operators need to spend interacting with scanning system 100. To achieve this objective, the software for controlling the normal operations of scanning system 100 may be split into two categories: control software and external-interface software.

In an embodiment, the control software is comprised within a vision processing unit (VPU), which directly interacts with the hardware of scanning system 100. The control software is responsible for all control of scanning system 100, including functions required for image acquisition, slide handling, and image generation.

Figure 4:
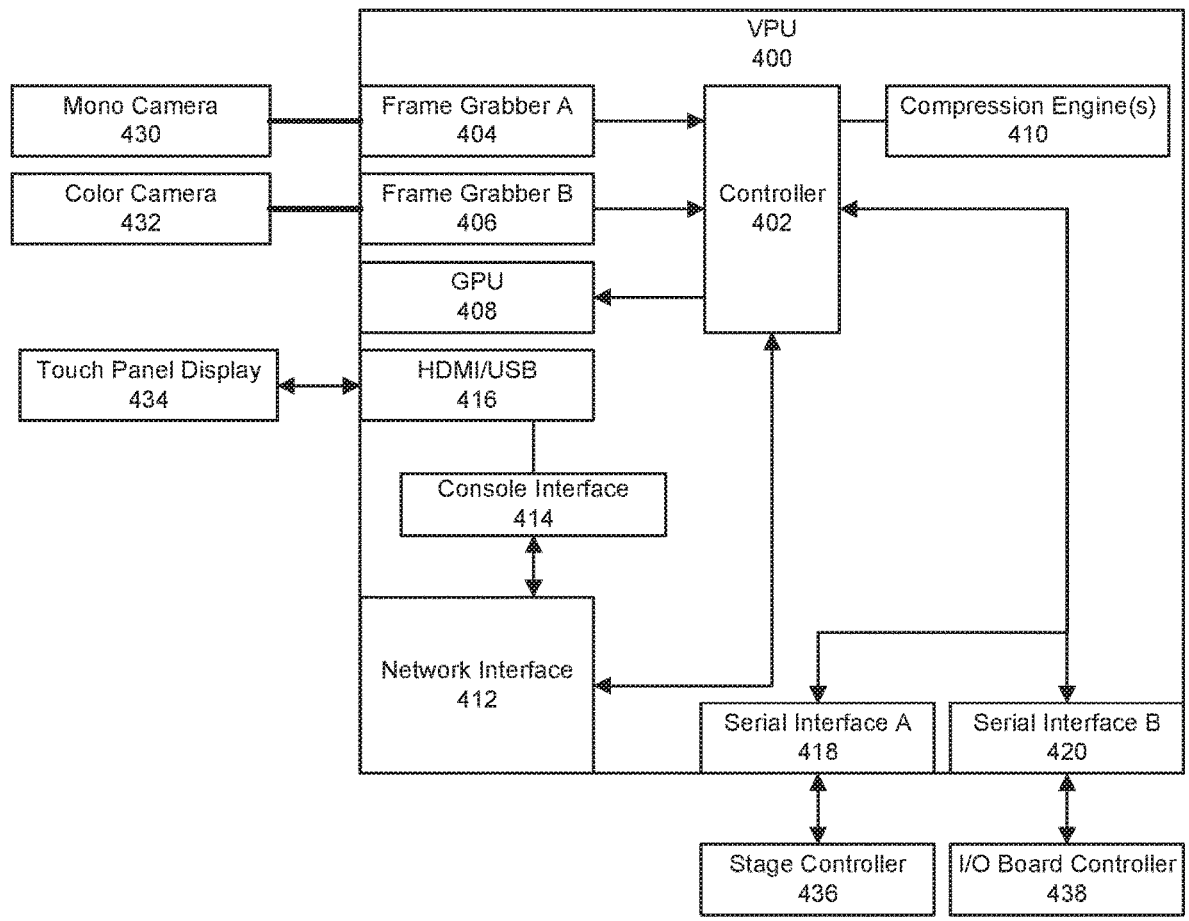
FIG. 4 illustrates an example vision processing unit (VPU) for controlling a scanning system, according to an embodiment.

FIG. 4 illustrates an example VPU 400, according to an embodiment. VPU 400 comprises a controller 402, a first frame grabber 404, a second frame grabber 406, a graphics processing unit (GPU) 408, one or more compression engines 410, a network interface 412, a console interface 414 (e.g., a web interface), a high-definition multimedia interface (HDMI) and/or Universal Serial Bus (USB) 416 that may connect to a touch panel display 434 of scanning system 100, a first serial interface 418, and/or a second serial interface 420. As illustrative, non-limiting examples, first frame grabber 404 may be a Teledyne Dalsa™ Xtium-CL PX4 that is connected to a monochrome camera 430 (e.g., Basler Racer raL4096-280 km) via a Camera Link interface, second frame grabber 406 may be a Dalsa™ Xtium-CL PX4 that is connected to a color camera 432 (e.g., Dalsa™ Piranha PC-30-04K80) via a Camera Link interface, GPU 408 may be an Nvidia™ Quadro P5000, first serial interface 418 may be a high-speed stage controller that is communicatively connected to a Teknic™ stage controller 436 (e.g., a Teknic™ stage controller within motion controller 108), and second serial interface 420 may be an input/output controller communicatively connected to an input/output board controller 438 (e.g., within interface system 110). It should be understood that controller 402 and GPU 408 may comprise processor(s) 104.

1.5. Example Network

Figure 5:
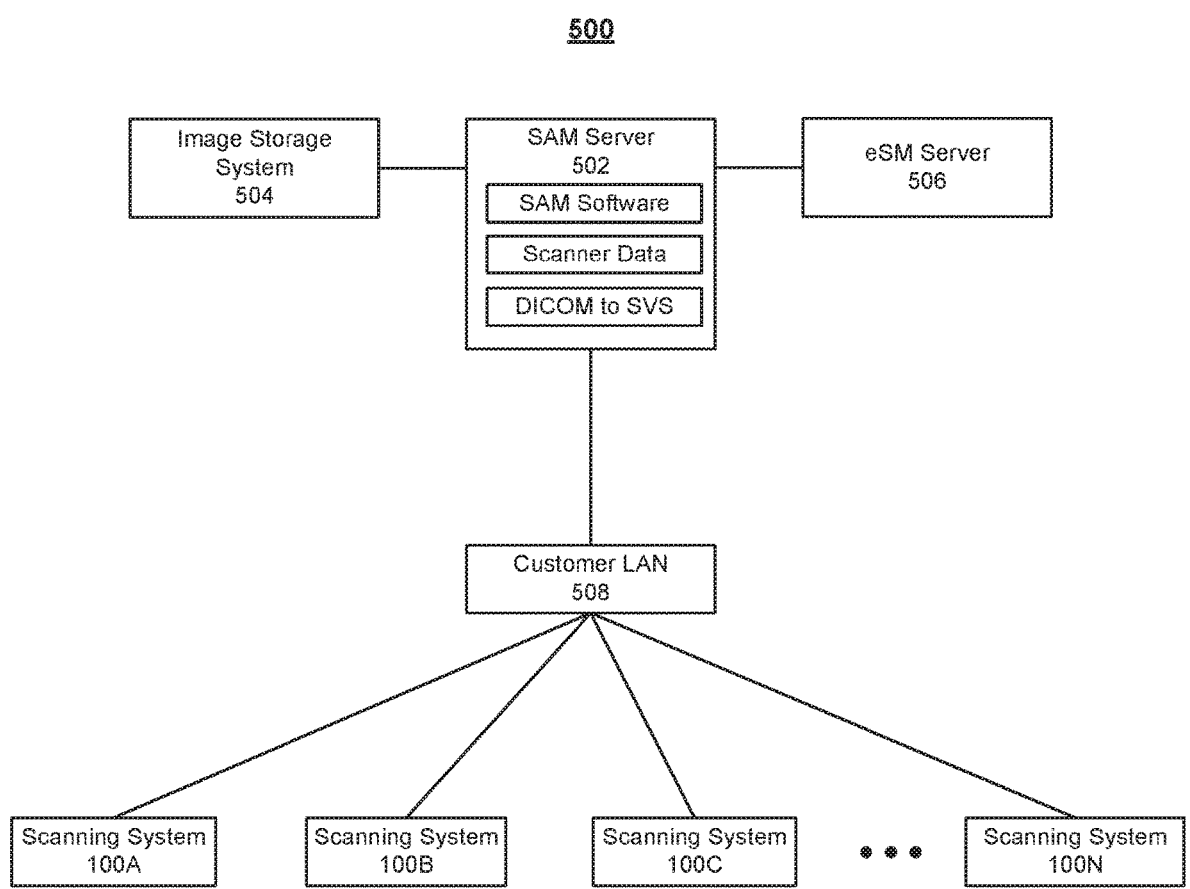
FIG. 5 illustrates examples of external software for centralized device management, according to an embodiment.

External applications and processes interface with the control software in VPU 400 to support normal device operation. In an embodiment, scanning system(s) 100 operates within a software architecture that utilizes centralized device management. FIG. 5 illustrates examples of external software for centralized device management, according to an embodiment. Such external software may include, for example, a Scanner Administration Manager (SAM) server, a Digital Imaging and Communications in Medicine (DICOM) server, a remote scanner test utility (STU), and/or the like.

In an embodiment, for each scanning system 100 to function, it must be connected and managed by a SAM server 502. SAM server 502 allows multiple scanning systems 100 to be configured and managed at a centralized location. Advantageously, this can minimize the work of laboratory administrators when maintaining multiple scanning systems 100.

In an embodiment, SAM server 502 may comprise SAM software to perform its SAM functions, scanner data, and conversion software for converting DICOM formatted files to SVS formatted files. SVS is a file format that is based on the Tag Image File Format (TIFF) and used by Leica Biosystems™. In addition, SAM server 502 may be communicatively connected to an image storage system 504 (e.g., for storing scanned slide images) and an eSlide Manager™ (eSM) server 506 (e.g., for accessing and managing scanned slide images). SAM server 502 communicates with scanning system(s) 100 via a customer local area network (LAN) 508. As non-limiting examples, each scanning system 100 may communicate with customer LAN 208 (e.g., SAM and DICOM communications) via 1 gigabyte (GB) Ethernet, customer LAN 508 may communicate with SAM server 502 (e.g., DICOM and administrative communications) via 1-10 GB Ethernet, SAM server 502 may communicate with image storage system 504 (e.g., server message block (SMB) writes) via 1-10 GB Ethernet, and SAM server 502 may communicate with eSM server 506 (e.g., eSM server communications) via 1 GB Ethernet.

1.6. Example Software Interface

Figure 6:
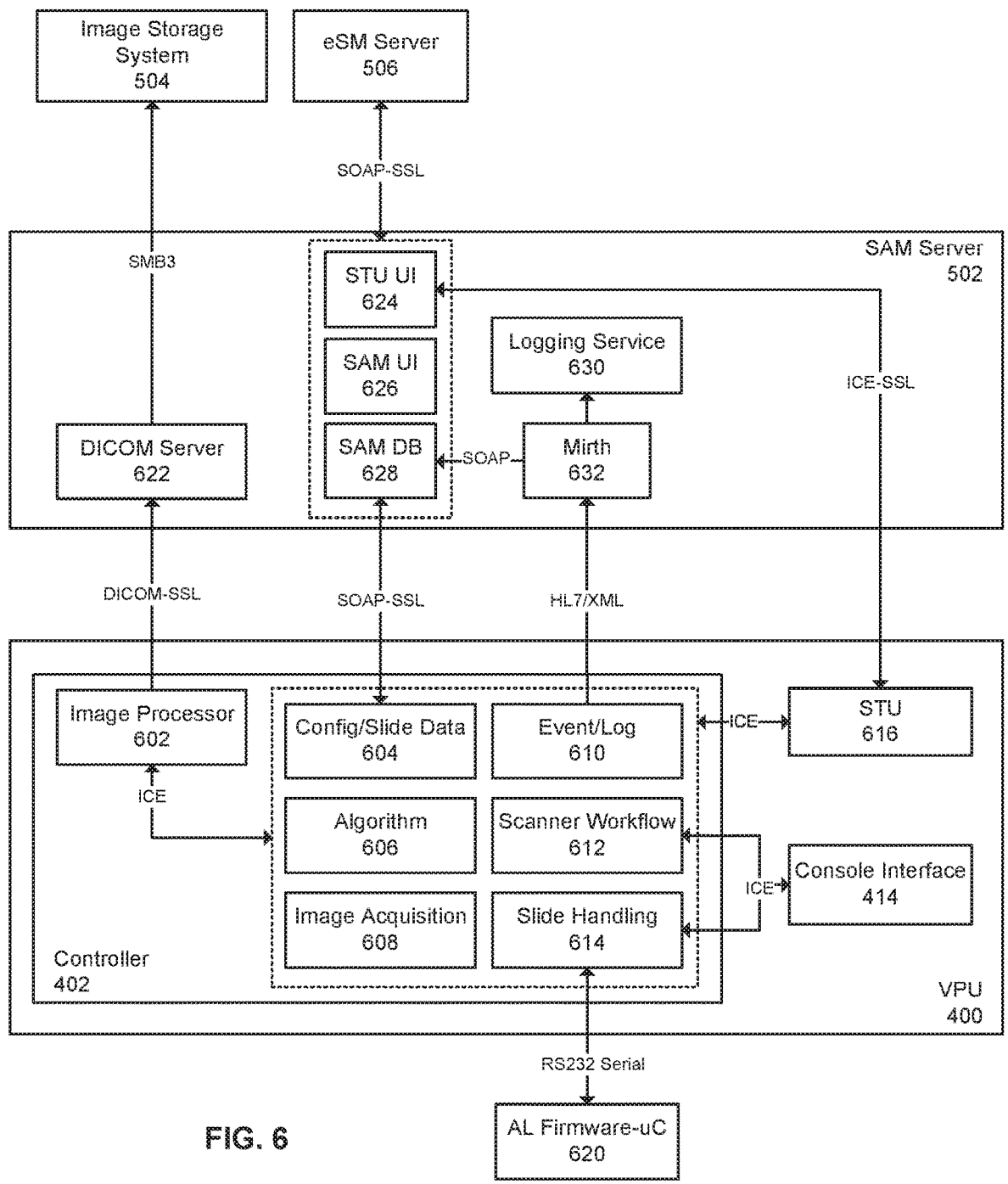
FIG. 6 illustrates examples of interfaces between the control software of a VPU and external software, according to an embodiment.

FIG. 6 illustrates examples of interfaces between the control software of a VPU 400, within one scanning system 100, and external software that may be used by each of a plurality of scanning systems 100, according to an embodiment. While certain communication protocols are illustrated in FIG. 6, different communication protocols may be used. As illustrated, there are four relevant hardware components: VPU 400 which comprises an internal CPU of scanning system 100; SAM server 502 which may be a Microsoft Windows™-based server that runs SAM software, a DICOM server, and Mirth™ applications; image storage system 504 which may be a network file-share server that is used for long-term storage of image data; and eSM server 506 which may be a Microsoft Windows™-based server that runs the eSlide Manage™ software by Leica Biosystems™.

In an embodiment, the control and external software utilize the following message protocols for system-level communications:

Internet Communications Engine (ICE): a binary protocol developed and supported by the open-source remote procedure call (RPC) framework of ZeroC™.

DICOM: a standard protocol utilized for communication and management of medical-imaging-related data.

Simple Object Access Protocol (SOAP)/eXtensible Markup Language (XML); a message protocol that utilizes the XML message format typically utilized in web services or network applications.

Health Level-7 (HL7): a standard message protocol designed to support hospital workflows, and aimed to provide a comprehensive set of conditions that simplify the exchange and integration of electronic health information between multiple healthcare management systems.

As illustrated in FIG. 6, the control software used by controller 402 of VPU 400 comprises an image processor 602 (e.g., for processing acquired image data), configuration data (e.g., for configuring scanning system 100) and/or slide data (e.g., acquired by scanning system 100) 604, one or more algorithms 606 (e.g., for processing image data within scanning system 100), an image acquisition module 608 (e.g., which acquires image data within scanning system 100), event and/or log data 610 (e.g., for recording events that occur in scanning system 100), a scanner workflow module 612 (e.g., which manages the workflow of scanning system 100), and a slide handling module 614 (e.g., which handles slide loading and unloading within scanning system 100). Image processor 602 may communicate with the other control software via ICE. In addition, scanner workflow module 612 and slide handling module 614 may both communicate with console interface 414 via ICE. Slide handling module 614 may also communicate with auto-loader (AL) firmware-uC 620 via RS232 serial communication. Various control software executed by controller 402 may also communicate with STU module 616 via ICE.

Image processor 602 may communicate with DICOM server 622 in SAM server 602 via DICOM-Secure Socket Layer (SSL), and may communicate with other control software of controller 420 via ICE. Configuration and/or slide data 604 may be communicated to and from SAM database 628 on SAM server 502 via SOAP-SSL. Event and/or log data 610 may be communicated to Mirth™ application(s) 632 on SAM server 502 via HL7/XML. STU module 616 may communicate with an STU user interface 624 via ICE-SSL.

On SAM server 502, DICOM server 622 may communicate with image storage system 504 via SMB3. Mirth™ application(s) 632 may communicate with SAM database 628 via SOAP, and may also communicate with logging service 620 on SAM server 502. In addition, the group of STU user interface 624, SAM user interface 626, and SAM database 628 may communicate with eSM server 506 using SOAP-SSL.

1.7. Indexed Positions

In an embodiment, an indexed position is any position in which rack slots 208 of carousel 200 are aligned with the rack detectors (e.g., optical sensors). The requirement of stopping at an indexed position ensures that the insertion and extraction of slide racks 220, into and out of rack slots 208, remain visible to the auto-loader system. Specifically, in an embodiment, carousel 200 must be in one of the indexed positions for the rack detectors to identify when a slide rack 220 is inserted into or extracted from a rack slot 208, and therefore, for processor 104 to accurately update the rack statuses.

Figure 7A:
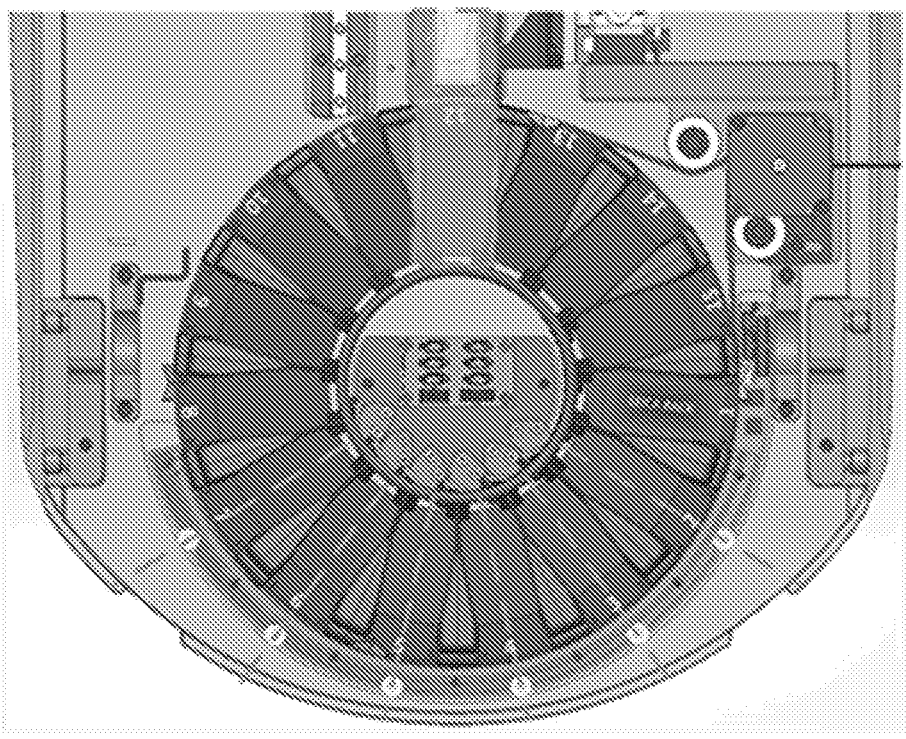
FIGS. 7A and 7B illustrate indexed and non-indexed positions, respectively, of a carousel in a scanning system, according to an embodiment.
Figure 7B:
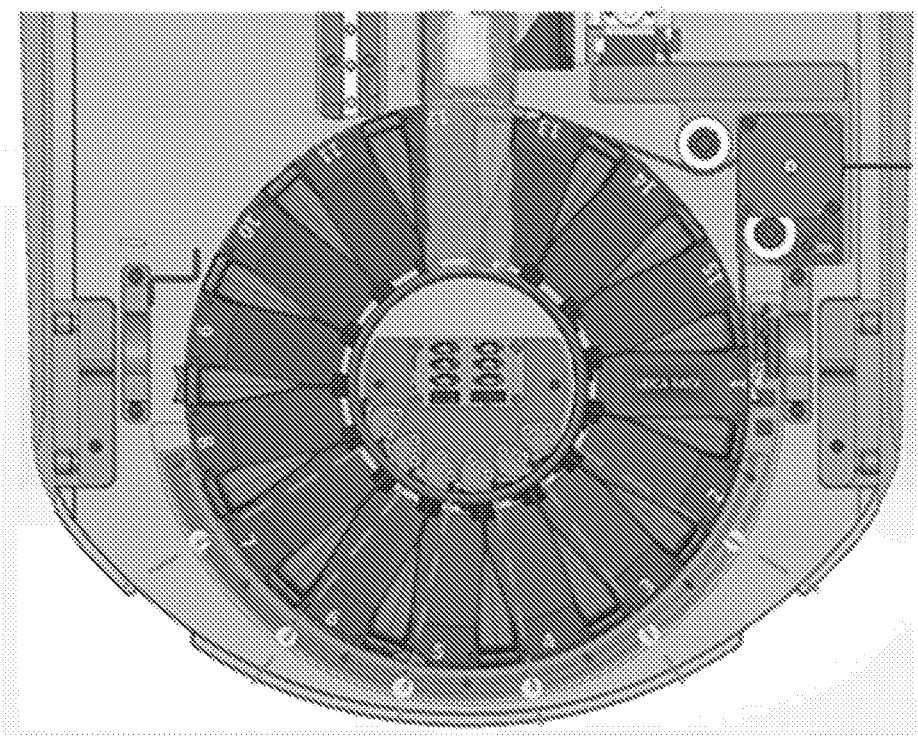

FIG. 7A illustrates carousel 200 in an indexed position, whereas FIG. 7B illustrates carousel 200 in a non-indexed position, according to an embodiment. As illustrated in FIG. 7A, in an indexed position, each of the rack detectors are aligned with respective rack slots 208, and a rack slot 208 on the back end of carousel 200 is aligned with the rack-loading/unloading mechanism. Notably, there will be as many indexed positions for carousel 200 as there are rack slots 208 (e.g., fifteen in the illustrated embodiment). In contrast, as illustrated in FIG. 7B, in a non-indexed position, none of the rack detectors are aligned with any rack slot 208, and the rack-loading/unloading mechanism is not aligned with any rack slot 208.

1.8. Example Pinch-Point Sensor

Figure 8:
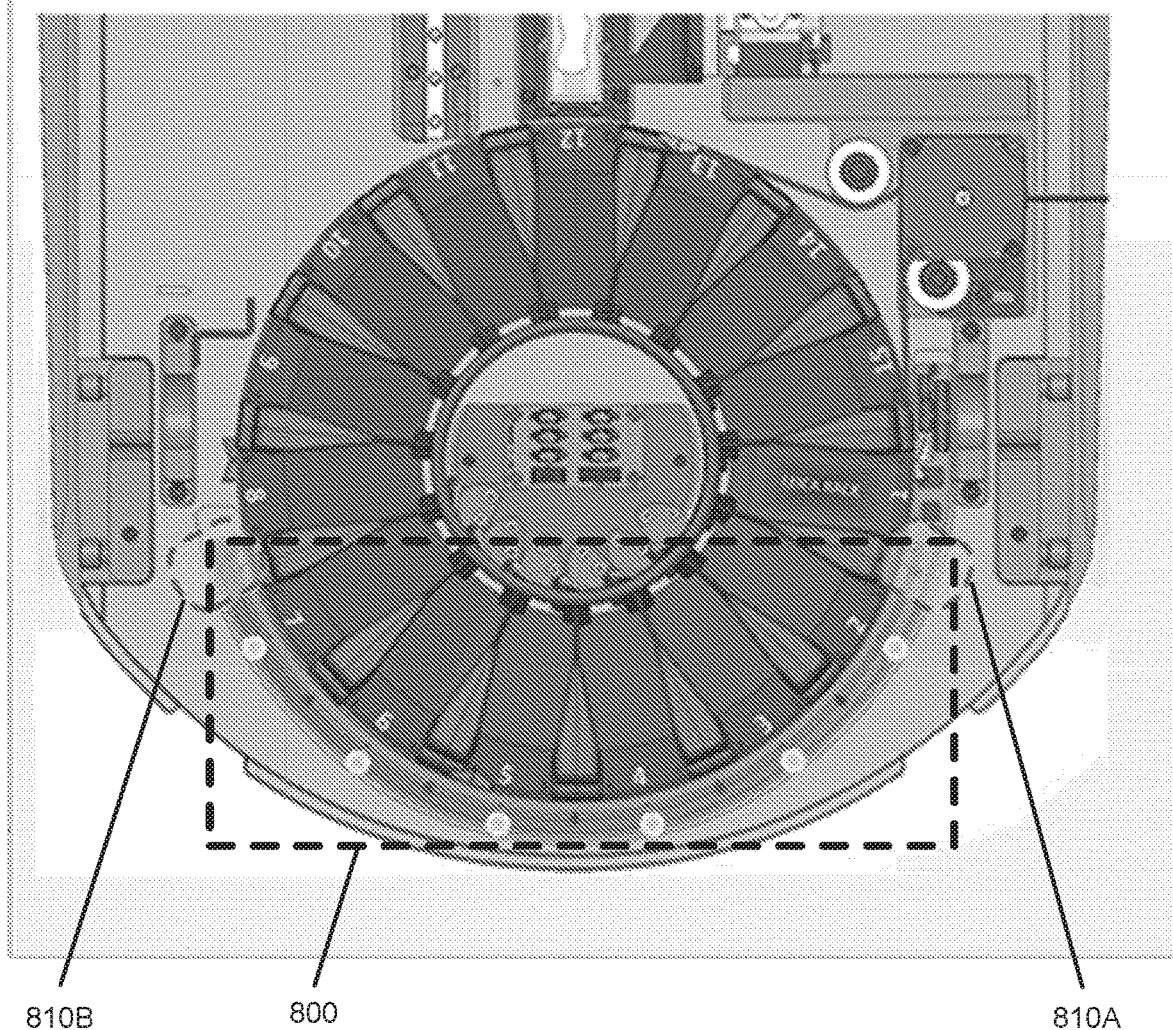
FIG. 8 illustrates a pinch-point sensor in a scanning system, according to an embodiment.

FIG. 8 illustrates the positioning of a pinch-point sensor 810, according to an embodiment. In an embodiment, pinch-point sensor 810 comprises a pair of sensors located at the far edges of an exposed portion 800 of scanning system 100. Exposed portion 800 may comprise an opening in the side of scanning system 100, and preferably in the front of scanning system 100. The opening exposes a segment of adjacent slot racks 208 in carousel 200 to the external environment of scanning system 100, such that they may be directly accessed by an operator.

In the illustrated embodiment, pinch-point sensor 810 comprises two sensors 810A and 810B on either side of exposed portion 800. Pinch-point sensors 810A and 810B are positioned to detect potential safety risks associated with the location at which carousel 200 moves slide racks 220 from exposed portion 800 into the unexposed interior of scanning system 100.

In an embodiment, the output of pinch-point sensors 810 is physically tied to the braking feature of the motion controller 108 (e.g., Trinamic™ motion controller) for the carousel motor that drives carousel belt 210 to rotate carousel 200. Thus, when a pinch-point sensor 810 is triggered, carousel 200 cannot rotate (e.g., even if carousel 200 is not in an indexed position).

1.9. Example Light Curtain

Figure 9A:
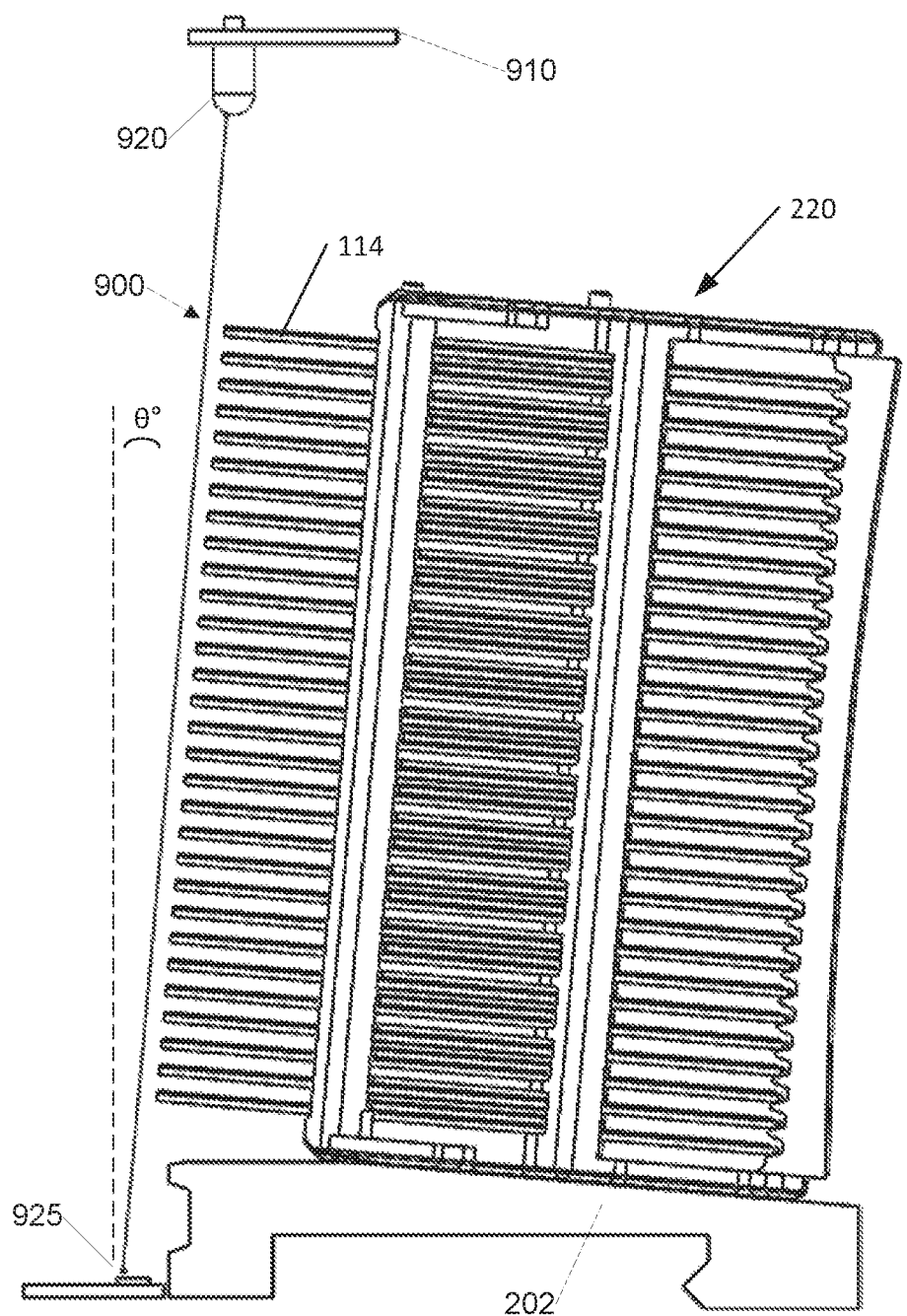
FIGS. 9A and 9B illustrate a light curia n in a scanning system, according to an embodiment.
Figure 9B:
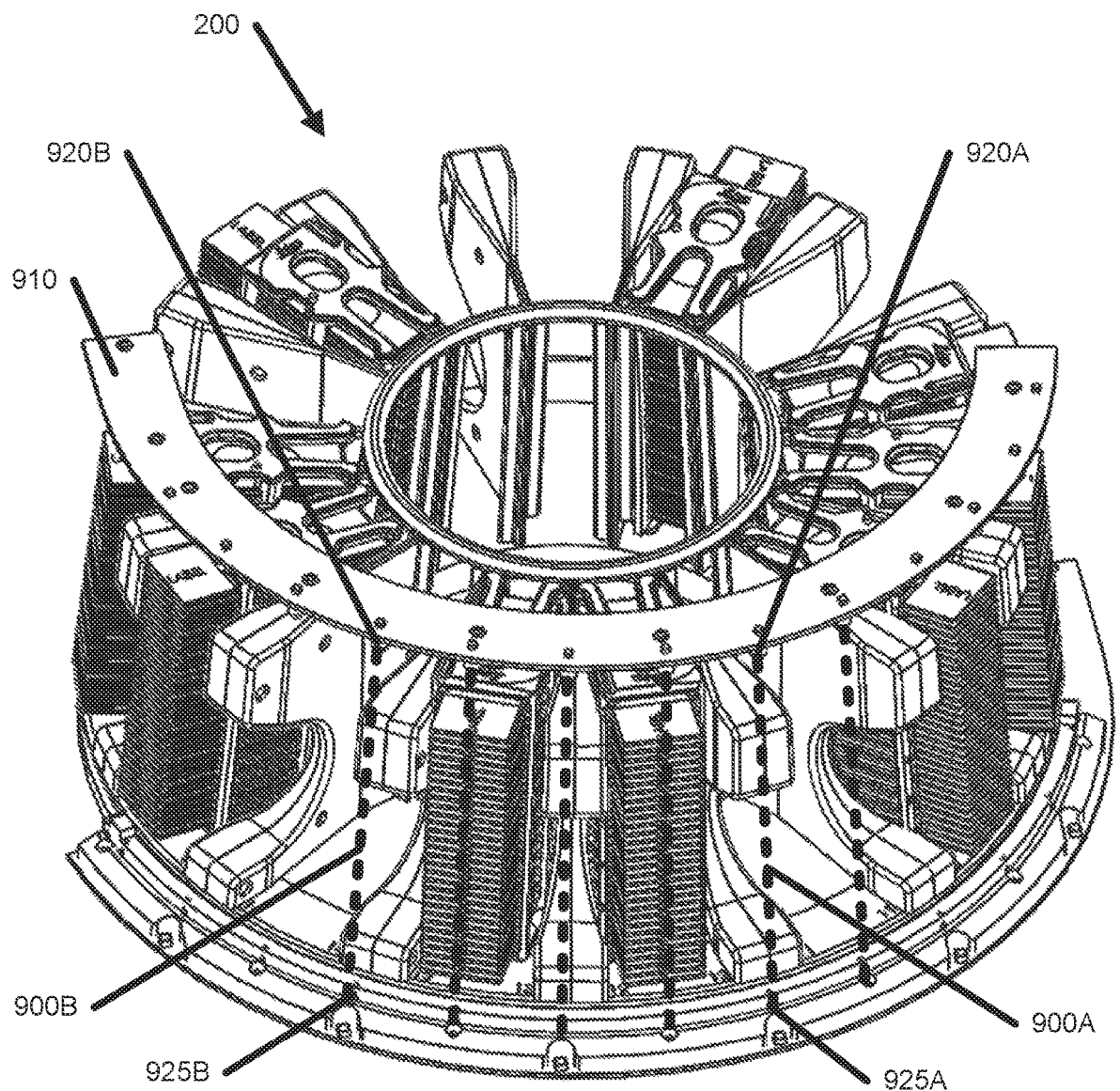

FIGS. 9A and 9B illustrate a light curtain in exposed portion 800 of scanning system 100, according to an embodiment. FIG. 9A illustrates a side view of a light curtain 900 in an example cross-section through a slide rack 220, whereas FIG. 9B illustrates light curtain 900 within the context of a perspective view of carousel 200, according to an embodiment.

As shown in FIG. 9A, a slide rack 220 is positioned on an angled portion of base 202 of carousel 200, such that the ends of glass slides 114, within slide rack 220, are not vertically aligned. Scanning system 100 comprises a mounting bracket 910 that is curved in plan view similarly to carousel 200. Mounting bracket 910 may support one side of a transmitter/receiver pair 920/925 (e.g., 920 in the illustrated embodiment). The other side of the transmitter/receiver pair 920/925 (e.g., 925 in the illustrated embodiment) is positioned on a base of scanning system 100 that is near the perimeter of carousel base 202.

Each transmitter/receiver pair 920/925 may be communicatively coupled via a direct wireless link (e.g., via light emitted by the transmitter and received by the receiver), and is configured to detect the presence of an object placed between the transmitter/receiver pair 920/925 via interruption of the direct wireless link. A plurality of transmitter/receiver pairs 920/925 may be provided around carousel 200 within exposed portion 800 of scanning system 100 to form a light curtain 900 around the entirety of exposed portion 800. Notably, since slide racks 220 are angled when properly seated, the plurality of transmitter/receiver pairs 920/925 may also be positioned at the same angle with respect to each other, such that the end of each glass slide 114, when properly seated within slide rack 220, is the same distance from light curtain 900 as any other glass slide 114 within the slide rack 220.

In an embodiment, the receiver of each transmitter/receiver pair 920/925 detects an obstruction within its light curtain when it does not receive any pulse of light from its corresponding transmitter. Accordingly, when an obstruction is detected, the receiver may provide a signal to a processor 104 of scanning system 100, so that processor 104 may take appropriate action based on the presence of the obstruction.

2. Process Overview

Embodiments of processes for controlling a slide-scanning system will now be described in detail. It should be understood that the described processes may be embodied in one or more software modules that are executed by one or more hardware processors 104 within scanning system 100. The described processes may be implemented as instructions represented in source code, object code, and/or machine code. These instructions may be executed directly by the hardware processor(s), or alternatively, may be executed by a virtual machine operating between the object code and the hardware processors.

Alternatively, the described processes may be implemented as a hardware component (e.g., general-purpose processor, integrated circuit (IC), application-specific integrated circuit (ASIC), digital signal processor (DSP), field-programmable gate array (FPGA) or other programmable logic device, discrete gate or transistor logic, etc.), combination of hardware components, or combination of hardware and software components. To clearly illustrate the interchangeability of hardware and software, various illustrative components, blocks, modules, circuits, and steps are described herein generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a component, block, module, circuit, or step is for ease of description. Specific functions or steps can be moved from one component, block, module, circuit, or step to another without departing from the invention.

Furthermore, while the processes, described herein, are illustrated with a certain arrangement and ordering of steps, each process may be implemented with fewer, more, or different steps and a different arrangement and/or ordering of steps. In addition, it should be understood that any step, which does not depend on the completion of another step, may be executed before, after, or in parallel with that other independent step, even if the steps are described or illustrated in a particular order.

2.1. Auto-Loader Initialization

In an embodiment, scanning system 100 comprises an auto-loader system which comprises carousel 200, push/pull assembly 300, and/or other subsystems within scanning system 100 that operate on glass slides 114 and/or slide racks 220, to load slide racks 220 into and out of rack slots 208 in carousel 200 and/or load glass slides 114 into and out of slots within each slide rack 220. When scanning system 100 starts up, the auto-loader system may perform an initialization process that includes a "homing" process. Homing is the process by which movable components of the auto-loader system return themselves to the initial zero positions of their axis or axes. For most components, the homing process comprises moving the component along its one or more axes until a limit switch or limit sensor is triggered, which stops the motion. Encoders for the component are then zeroed at that stopping position, and a drive controller maintains absolute positioning until scanning system 100 is restarted or power is lost.

Figure 10:
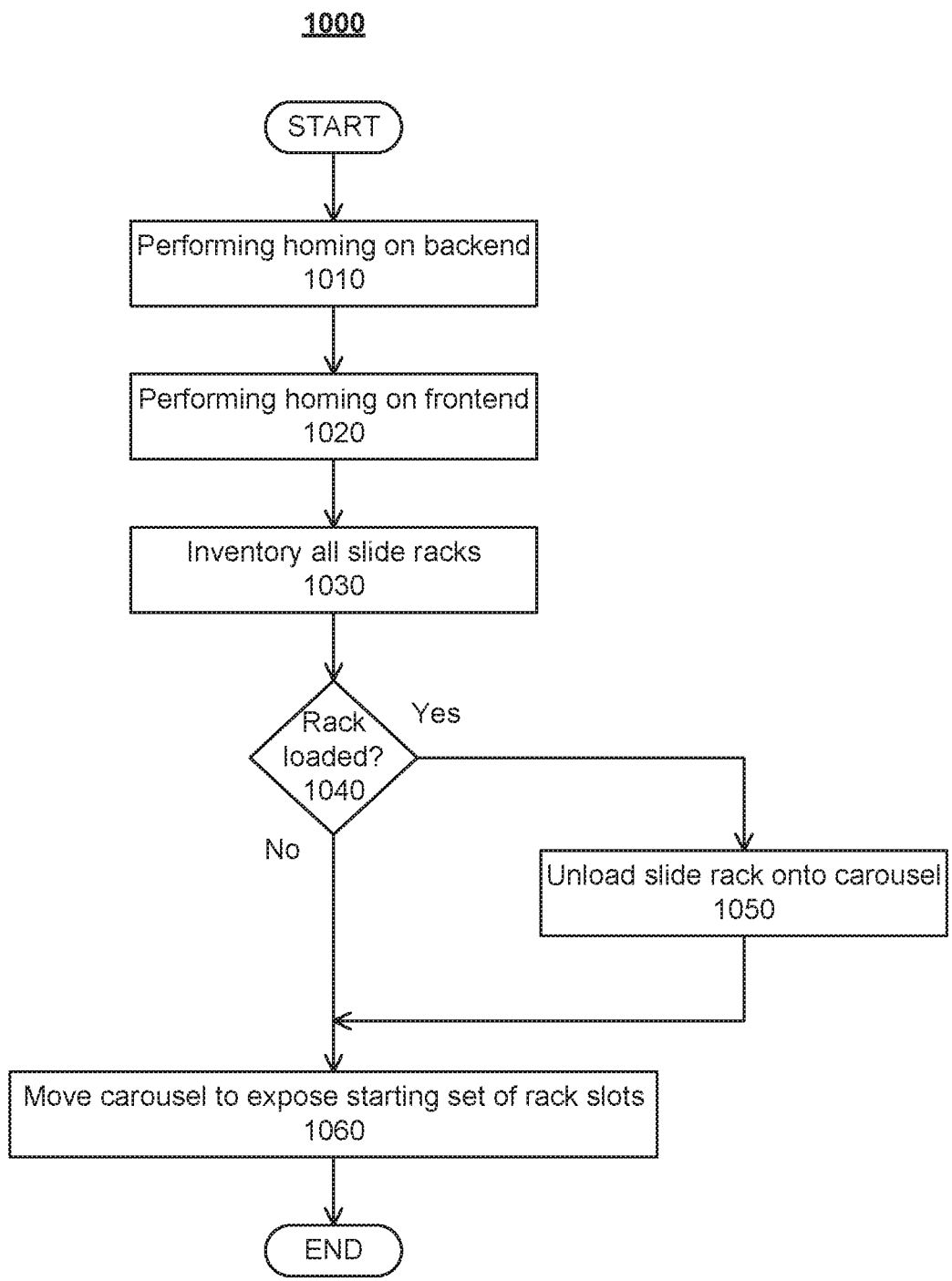
FIG. 10 illustrates an example initialization process of the auto-loader system of a scanning system, according to an embodiment.

FIG. 10 illustrates an example initialization process 1000 of the auto-loader system, according to an embodiment. In step 1010, a processor 104 of scanning system 100 performs homing on back-end components (e.g., via one or more motion controllers 108). In other words, components used for scanning glass slides 114 (e.g., stage 112, objective lens 120, etc.) are controlled (e.g., by a processor 104) to perform homing in order to zero out their axes. Similarly, in step 1020, the auto-loader system performs homing on the front-end components. For example, components that are used for loading and unloading slide racks 200 and glass slides 114 (e.g., carousel 200, push/pull assembly 300, clamps of a lift for driving slide racks 220 between carousel and push/pull assembly 300, etc.), are controlled to perform homing in order to zero out their axes.

In step 1030, a processor 104 of scanning system 100 may inventory all slide racks 220, if any, that are in rack slots 208 on carousel 200 and all slide racks 220, if any, that have been unloaded from carousel 200. Based on this inventory, in step 1040, processor 104 determines whether or not there is any loaded slide rack 220. For example, during initialization, a slide rack 220 may still be within the back-end of scanning system 100, outside of carousel 200, if the slide rack 220 had been loaded (e.g., to load or unload glass slides 114 onto or off of stage 112) at the time that a power failure occurred during a prior operation of scanning system 100. If there is a loaded slide rack 220 outside of carousel 200 (i.e., "Yes" in step 1040), the slide rack 220 is unloaded back into a rack slot 208 in carousel 200 in step 1050.

If there was no loaded slide rack 220 outside of carousel 200 (i.e., "No" in step 1040) or the loaded slide rack 220 was unloaded in step 1050, the carousel is then rotated back to a starting position. For example, in this starting position, a starting subset of rack slots 208 (e.g., rack slots 208 labeled "1"-"6") may be exposed to the external environment of scanning system 100, or a maximum number of empty rack slots 208 may be exposed as discussed elsewhere herein.

2.2. Continuous Load Workflow

In an embodiment, scanning system 100 operates with an open-frame design to provide true continuous load workflow. In other words, a certain number of slot racks 208 are always exposed to the external environment, in exposed portion 800, for easy loading and unloading of slide racks 220. Continuous load workflow means that scanning system 100 continues to scan glass slides 114, without interruption, as an operator adds and removes slide racks 220 from the exposed slot racks 208.

A processor 104 of scanning system 100 may attempt to optimize the position of carousel 200 (e.g., by maximizing the number of empty slot racks 208 that are exposed) during normal operation, so as to enable operators to quickly insert new slide racks 220 into empty rack slots 208. One element of this design is the ability for the auto-loader system to pull the next unprocessed slide rack 220 completely out of carousel 200 when it is ready to be processed. This allows carousel 200 to freely position itself, while the back-end of scanning system 100 continues to scan glass slides 114.

Once the active slide rack 220 is loaded from carousel 200 for processing, carousel 200 is free to rotate while the active slide rack 220 is being processed and the glass slides 114 within the active slide rack 220 are being scanned.

The software for controlling the auto-loader system may define two types of rotation: active and automatic. For all instances of rotation, in order to minimize malfunctions, the auto-loader control software may require the satisfaction of strict conditions prior to initiating any rotation.

Active rotation refers to rotating carousel 200 in response to an operator's command to present a specific slide rack 220 within exposed portion 800 of scanning system 100. This is typically required when the operator needs to retrieve a specific slide rack 220 that is not currently in one of the exposed rack slots 208. To provide the command, the user may, within the console (e.g., a touch panel display) of scanning system 100, select the specific slide rack 220 that the operator wishes to access, and then select a "rotation" input element for that selected slide rack 220 to initiate the active rotation. A processor 104 will then, as soon as it is safe to do so, control carousel 200 to perform an active rotation to expose the selected slide rack 220.

Automatic rotation refers to rotating carousel 200 automatically without any user initiation or interaction. For example, a processor 104 may perform automatic rotation, to place the next active slide rack 220 into position for loading, whenever scanning system 100 is ready to process the next active slide rack 220. As another example, automatic rotation may be performed when scanning system 100 has completed operation, in order to return carousel 200 to its default state, in which the maximum number of empty rack slots 208 are exposed at the front of scanning system 100.

2.3. Rack Detection and LED Indicators

As discussed elsewhere herein, a certain number of rack slots 208 are always exposed (e.g., at the front of scanning system 100) to an external environment of scanning system 100 for easy loading and unloading of slide racks 220. In the illustrated embodiments, the number of exposed rack slots 208 is always six. In other words, six rack slots 208 are always accessible within exposed portion 800 in the front of scanning system 100. However, carousel 200 and/or the frame of scanning system 100 may be configured to provide fewer or more exposed rack slots 208. In addition, the exposed rack slots 208 may be exposed on a side of scanning system 100 other than the front.

In an embodiment, an optical sensor is aligned, at least within each exposed rack slot 208, to detect each insertion of a slide rack 220 into the rack slot 208 and the removal of a slide rack 220 from the rack slot 208. Once a slide rack 220 is fully seated within a rack slot 208, the optical sensor asserts a value indicating the presence of the slide rack 220, and the auto-loader firmware updates the rack state for the rack slot 208 from absent to present. Conversely, if a slide rack 220 is removed from a rack slot 208, the optical sensor asserts a value indicating the absence of the slide rack 220, and the auto-loader firmware updates the rack state for the rack slot 208 from present to absent.

In an embodiment, each exposed rack slot 208, in exposed portion 800 of scanning system 100, is associated with a light-emitting diode (LED) 1100. LEDs 1100 may be comprised around a peripheral edge of carousel 200 in exposed portion 800 of scanning system 100, with one LED 1100 positioned in front of each exposed rack slot 208 when carousel 200 is at rest in an indexed position. Whenever a slide rack 220 is inserted into an exposed rack slot 208, the LED 1100 positioned in front of that exposed rack slot 208 is still visible. In an embodiment in which six rack slots 208 are exposed at the front of scanning system 100 at any given time, there may be a set of six LEDs 1100A-1100F fixed to a base of scanning system in a curve that follows the front of carousel 200. Notably, the strip of LEDs 1100 is fixed, and carousel 200 rotates so that a different rack slot 208 may be associated with any given LED 1100 over time. Unless in an error state, LED 1100 may be configured to be lit in a color that represents the state of the slide rack 220 in the associated rack slot 208. LED 1100 may be turned off for the "empty" state or lit in gray or white.

Figure 11:
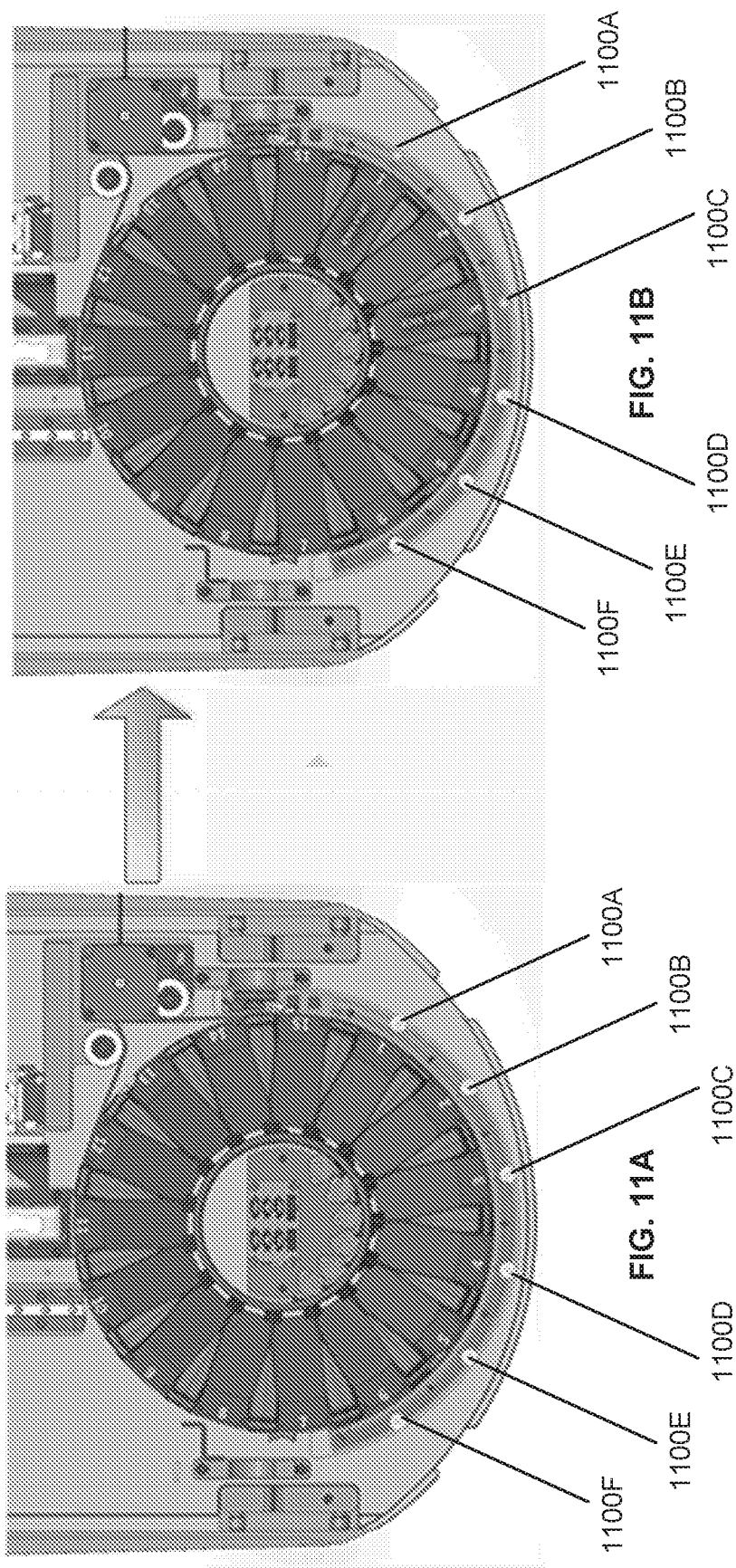
FIGS. 11A and 11B illustrate the behavior of the auto-loader system of a scanning system, according to an embodiment.

FIGS. 11A and 11B illustrate the behavior of the auto-loader system once a slide rack 220 is detected, according to an embodiment. As illustrated in FIG. 11A, after the homing process, processor 104 performs an automatic rotation to expose the starting set of rack slots 208. This corresponds to step 1060 in process 1000. In the illustrated example, with all rack slots 208 empty, the starting set of rack slots 208 are the first six rack slots 208 labeled "1"-"6". As illustrated in FIG. 11B, upon full insertion and detection of slide racks 220 in the first and third rack slots 208 (i.e., labeled "1" and "3", respectively), the auto-loader turns on the LEDs 1100A and 1100C associated with the newly occupied first and third rack slots 208. In addition, the color of these LEDs 1100A and 1100C is the color associated with a state of "waiting to be processed" (e.g., blue), since the newly detected slide racks 220 are waiting to be processed.

Figure 12:
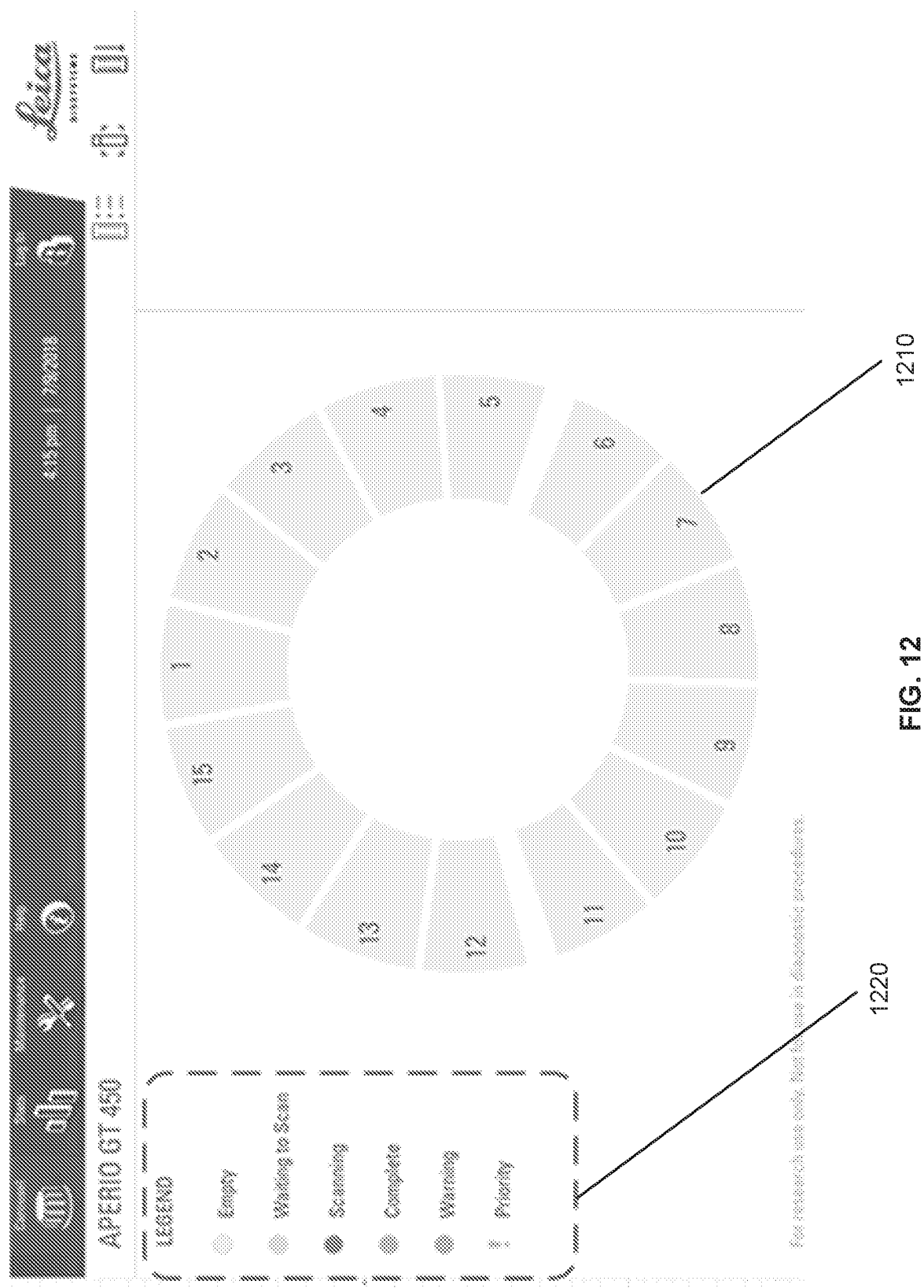
FIG. 12 illustrates a carousel screen of a graphical user interface that may be displayed on the console of a scanning system, according to an embodiment.

FIG. 12 illustrates a carousel screen of a graphical user interface that may be displayed on the console (e.g., touch panel display) of scanning system 100, according to an embodiment. As illustrated, the carousel screen comprises a graphical carousel representation 1210, which comprises a graphical representation of each rack slot 208, colored in a color associated with the state of the respective rack slot 208. The carousel screen also comprises a legend 1220 that maps each of the colors to the state that the color represents. For example, a state of "empty" (e.g., rack slot 208 is empty) may be associated with gray, a state of "waiting to scan" (e.g., rack slot 208 is occupied but the occupying slide rack 220 has not yet been processed) may be associated with light blue, a state of "scanning" (e.g., rack slot 208 is occupied and the occupying slide rack 220 is currently being processed) may be associated with dark blue, a state of "complete" (e.g., rack slot 208 is occupied and the occupying slide rack 220 has been completely processed) may be associated with green, and a state of "warning" (e.g., rack slot 208 is occupied and a warning was encountered while processing the occupying slide rack 220) may be associated with orange. In addition, a priority status (e.g., the slide rack 220 occupying rack slot 208 is prioritized for processing) may be associated with an icon (e.g., exclamation mark).

The LED colors used to reflect the state of the slide rack 220 in the associated rack slot 208 may correspond to the colors in legend 1220 used for graphical carousel representation 1210. For example, an off, gray, or white LED 1100 may indicate the "empty" state, a blue LED 1100 may indicate the "waiting to scan" state, a green LED 1100 may indicate the "complete" state, and an orange LED 1100 may indicate the "warning" state. Generally, the "scanning" state will never need to be distinctly represented by an LED 1100, since a rack slot 208 occupied by a slide rack 220 that is currently being processed will always be within an interior of scanning system 100, and therefore, never exposed. Thus, using the same example colors above, the LED 1100 only needs to use a single shade of blue to represent both the "waiting to scan" and "scanning" states.

2.4. Automatic Rotation

As discussed above, carousel 200 may be controlled according to active rotation or automatic rotation. Automatic rotation is defined as any change in position of carousel 200 without user initiation. Details, regarding workflows for a plurality of situations in which automatic rotation may occur, will now be described. Specifically, one or more of the following behaviors may utilize automatic rotation of carousel 200: homing; loading a slide rack 220 for processing; unloading a processed slide rack 220; presenting a maximum number of empty rack slots 208 for exposure; and carousel drift correction.

2.4.1. Homing

In an embodiment, as mentioned elsewhere herein, upon initialization (e.g., a cold restart), a processor 104 may perform a homing process for carousel 200. This homing process zeroes the carousel's encoder positions and then inventories the slide racks 220 in carousel 200. If slide racks 220 are present, the auto-loader system will begin to process the first slide rack 220 in the queue, before ending in a final state of exposing the maximum number of empty rack slots 208.

Figure 13:
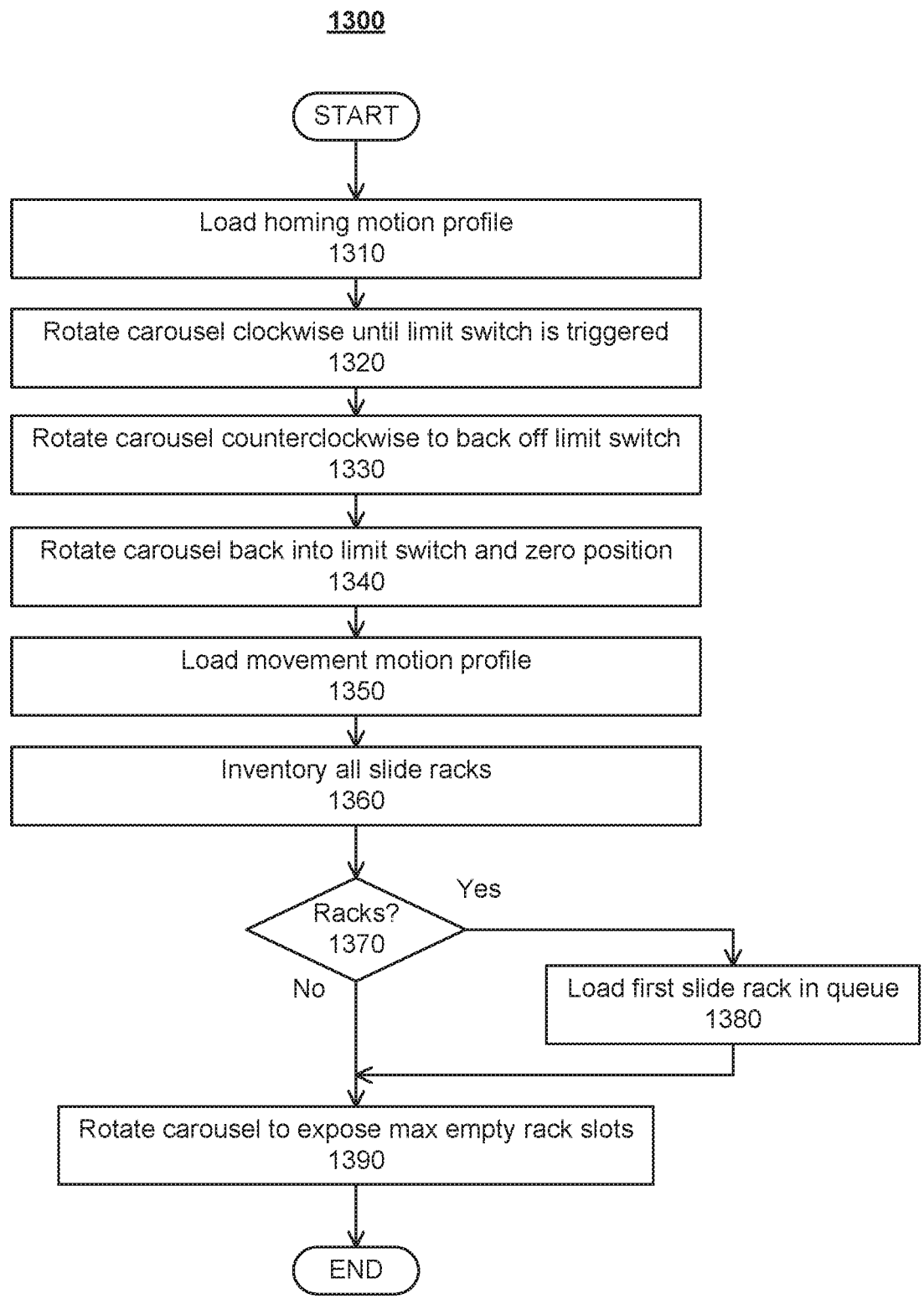
FIG. 13 illustrates an example homing process for a carousel of a scanning system, according to an embodiment.

FIG. 13 illustrates an example homing process 1300 of carousel 200, according to an embodiment. In step 1310, a homing motion profile is loaded (e.g., from memory 106). In steps 1320-1340, carousel 200 is homed according to the loaded homing motion profile. Specifically, in step 1320, carousel 200 is rotated in one direction (e.g., clockwise) until the limit switch of carousel 200 is triggered. When the limit switch is triggered, in step 1330, carousel 200 is rotated in the opposite direction (e.g., counterclockwise) to back off the limit switch. Then, in step 1340, carousel 200 is rotated back into the limit switch and the carousel's encoder positions are zeroed. in step 1350, a movement motion profile is loaded (e.g., from memory 106). The movement motion profile may govern the motion of carousel 200 during normal operation.

In step 1360, a processor 104 of scanning system 100 may inventory all slide racks 220, if any, that are in rack slots 208 on carousel 200 and all slide racks 220, if any, that have been unloaded from carousel 200. Based on this inventory, in step 1370, processor 104 determines whether or not there are any slide racks 220. If there is at least one slide rack 220 (i.e., "Yes" in step 1370), the first slide rack 220 in a processing queue (e.g., that prioritizes slide racks 220) is loaded from carousel 200 in step 1380. If there were no slide racks 220 (i.e., "No" in step 1370) or after step 1380, processor 104 performs an automatic rotation of carousel 200 to maximize the number of empty rack slots 208 within exposed portion 800 of scanning system 100.

2.4.2. Loading

In an embodiment, the workflow of scanning system 100 (e.g., implemented by processor 104 and/or motion controller 108) manages all back-end functions to digitize a glass slide 114, once the glass slide 114 has been loaded onto stage 112. When the back-end of scanning system 100 is ready to accept a new glass slide 114, it enters a "load slide" state, in which it waits for the auto-loader system to begin loading the next glass slide 114. When the processor 104, controlling the auto-loader system, determines that the next glass slide 114 belongs to a new slide rack 220 (e.g., there is no currently loaded slide rack 220 or the currently loaded slide rack 220 has been completely processed), processor 104 initiates a process for handling the next active slide rack 220.

Figure 14A:
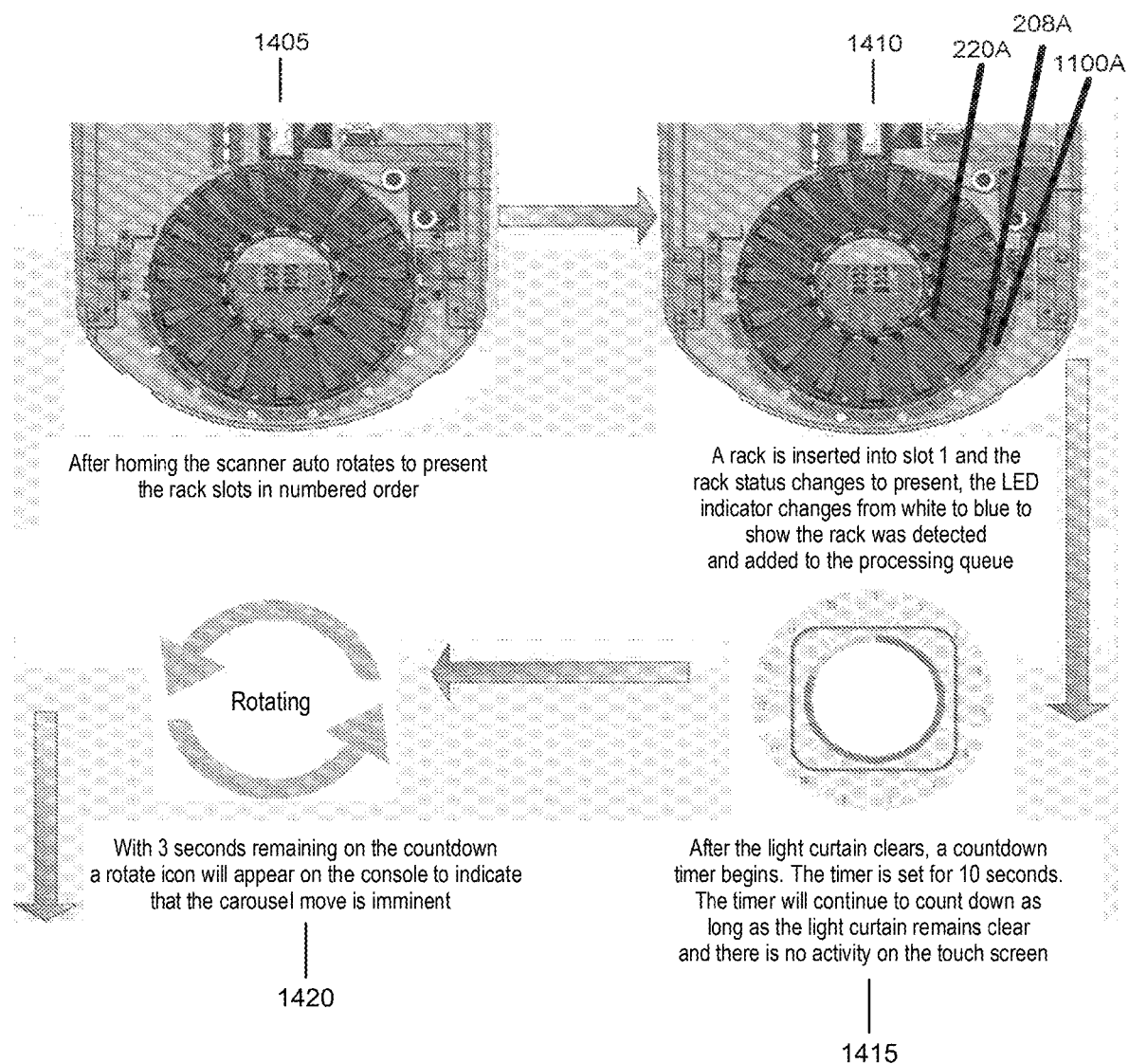
Figure 14B:
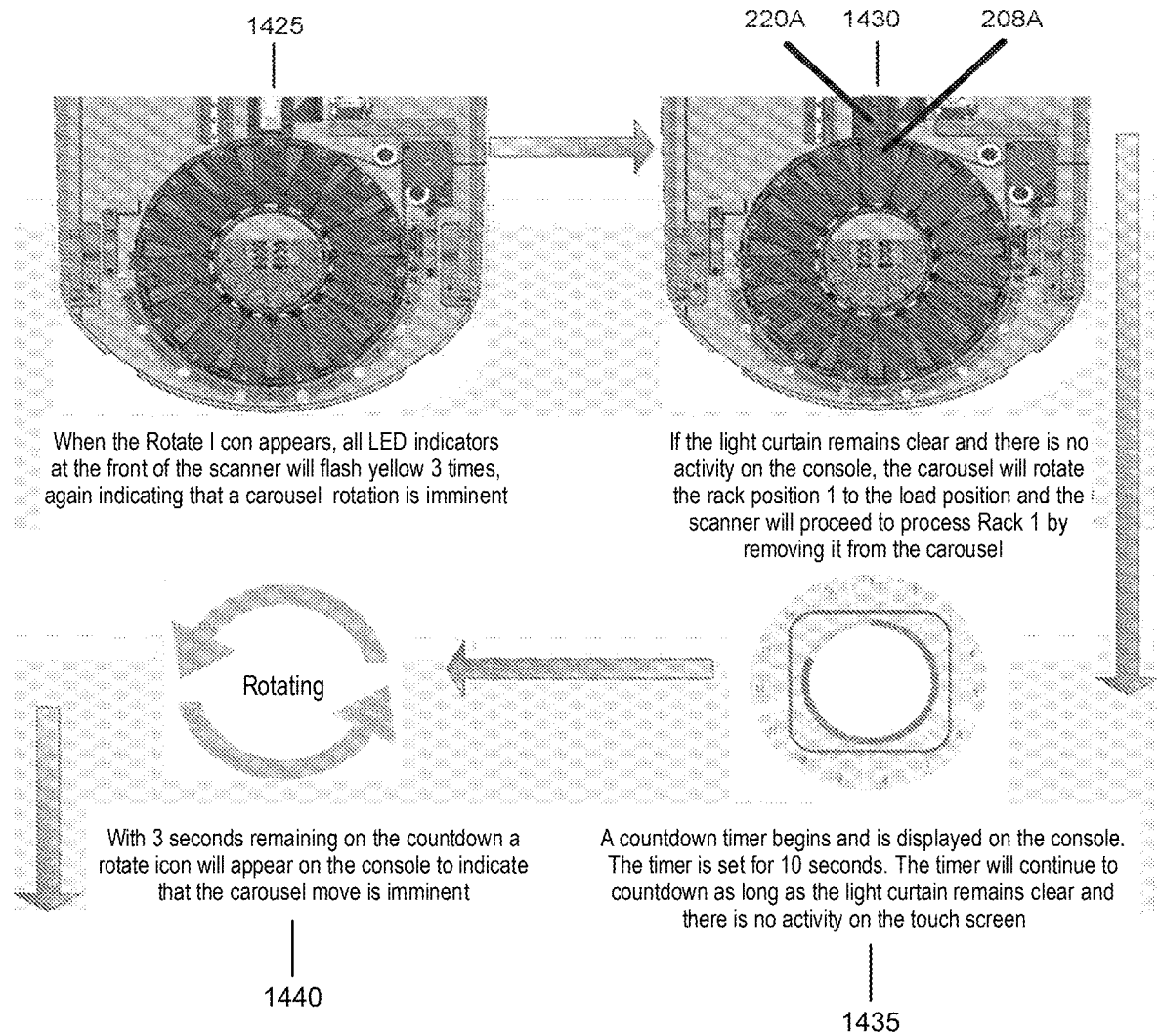

FIGS. 14A-14C illustrate the process for loading the next active slide rack 220, according to an embodiment. For example, this process may be initiated in order to handle the first slide rack 220 after the auto-loader system has completed the homing process. In step 1405, after completing the homing process, processor 104 performs an automatic rotation to present slot racks 208 in numbered order in exposed portion 800 of scanning system 100.

In step 1410, the sensor in rack slot 208A detects the insertion of a slide rack 220A. For example, an operator may insert the slide rack 220A into the first rack slot 208A. In response to the detection of the inserted slide rack 220A, processor 104 updates the status of rack slot 208A to indicate that slide rack 220A was detected and has been added to the processing queue. Accordingly, LED 1100A, corresponding to the first rack slot 208A, may change (e.g., from off/gray/white to blue) to indicate this new status.

In step 1415, processor 104 may start a countdown timer that counts down a delay period (e.g., ten seconds) until performing an automatic rotation of carousel 200. The countdown timer may be started as soon as a sensor detects that there is nothing crossing the boundary (e.g., the operator's fingers) into exposed portion 800 of scanning system 100, after the new slide rack 208 has been detected. The presence of an object crossing the exposure boundary may be detected by a sensor, such as light curtain 900 formed (e.g., vertically) across the opening within the frame of scanning system 100 that exposes carousel 200. The countdown timer may be illustrated within graphical carousel representation 1210 on the carousel screen of the graphical user interface in the console of scanning system 100. For example, a blue circular bar may transition from full to empty within the delay period, to alert the user of how much time remains within the delay period until the impending rotation of carousel 200. The delay period may be reset in response to any user interaction, such as the operator touching the touch panel display of the console, or the operator inserting something within exposed portion 800 of scanning system 100 (e.g., as detected by light curtain 900).

In step 1420, within a certain window of time prior to the automatic rotation, the graphical user interface in the console of scanning system 100 may display an indication that automatic rotation is imminent. For example, the indication may be a large rotation icon that is displayed in place of graphical carousel representation 1210 on the carousel screen. The time window may be three seconds. In an embodiment, the rotation icon may remain displayed in the graphical user interface during the entirety of any rotation.

In step 1425, at the same time that the rotation icon is displayed in the graphical user interface in step 1420, all LEDs 1100 in exposed portion 800 of scanning system 100 may flash or blink. In an embodiment, the rotation icon is displayed and. LEDs 1100 flash within the same time window (e.g., three seconds) prior to the start of the automatic rotation. LEDs 1100 may flash a certain number of times (e.g., three) before the automatic rotation starts, in order to warn the operator about the imminent rotation. LEDs 1100 may flash in a color (e.g., yellow) that is different than the colors associated with any of the states of the associated rack slots 208.

In step 1430, if the delay period has expired with no intervening user interaction (e.g., no touch to the console, no interruption of light curtain 900, etc.), the automatic rotation will begin. Specifically, carousel 200 will rotate the loaded slot rack 208A to the loading position within the interior of scanning system 100. As illustrated, the loading position is opposite exposed portion 800 of scanning system 100. Once slot rack 208A is in the loading position, the auto-loader system will remove slide rack 220A from slot rack 208A, and begin processing slide rack 220A.

In step 1435, the countdown timer begins anew and is again illustrated within graphical carousel representation 1210 on the carousel screen of the graphical user interface in the console of scanning system 100. As before, the countdown timer counts down a delay period (e.g., ten seconds), which is reset anytime that a user interaction occurs (e.g., a touch to the touch panel display of the console, a disruption of light curtain 900, etc.). Notably, step 1435 is the same as step 1415.

In step 1440, within the time window prior to the automatic rotation, the graphical user interface in the console of scanning system 100 may again display an indication that automatic rotation is imminent. Step 1440 is the same as step 1420.

In step 1445, at the same time that the rotation icon is displayed in the graphical user interface in step 1440, all LEDs 1100 in exposed portion 800 of scanning system 100 may flash or blink. Step 1445 is the same as step 1425.

In step 1450, if the delay period has expired with no intervening user interaction, the automatic rotation will begin. Specifically, processor 104 performs an automatic rotation to position the maximum number of empty rack slots 208 in exposed portion 800 of scanning system 100. However, in this case, the first rack slot 208A (i.e., labeled "1") is considered occupied. That is, even though slide rack 220A is being processed outside of rack slot 208A, slide rack 220A remains associated with rack slot 208A, and the state of rack slot 208A is currently "scanning." Thus, unlike in step 1405, in which the first through sixth rack slots 208 (i.e., labeled "1"-"6") were exposed, in step 1150, the second through seventh rack slots 208 (i.e., labeled "2"-"7") are exposed. Notably, the first rack slot 208A (i.e., labeled "1") will never be exposed as long as slide rack 220A is being processed outside of the first rack slot 208A. This will prevent an operator from inserting another slide rack 220 into the first rack slot 208A while the first rack slot 208A is technically occupied with slide rack 220A being processed. Notably, in this example, LEDs 1100 all indicate that their associated rack slots 208 (i.e., the second through seventh rack slots 208, labeled "2"-"7") are empty.

2.4.3. Unloading

In an embodiment, once a slide rack 220 has been processed, that slide rack 220 is returned to its associated rack slot 220 within carousel 200. Slide racks 220, which have been processed, do not necessarily get presented within the exposure of scanning system 100 via automatic rotation, since empty rack slots 208 will take precedence for exposure. This optimizes the continuous load workflow.

Figure 15A:
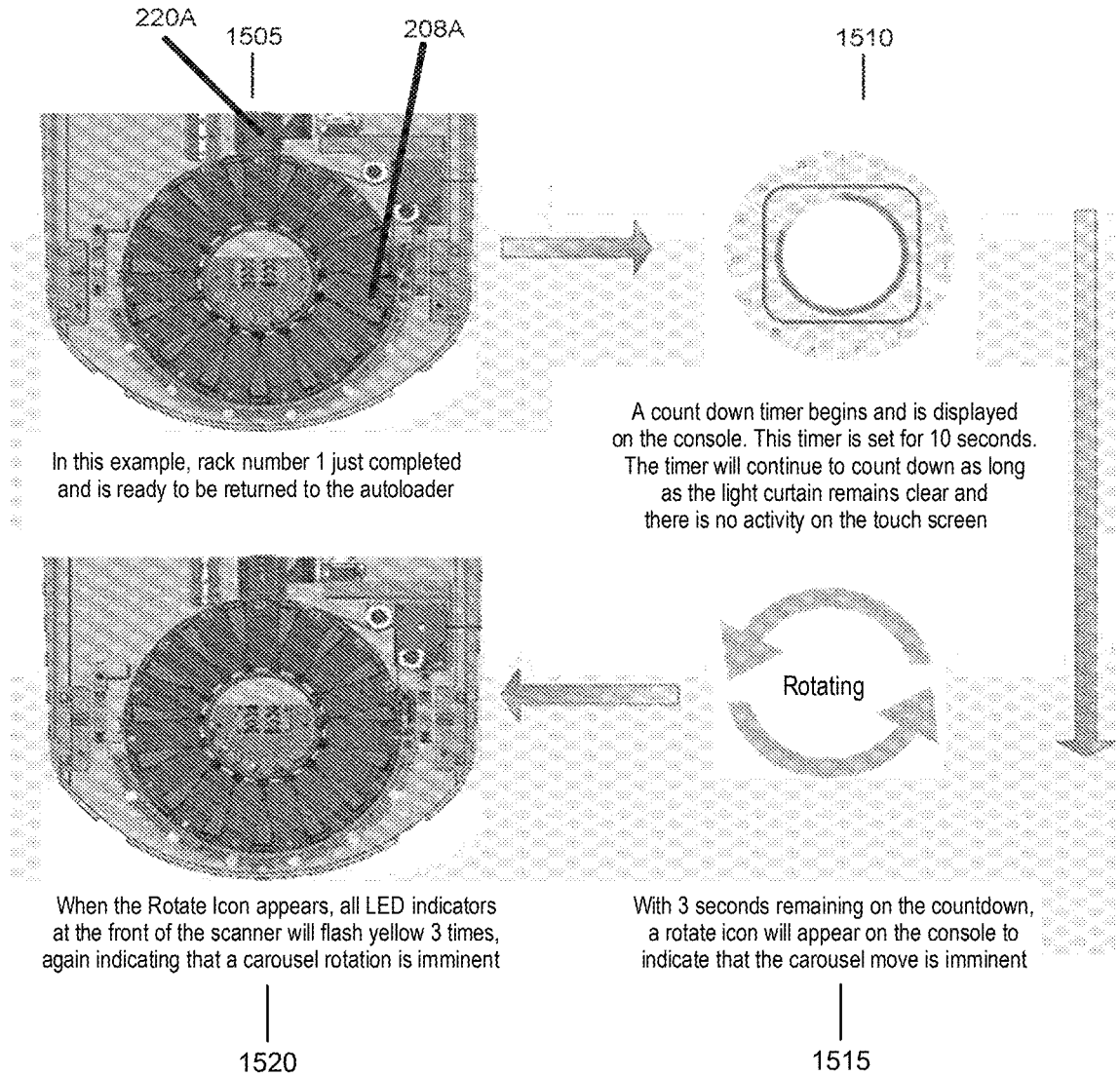
FIGS. 15A-15C illustrate a process for unloading a slide rack, according to an embodiment.
Figure 15B:
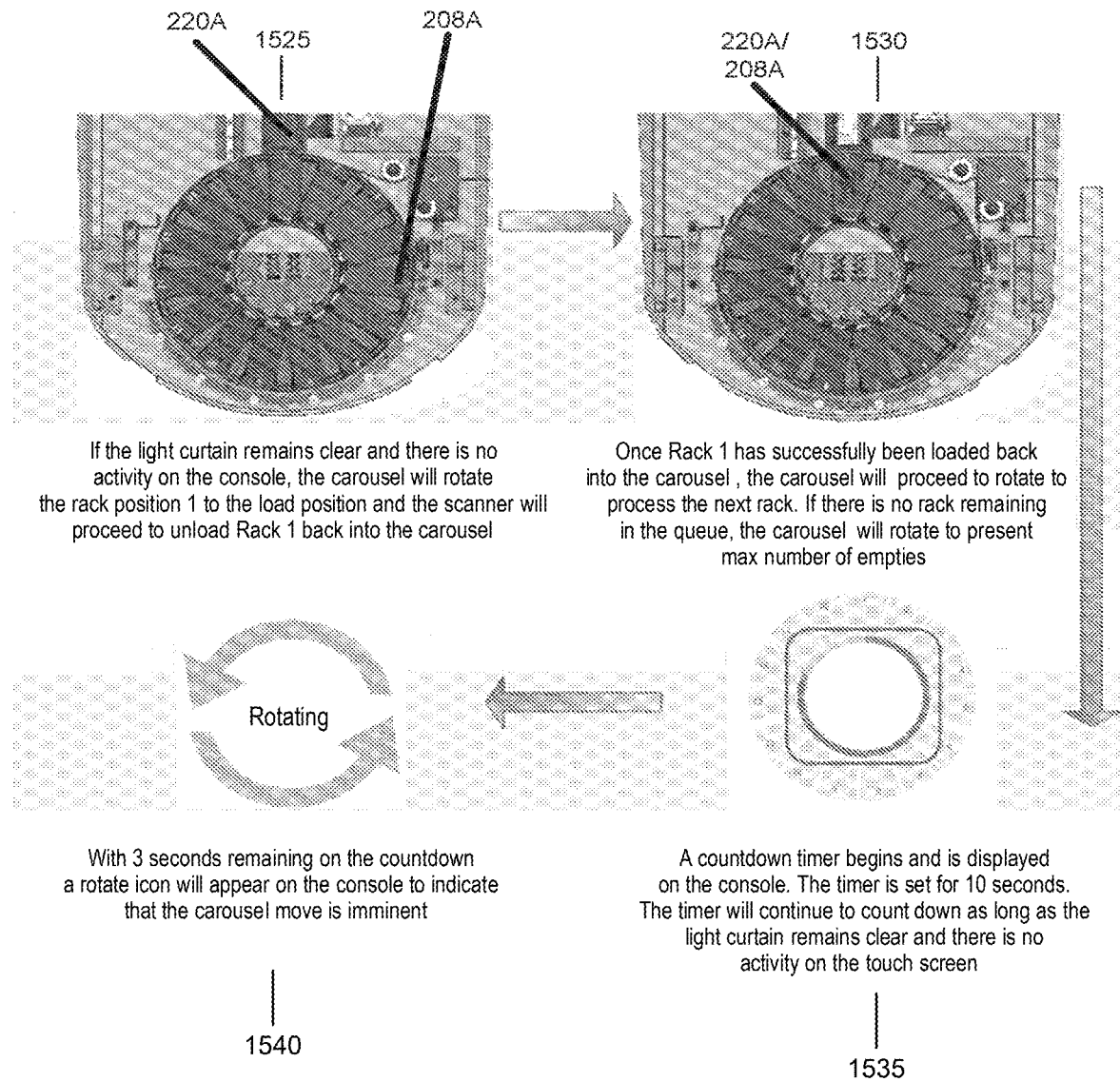
Figure 15C:
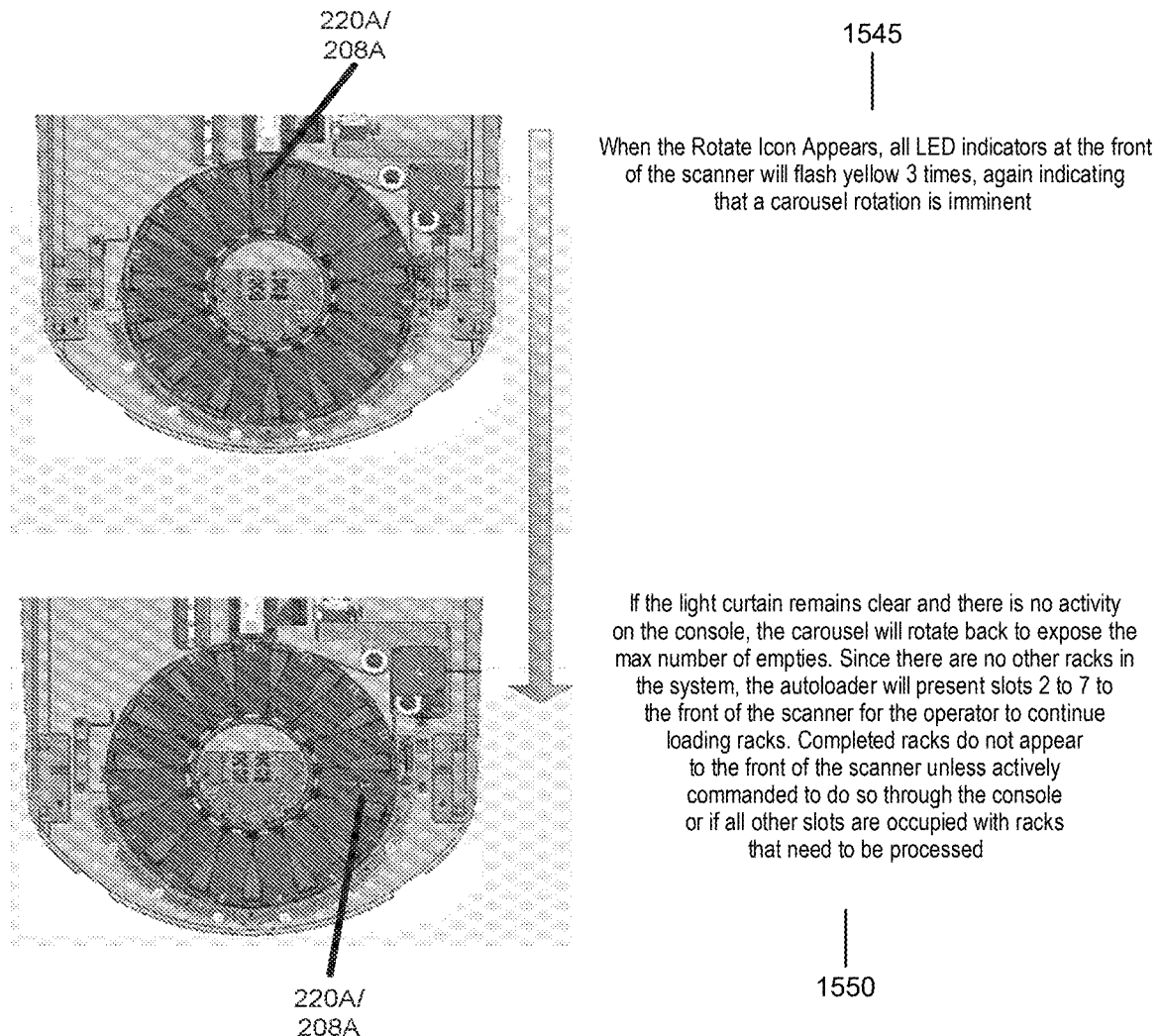

FIGS. 15A-15C illustrate the process for unloading a processed slide rack 220, according to an embodiment. For ease of understanding, these figures start from the end of the loading process illustrated in FIGS. 14A-14C. Specifically, in step 1505, the processing of slide rack 220A has been completed (e.g., all glass slides 114 within slide rack 220A have been scanned). Thus, processor 104 initiates an automatic rotation to unload slide rack 220A back into its associated rack slot 208A.

In step 1510, processor 104 may start a countdown timer that counts down a delay period (e.g., ten seconds) and resets anytime that a user interaction occurs. In addition, processor 104 may illustrate the delay period within graphical carousel representation 1210 on the carousel screen of the graphical user interface in the console of scanning system 100. Notably, step 1510 is the same as steps 1415 and 1435.

In step 1515, within a time window (e.g., three seconds) prior to the automatic rotation, the graphical user interface in the console of scanning system 100 may display an indication, such as a rotation icon, that automatic rotation is imminent. Notably, step 1515 is the same as steps 1420 and 1440.

In step 1520, at the same time that the rotation icon is displayed in the graphical user interface in step 1515, all LEDs 1100 in exposed portion 800 of scanning system 100 may flash or blink. Notably, step 1520 is the same as steps 1425 and 1445.

In step 1525, if the delay period has expired with no intervening user interaction, the automatic rotation will begin. Specifically, processor 104 performs an automatic rotation to position rack slot 208A into the loading position of carousel 200, within the interior of scanning system 100. In other words, rack slot 208A, which is associated with processed slide rack 220A, is rotated into a position that is adjacent to the rack-loading mechanism of the auto-loader system.

In step 1530, slide rack 220A is unloaded into rack slot 208A, which has been rotated to the loading position. After unloading slide rack 220A, if there remains any other slide rack 220 in the processing queue, processor 104 will initiate an automatic rotation to load that slide rack 220 (e.g., using the process illustrated in FIGS. 14A-14C). Otherwise, if no slide racks 220 remain to be processed, processor 104 will perform an automatic rotation to position the maximum number of empty rack slots 208 in exposed portion 800 of scanning system 100.

In step 1535, processor 104 may start the countdown timer to count down the delay period and reset the countdown timer anytime that a user interaction occurs. In addition, processor 104 may illustrate the delay period within graphical carousel representation 1210 on the carousel screen of the graphical user interface in the console of scanning system 100. Notably, step 1535 is the same as steps 1415, 1435, and 1510.

In step 1540, within the time window prior to the automatic rotation, the graphical user interface in the console of scanning, system 100 may display an indication, such as a rotation icon, that automatic rotation is imminent. Notably, step 1535 is the same as steps 1420, 1440, and 1515.

In step 1545, at the same time that the rotation icon is displayed in the graphical user interface in step 1535, all LEDs 1100 in exposed portion 800 of scanning system 100 may flash or blink. Notably, step 1545 is the same as steps 1425, 1445, and 1520.

In step 1550, if the delay period has expired with no intervening user interaction, the automatic rotation will begin. Specifically, processor 104 performs an automatic rotation to position the maximum number of empty rack slots 208 in exposed portion 800 of scanning system 100. Notably, step 1550 is the same as step 1450. Thus, the second through seventh rack slots 208 (i.e., labeled "2"-"7") are exposed, while rack slot 208A remains unexposed. However, unlike in step 1450, processed slide rack 220A is actually within rack slot 208A. While no harm would result to the workflow if rack slot 208A were exposed (e.g., as it might if slide rack 220A was currently outside of rack slot 208A being processed), in the interest of maintaining a continuous load, processed slide racks 220 are not rotated to exposed portion 800 of scanning system 100, except in response to an operator's command (e.g., a user interaction via the console that selects an input element for rotating the processed slide rack 220A to exposed portion 800 of scanning system 100) or in the event that all other rack slots 208 are occupied with slide racks 220 waiting to be processed.

2.4.4. Maximizing Exposed Empty Rack Slots

In an embodiment, to achieve the objective of continuous load, automatic rotation is used to maximize the number of empty rack slots 208 within exposed portion 800 of scanning system 100. This minimizes the user-interaction time required to use scanning system 100. Specifically, it ensures that scanning system 100 is ready to consume the maximum number of new slide racks 220 that it can process. An operator merely needs to approach scanning system 100 and place the new slide racks 220 into the empty rack slots 208. Advantageously, almost no user interaction with scanning system 100 is required to process new orders for the majority of the scanner workflow. However, in an alternative embodiment, instead of maximizing the number of empty rack slots 208 within exposed portion 800, automatic rotation may be used to automatically present those rack slots 208 which have been completely processed within exposed portion 800.

In an embodiment, the auto-loader system utilizes a weighted sum to determine which rack slots 208 to present within exposed portion 800 of scanning system 100. For instance, each rack slot 208 is assigned a value. The lowest value (e.g., −600) means that the associated rack slat 208 is empty. A higher value (e.g., 0) means that the associated rack slot 208 is occupied by a slide rack 220 that has been processed. The highest value (e.g., 1,000,000) means that the associated rack slot 208 is occupied by a slide rack 220 that is being processed. When attempting to maximize the number of exposed empty rack slots 208, processor 104 will calculate and select the exposable segment of adjacent rack slots 208 (e.g., the set of six adjacent rack slots 208) that produce the smallest overall sum. If multiple segments of rack slots 208 have the same overall sum (e.g., all rack slots 208 in carousel 200 are empty), then processor 104 selects, from among the segments of adjacent rack slots 208 having the same smallest overall sum, the segment that comprises the rack slots 208 having the lowest slot numbers (e.g., with the first rack slot 208 labeled "1" having the lowest slot number, and the fifteenth rack slot 208 labeled "15" having the highest slot number).

FIGS. 16A-16E illustrate example rack slot 208 values, assigned by processor 104, to be used for identifying the segment of adjacent rack slots 208 to present in exposed portion 800 of scanning system 100, using automatic rotation, according to an embodiment.

In FIG. 16A, all rack slots 208 are empty. Thus, every rack slot 208 has the same assigned value (e.g., −600). Since all segments of adjacent rack slots 208 will have the same overall sum (e.g., 6×−600=−4,800), processor 104 selects the segment with the lowest overall slot numbers (i.e., the segment consisting of the first through sixth rack slots 208 labeled "1"-"6"), and performs an automatic rotation on carousel 200 to expose this segment within exposed portion 800 of scanning system 100.

In FIG. 16B, the first and third rack slots 208 (i.e., labeled "1" and "3"), are both occupied by slide racks 220. Accordingly, the first and third rack slots 208 are both assigned a higher value (e.g., 100), while the remainder of rack slots 208 retain the lowest value (e.g., −600). Notably, after the operator stops interacting with scanning system 100 (e.g., after the operator inserts slide racks 220 into the first and third rack slots 208), processor 104 adds all newly inserted slide racks 220 to the processing queue. In the event that a plurality of new slide racks 220 have been inserted, processor 104 may add the plurality of new slide racks 220 to the processing queue in the order in which they were detected. Thus, for example, if the operator inserted a slide rack 220 into the first rack slot 208, and then inserted a slide rack 220 into the third rack slot 208, the slide rack 220 in the first rack slot 208 would be added to the processing queue in the first position (i.e., it will be the active slide rack), and then the slide rack 220 in the third rack slot 208 would be added to the processing queue in the second position (i.e., it will become the next active slide rack).

In FIG. 16C, the slide rack 220 from the first rack slot 208 is currently being processed, while the slide rack 220 in the third rack slot 208 is waiting to be processed. Accordingly, the first rack slot 208 is assigned the highest value (e.g., 1,000,000), while the third rack slot 208 retains a medium value (e.g., 100), and the remainder of rack slots 208 retain the lowest values (e.g., −600). In this case, multiple segments have the same minimum sum (e.g., −4,800). Thus, processor 104 selects the segment with the lowest overall slot numbers (i.e., the segment consisting of the fourth through ninth rack slots 208, labeled "4"-"9"), and performs an automatic rotation on carousel 200 to expose this segment within exposed portion 800 of scanning system 100. Notably, this automatic rotation is performed while the slide rack 220 from the first rack slot 208 is being processed, even though this means that the first rack slot 208 is no longer aligned with the rack-loading and unloading mechanism of the auto-loader system.

In FIG. 16D, all rack slots 208 are occupied, the slide rack 220 from the second rack slot 208 (i.e., labeled "2") is being processed, and the slide rack 220 from the third rack slot 208 (i.e., labeled "3") has completed processing. Accordingly, the second rack slot 208 is assigned the highest value (e.g., 1,000,000), the third rack slot 208 is assigned a low value (e.g., 0), and the remainder of rack slots 208 are assigned a medium value (e.g., 100). Thus, the segment consisting of the third through eighth rack slots 208 (i.e., labeled "3"-"8") has the lowest overall sum. Therefore, processor 104 performs an automatic rotation on carousel 200 to expose this segment within exposed portion 800 of scanning system 100.

In FIG. 16E, all rack slots 208 are occupied, the slide rack 220 from the second rack slot 208 (i.e., labeled "2") is being processed, and the slide rack 220 from the first rack slot 208 (i.e., labeled "1") has completed processing. Accordingly, the second rack slot 208 is assigned the highest value (e.g., 1,000,000), the first rack slot 208 is assigned a low value (e.g., 0), and the remainder of rack slots 208 are assigned a medium value (e.g., 100). Thus, the segment consisting of the eleventh through first rack slots 208 (i.e., labeled "11", "12", "13", "14", "15", and "1") has the lowest overall sum. Therefore, processor 104 performs an automatic rotation on carousel 200 to expose this segment within exposed portion 800 of scanning system 100.

Notably, in an embodiment, a rack slot 208 whose slide rack 220 is currently being processed will never be exposed in exposed portion 800 of scanning system 100. In order to ensure that this requirement is always satisfied, processor 104 may be configured to rotate carousel 200 in both directions. For example, when processor 104 is rotating carousel 200 from the position illustrated in FIG. 16B to the position illustrated in FIG. 16C, it may rotate carousel 200 in the clockwise direction. However, when processor 104 is rotating carousel 200 from the position illustrated in FIG. 16D to the position illustrated in FIG. 16E, it may rotate carousel 200 in the counterclockwise direction to avoid exposing the second rack slot 208 (i.e., labeled "2") whose slide rack 220 is being processed.

2.4.5. Carousel Drift Correction

Due to the mechanical limitations of utilizing the friction between belt 210 and belt recess 204 to rotate carousel 200, over time, the physical position of carousel 200 may drift relative to the encoder position reported by the carousel's drive motor. In an embodiment, to compensate for this mechanical drift, a counter is implemented to track the total rotational distance traveled by carousel 200 at any given time. This counter may be used to determine when the total rotational distance exceeds a predetermined threshold. Processor 104 may monitor this counter, and, when the counter exceeds the predetermined threshold, execute carousel-drift-correction logic. The carousel-drift-correction logic may break from any active rotational operation, and perform the homing process (e.g., as illustrated in process 1300 in FIG. 13) on carousel 200 to ensure that the position encoders remain accurate. After completion of the carousel-drift-correction logic, processor may reload the movement motion profile, and complete any interrupted rotational operation from the point at which it was stopped.

2.5. Active Rotation

In contrast to automatic rotation, active rotation refers to when an operator commands carousel 200 to rotate. Such commands are typically received via the console (e.g., a touch panel display that displays input elements, such as graphical carousel representation 1210, which may be selected by touch operations). However, active rotation may he functionally exposed (e.g., via an application programming interface (APO), so that such commands may also be integrated into remote test utilities, command-line interfaces, and/or the like.

The primary reason to actively rotate carousel 200 is to retrieve a slide rack 220 that is not currently accessible within exposed portion 800 of scanning system 100. There are two common use cases for this situation. In the first use case, a user may rotate a slide rack 220, which is not currently being processed (i.e., rotation of a non-active slide rack 220). In the second use case, the user may rotate a slide rack 220 that is currently being processed (i.e., rotation of an active slide rack 220). Both use cases are described in further detail below.

2.5.1. Active Rack

Active rotation of an active slide rack 220 means that the operator has chosen to interrupt processing of the active slide rack 220 (e.g., interrupt scanning of glass slides 114 within the active slide rack 220), to retrieve the active slide rack 220. In this case, the active slide rack 220 may be situated in a lift (e.g., for loading and unloading slide rack 220) of the auto-loader system. Thus, in order to retrieve the active slide rack 220, the scanning system TOO must gracefully stop the scanning process, unload the glass slide 114 being scanned off of stage 112 back into the active slide rack 220, unload the active slide rack 220 back into carousel 200, and actively rotate carousel 200 to expose the rack slot 208 that is occupied by that slide rack 220.

Figure 17A:
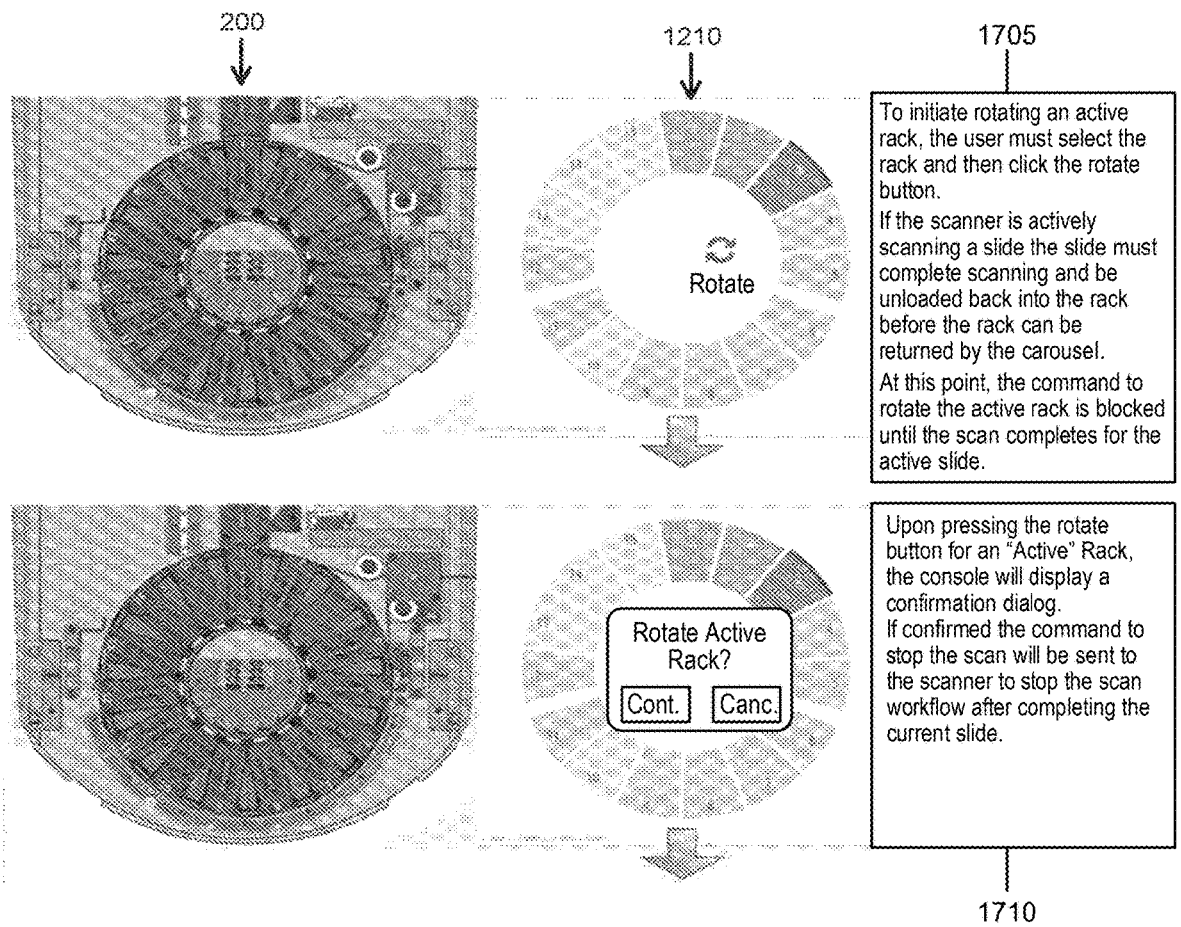
FIGS. 17A-17C illustrate the active rotation of an active slide rack, according to an embodiment.
Figure 17B:
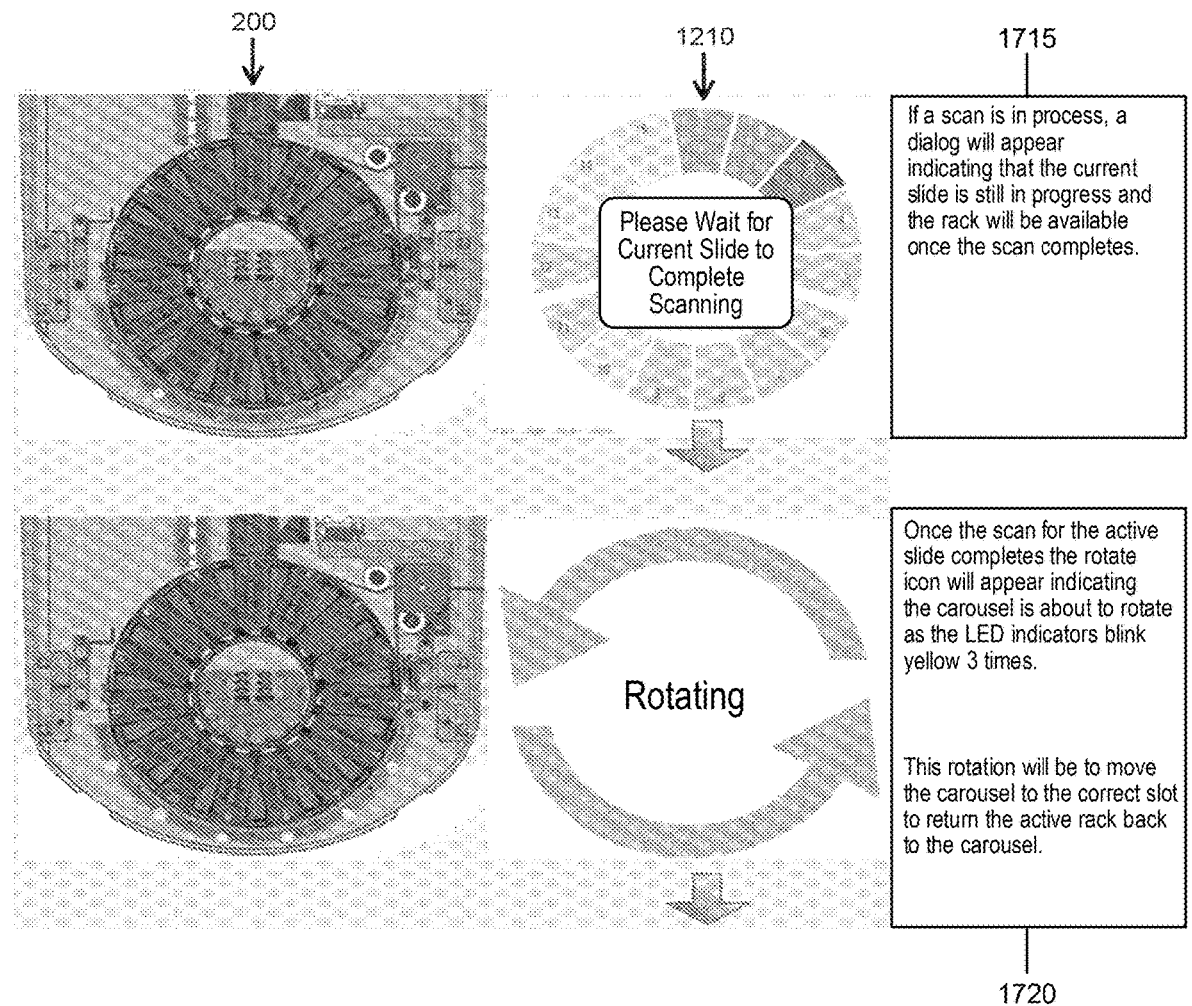
Figure 17C:
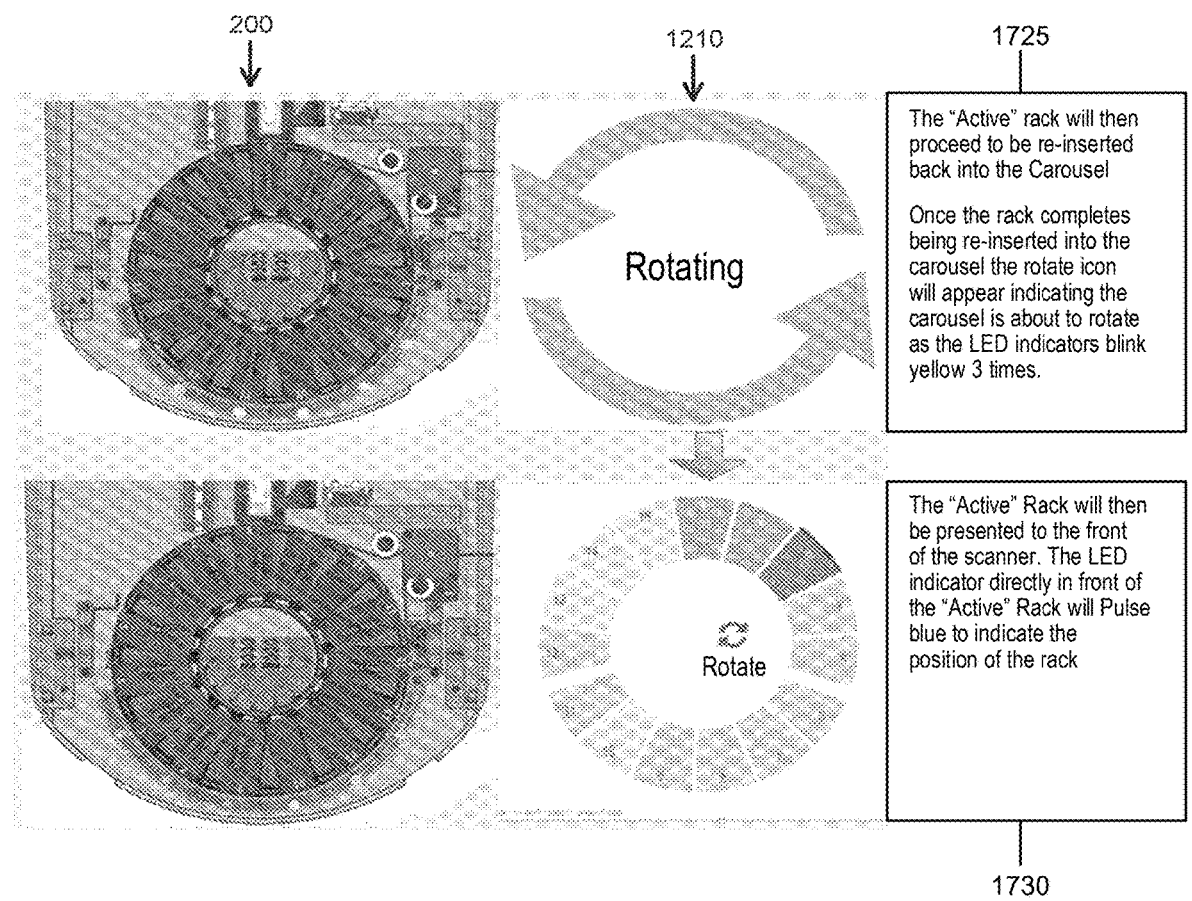

FIGS. 17A-17C illustrate the active rotation of an active slide rack 220, according to an embodiment. Each of FIGS. 17A-17C illustrate the status of carousel 200 and graphical carousel representation 1210 for each of steps 1705-1730.

In step 1705, an operator initiates an active rotation by selecting a graphical representation of the third rack slot 208 (i.e., labeled "3") in graphical carousel representation 1210, and then selecting a rotation input element in the center of graphical carousel representation 1210.

In step 1710, the carousel screen prompts the operator to confirm whether or not to proceed with the active rotation. For example, the carousel screen may overlay a dialog frame over graphical carousel representation 1210, with an input element for confirming the active rotation and an input element for canceling the command for active rotation.

In step 1715, if processor 104 receives confirmation, from the operator via the dialog frame, to perform the active rotation, it will wait until any scanning is completed before initiating the active rotation. For example, if scanning system 100 is currently scanning a glass slide 114, processor 104 waits for the scanning to complete, and then unloads the glass slide 114 back into its slide rack 220. In other words, the command to perform the active rotation may be delayed until any active scanning is completed. During this delay, a message frame may be overlaid over graphical carousel representation 1210 to notify the operator to wait for the current glass slide 114 to complete scanning.

In step 1720, once any active scanning has been completed, processor 104 controls the auto-loader system to unload the scanned glass slide 114 from stage 112 into its slide rack 220. After the glass slide 114 has been unloaded into slide rack 220, processor 104 will control the console to display a rotation icon for a predetermined time (e.g., three seconds). In addition, processor 104 may control LEDs 1100 in exposed portion 800 of scanning system 100 to blink in a notification color (e.g., yellow) for the predetermined time and/or a number of times (e.g., three).

In step 1725, after the predetermined time has passed with no user interaction, processor 104 unloads the slide rack 220 into its rack slot 208 in carousel 200. Once the slide rack 220 has been unloaded, the rotation icon may be displayed for a predetermined time (e.g., three seconds), and LEDs 1100 may blink in the notification color for the predetermined time and/or a number of times (e.g., three). Then, after the predetermined time has passed with no user interaction, processor 104 initiates the active rotation of carousel 200.

In step 1730, the active rotation is performed to rotate the third rack slot 208 into exposed portion 800 of scanning system 100, so that it is accessible to the operator. In an embodiment, once the third rack slot 208 has been exposed, the LED 1100 associated with the third rack slot 208 will pulse in a color (e.g., the color associated with the "waiting to scan" state, for example, blue) to notify the operator of the position of the third rack slot 208 which the operator just actively rotated. Although not shown, after and/or during the active rotation, graphical carousel representation 1210 may be updated to reflect the new positions of each rack slot 208 in carousel 200.

2.5.2. Non-Active Rack

Active rotation of a non-active slide rack 220 means that the operator has chosen to retrieve a non-active slide rack 220 that is not currently being processed and is not present within exposed portion 800 of scanning system 100. In other words, the operator wishes to retrieve a non-active slide rack 220 that is positioned in carousel 200 within the interior of scanning system 100. In general, a non-active slide rack 220 is any slide rack 220 that is within carousel 200, i.e., not loaded off of carousel 200 for processing. The non-active slide rack 220 may be a slide rack 220 that has been processed, or that is waiting to be processed but is within the interior of scanning system 100 due to the function of the automatic rotation to provide a maximum number of empty rack slots 208 in exposed portion 800.

Figure 18:
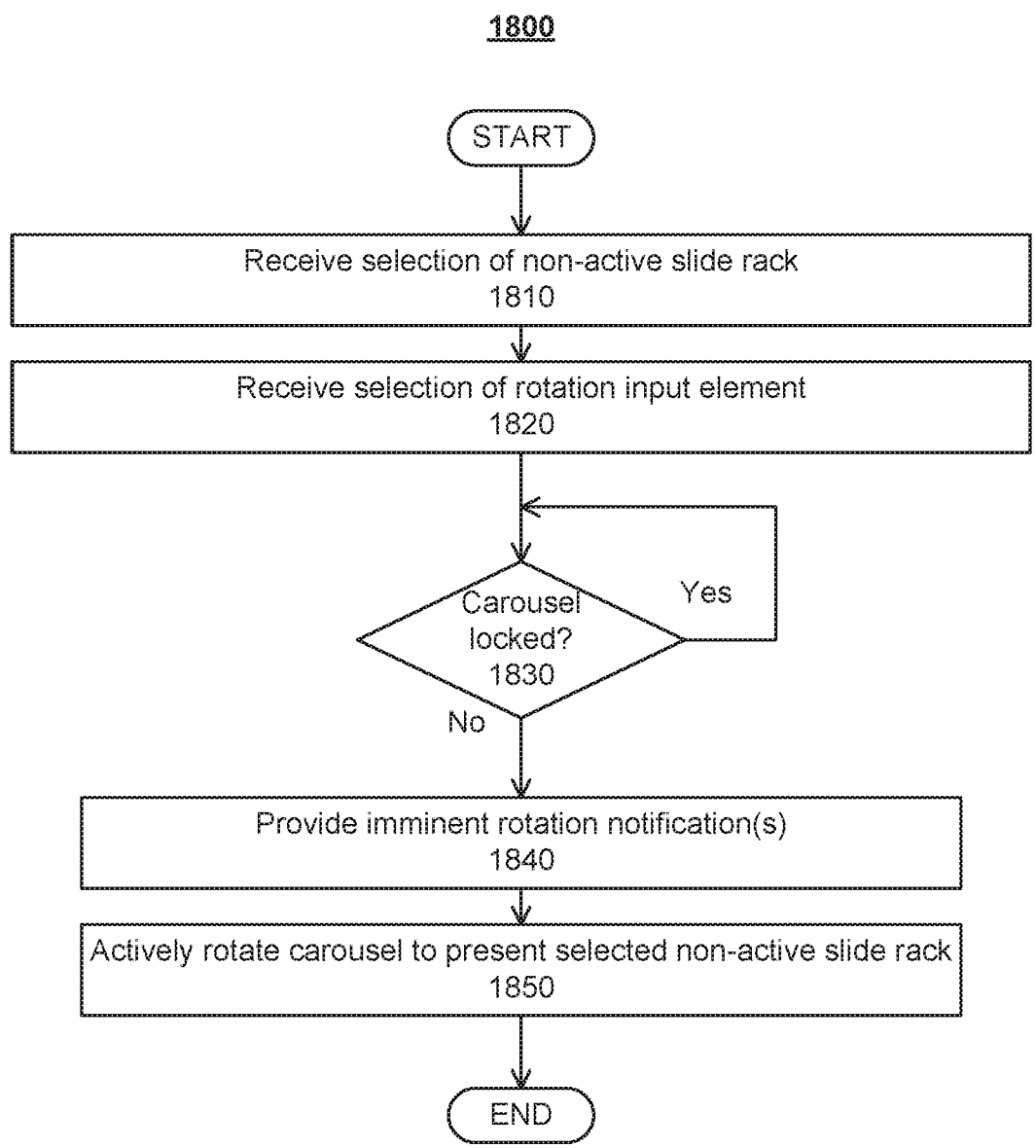
FIG. 18 illustrates a process for active rotation of a non-active slide rack, according to an embodiment.

FIG. 18 illustrates a process 1800 for active rotation of a non-active slide rack 220, according to an embodiment. In step 1810, processor 104 receives the selection of a non-active slide rack 220, for example, via graphical carousel representation 1210 in the graphical user interface of the console of scanning system 100. In step 1820, after a non-active slide rack 220 has been selected, processor 104 receives a further selection of a rotation input element (e.g., rotation icon) within the graphical user interface.

In step 1830, processor 104 determines whether or not carousel 200 is locked. For example, the auto-loader system may automatically lock carousel 200 in certain situations to avoid any damage to components of scanning system 100, glass slides 114, an operator, and/or the like. An example situation would be an instance in which an obstruction has been detected within exposed portion 800, for example, by light curtain 900 or pinch-point sensor 810. If carousel 200 is locked (i.e., "Yes" in step 1830), processor 104 waits until carousel 200 is unlocked. In an embodiment, an operator may be alerted to the obstruction (e.g., via a warning dialog frame in the graphical user interface of the console of scanning; system 100, an audio alert, etc.).

Once carousel is unlocked (i.e., "No" in step 1830), processor 104 provides one or more imminent rotation notifications in step 1840. As described elsewhere herein, the imminent rotation notifications may comprise displaying a rotation icon in place of graphical carousel representation 1210 on the carousel screen of the graphical user interface and/or flashing LEDs 1100, for a predetermined time window (e.g., three seconds) before initiating rotation of carousel 200.

In step 1850, after the predetermined time window has passed, processor 104 initiates the active rotation to rotate the rack slot 208, that is occupied with the non-active slide rack 220 selected in step 1810, into exposed portion 800 (e.g., in the front of scanning system 100). After the active rotation is complete, the operator may reach into exposed portion 800 to extract the selected slide rack 220 from its rack slot 208.

2.6. Error Handling

Error handling for the continuous-load workflow will now be described. The continuous-load error handling may rely on both light curtain 900 that detects objects crossing the boundary between exposed portion 800 and the external environment of scanning system 100, and pinch-point sensor 810 that detects an obstruction at the pinch point between carousel 200 and the frame of scanning system 100 at the ends of exposed portion 800.

2.6.1. Blocked Light Curtain (Carousel at Rest)

Triggering of light curtain 900 (i.e., detection of a disruption between one or more transmitter/receiver pairs 920/925, representing an intrusion into exposed portion 800) while carousel 200 is at rest, may indicate that the operator is interacting with carousel 200. Therefore, it assumed that it is not safe to rotate carousel 200 for as long as light curtain 900 is triggered. If light curtain 900 is triggered over a long period of time, this may indicate that either a slide rack 220 or a glass slide 114 in a slide rack 220 is not properly seated. An improperly seated slide rack 220 or glass slide 114 poses a risk of obstructing the rotation of carousel 200 as it is rotated to the interior of scanning system 100.

In an embodiment, processor 104 utilizes a timer to record how long light curtain 900 is continuously triggered. If light curtain 900 has been triggered beyond a predetermined time threshold, a user event may be set in the rack state to trigger a dialog frame on the graphical user interface of the console of scanning system 100. This dialog frame may indicate (e.g., via text and/or images) that light curtain 900 is obstructed, and that carousel 200 will not rotate until the obstruction is cleared. The dialog frame may remain in the graphical user interface until the obstruction is cleared. Once the obstruction is cleared, processor 104 may clear the dialog frame from the console.

2.6.2. Blocked Light Curtain (Carousel in Motion)

While carousel 200 is in motion, light curtain 900 is utilized as a safety sensor. When light curtain 900 is triggered while carousel 200 is rotating, carousel 200 may gracefully rotate to the next indexed position and then automatically stop the rotation. Once carousel 200 has stopped, the logic for when light curtain 900 is blocked, while the carousel is at rest, may be used, as described above.

2.6.3. Blocked Pinch-Point Sensor (Carousel at Rest)

When carousel 200 is at rest, the triggering of pinch-point sensor 810 does not impact the software state of the control logic for the auto-loader system. Thus, the behavior of the auto-loader system, while pinch-point sensor 810 is triggered and carousel 200 is at rest, may be identical to the behavior of the auto-loader system when light curtain 900 is triggered while carousel 200 is at rest (e.g., displaying a dialog frame in the graphical user interface of the console, to notify the operator of an obstruction, until the obstruction is cleared).

2.6.4. Blocked Pinch-Point Sensor (Carousel in Motion)

Figure 19:
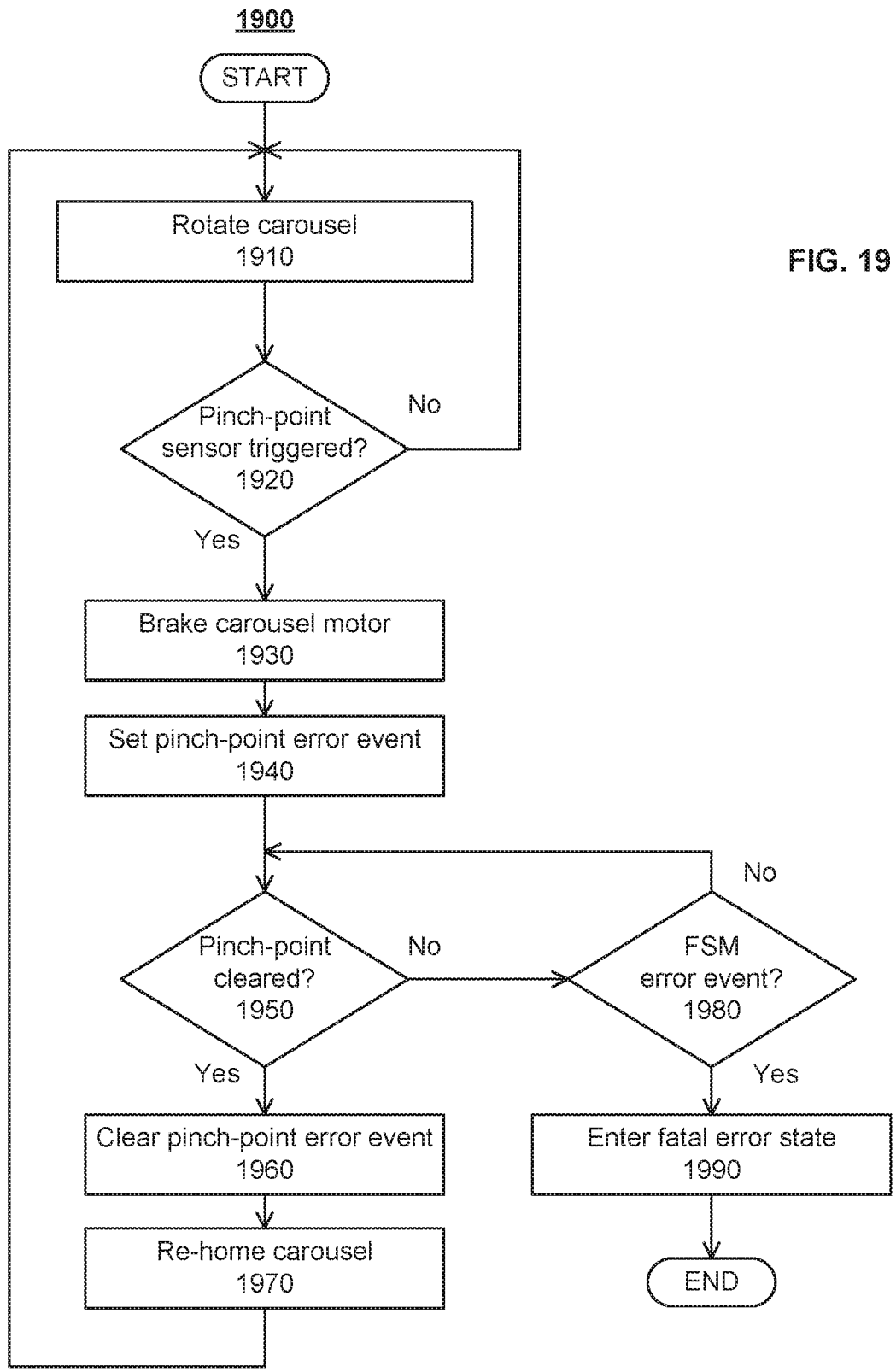
FIG. 19 illustrates a process in which pinch-point sensors are used during motion of a carousel of a scanning system, according to an embodiment.

FIG. 19 illustrates a process 1900 in which pinch-point sensor 810 is used during motion of carousel 200, according to an embodiment. In step 1910, the carousel motor is driven to rotate carousel 200. This may be an automatic rotation or an active rotation, as described elsewhere herein.

During rotation of carousel 200, pinch-point sensor 810 may monitor the pinch points of carousel 200. As long as pinch-point sensor 810 is not triggered (i.e., "No" in step 1920), rotation of carousel 200 may continue. However, if pinch-point sensor 810 is triggered (i.e., "Yes" in step 1920), the carousel motor is immediately braked in step 1930.

While carousel 200 is in motion, triggering of pinch-point sensor 810 indicates a potential safety hazard. In an embodiment, a physical wire is routed between pinch-point sensors 810A and 810B to the brake line for the carousel motor. Thus, activation of pinch-point sensor 810 (i.e., "Yes" in step 1920) will trigger an immediate stop to the carousel motor, and thereby carousel 200, in step 1930, regardless of whether or not carousel 200 is at an indexed position. Since this behavior is controlled by hardware, in such an embodiment, it cannot be adjusted using software.

In step 1940, a pinch-point error event is set. Then, the auto-loader system waits for pinch-point sensor 810 to be cleared in step 1950. If pinch-point sensor 810 is cleared (i.e., "Yes" in step 1950), the pinch-point error event is cleared in step 1960. However, the emergency braking in step 1930 may result in the loss of indexed positioning in the axis of carousel 200. Thus, in step 1970, the homing process, described elsewhere herein (e.g., with respect to process 1300 in FIG. 13), is performed on carousel 200 to re-establish its bearings. Once carousel 200 has been re-homed, rotation may continue in step 1910.

As long as pinch-point sensor 810 is not cleared (i.e., "No" in step 1950), processor 104 may determine whether or not to trigger a fatal error event in step 1980. In an embodiment of step 1980, processor 104 compares the length of time that the pinch-point error event has been continuously set to a threshold time. If the length of tune that the pinch-point error event has been continuously set is less than the threshold time (i.e., "No" in step 1980), processor 104 continues to wait for pinch-point sensor 810 to be cleared. Otherwise, if the length of time that the pinch-point error event has been continuously set exceeds the threshold time (i.e., "Yes" in step 1980), processor 104 triggers a fatal error state in step 1990, since it is unable to continue its workflow.

In an embodiment, if scanning system 100 enters the fatal error state in step 1990, it will remain in this state until the operator clears the obstruction and restarts scanning system 100. In the fatal error state, processor 104 may control all LEDs 1100 to flash in an error color (e.g., red) and display an error frame in the graphical user interface of the console of scanning system 100, to inform an operator of the fatal error.

2.7. Dual State Machine

In an embodiment, a processor 104 of scanning system 100 controls the auto-loader system according to a dual state machine. In other words, control of the auto-loader system is split into two parts: (1) the front-end state machine (FSM) is responsible for the front-end components (e.g., carousel 200) of the auto-loader system with which the user interacts; and (2) the back-end state machine (BSM) is responsible for the back-end components (e.g., push/pull assembly 300) of the auto-loader system that load and unload slide racks 220 from the front-end components and processes slide racks 220 (e.g., load and unload glass slides 114 from slide racks 220 onto and off of stage 112) retrieved from the front-end components. Thus, the front-end state machine may control the motors (e.g., the carousel's drive motor) and sensors (e.g., pinch-point sensor 810, light curtain 900, etc.) described above with respect to carousel 200 and other front-end components of scanning system 100. Similarly, the back-end state machine may control the motors and sensors necessary to load and unload slide racks 220 from carousel 200 and move glass slides 114 between an unloaded slide rack 220 and stage 112, as well as other back-end components.

Figure 20:
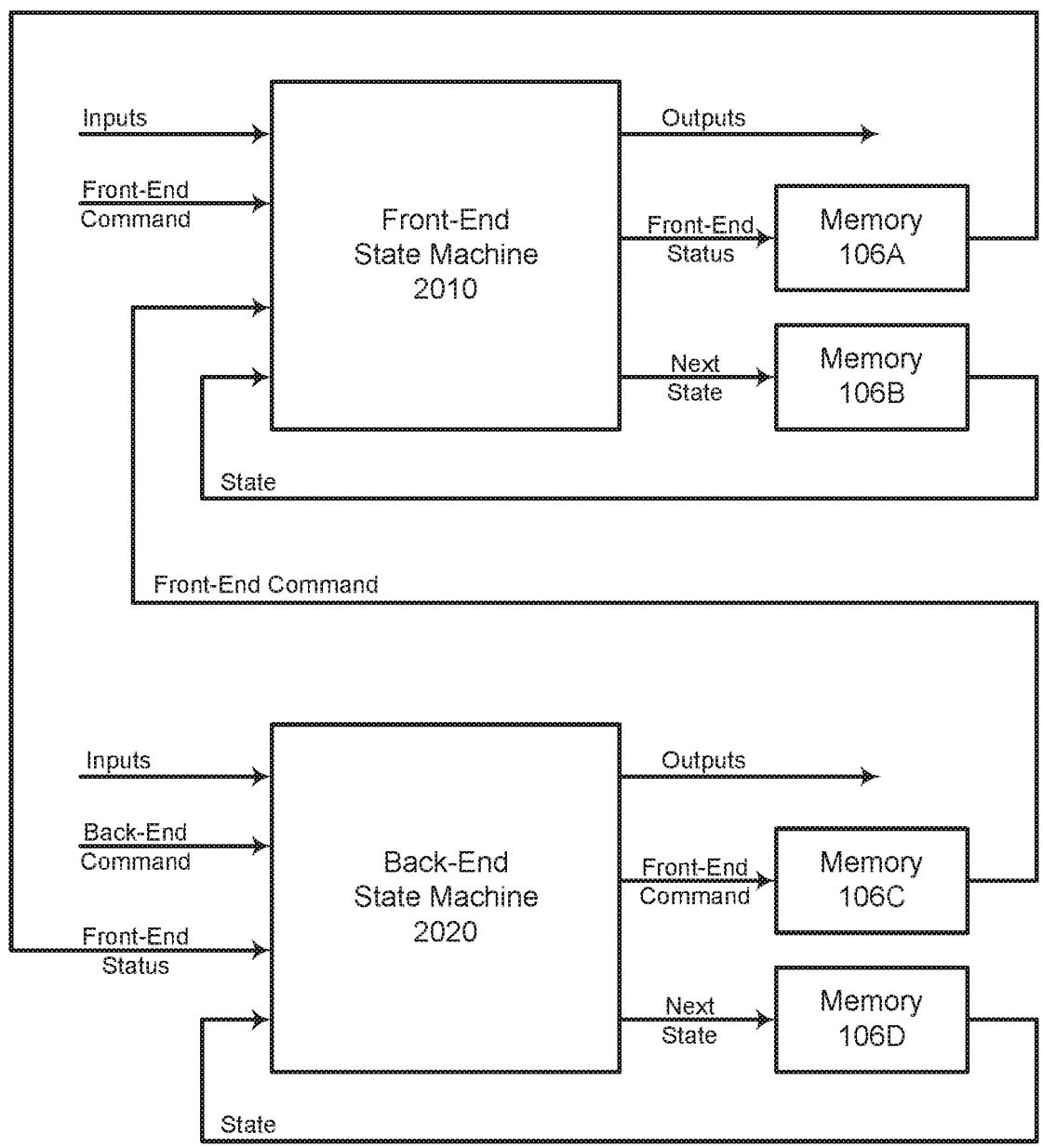
FIG. 20 illustrates the data flow in a dual state machine, according to an embodiment.

FIG. 20 illustrates the data flow in a dual state machine 2000, according to an embodiment. As mentioned above, the dual state machine comprises a front-end state machine 2010 and a back-end state machine 2020. Since both the front-end and the back-end of scanning system 100 operate independently from each other, front-end state machine 2010 and back-end state machine 2020 should be able to operate autonomously. Thus, an operator can interact with the front-end at any time (e.g., to insert or remove slide racks 220, command a specified slide rack 220 to be presented in exposed portion 800 via the graphical user interface, etc.), while the back-end is processing glass slides 114 from a slide rack 220 that has been unloaded from carousel 200.

However, back-end state machine 2020 must be able to issue commands to front-end components and retrieve the status of front-end components, in order to process slide racks 220. Thus, in the illustrated embodiment, there is a communication channel between front-end state machine 2010 and back-end state machine 2020. Specifically, as illustrated, front-end state machine 2010 is configured to provide the front-end status to back-end state machine 2020, and back-end state machine 2020 is configured to issue front-end commands to front-end state machine 2010.

In the illustrated embodiment, front-end state machine 2010 receives inputs from front-end motors (e.g., the carousel's drive motor) and sensors (e.g., pinch-point sensor 810, light curtain 900, etc.), as well as state information. In addition, front-end state machine 2010 is configured to receive front-end commands from both back-end state machine 2020 and the console (e.g., touch panel display that displays the graphical user interface) of scanning system 100. Front-end state machine 2020 may implement a priority and conflict-resolution mechanism in the event that conflicting front-end commands are simultaneously or contemporaneously received from both back-end state machine 2020 and the user interface. The priority and conflict-resolution mechanism may determine the order in which the conflicting front-end commands are processed (or a front-end command to discard), based, for example, on the source of the front-end command and/or the type of front-end command.

From its inputs, front-end state machine 2010 determines a set of outputs to one or more of the front-end components (e.g., the carousel's drive motor) and/or to the console of scanning system 100. In addition, front-end state machine 2010 determines the front-end status and the next state of the front-end. The front-end status and next state may be stored in memory 106 (or, if in hardware, in a D flip-flop). As mentioned above, the front-end status may be communicated to back-end state machine 2020.

Back-end state machine 2020 operates in a similar manner to front-end state machine 2010, receiving inputs from back-end motors and sensors. However, back-end state machine 2020 receives its commands (i.e., back-end commands) from scanning system 100 as appropriate to implement the scanning workflow, and also receives the front-end status from front-end state machine 2010. Back-end state machine 2020 acts upon the front-end status, received from front-end state machine 2010, to output front-end commands which are sent to front-end state machine 2010.

Figure 21:
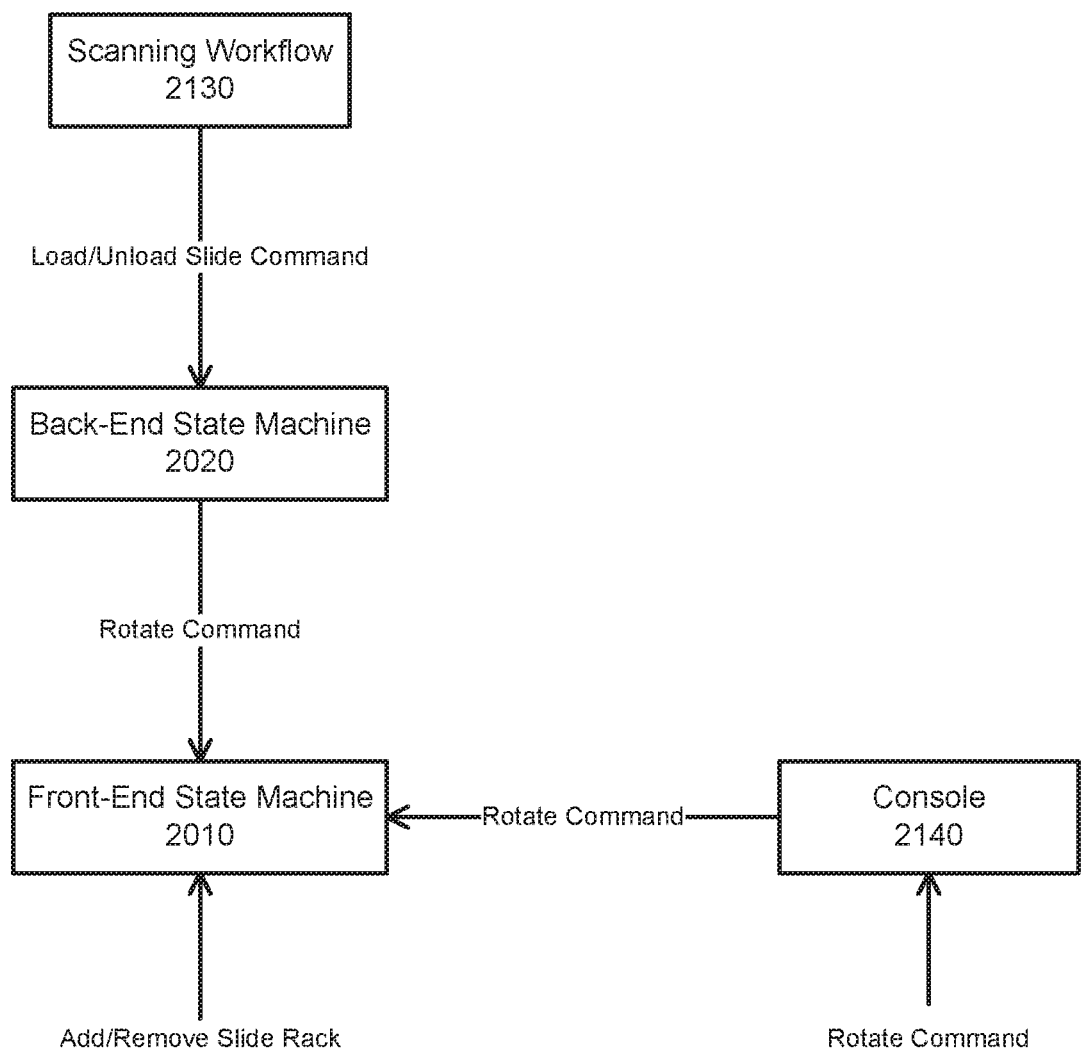
FIG. 21 illustrates an example high-level interaction between a scanning workflow, a console, and an operator, using a dual state machine, according to an embodiment.

FIG. 21 illustrates an example high-level interaction between scanning workflow 2130 (e.g., implemented by processor 104), back-end state machine 2020, front-end state machine 2010, console 2140 (e.g., comprising a touch panel display that displays the graphical user interface) of scanning system 100, and an operator. In the illustrated scenario of the continuous load workflow, it is assumed that scanning workflow 2130 has determined that it must scan a certain glass slide 114. An example set of interactions follows:

(1) Scanning workflow 2130 issues a command to back-end state machine 2020 to load the slide 114 to be scanned, and waits for the command to complete.

(2) If back-end state machine 2020 is currently performing a task, it will complete the task before processing the command from scanning workflow 2130 to load the slide 114 to be scanned. On the other hand, if back-end state machine 2020 is not currently performing a task, it will respond to the command immediately.

(3) Once back-end state machine 2020 reaches a point at which it is necessary to position the front-end (e.g., carousel 200) so that the slide rack 220, housing the slide 114 to be scanned, can be removed from the front-end, it will issue a command to front-end state machine 2010 to perform the necessary positioning, and wait for that command to complete.

(4) If front-end state machine 2010 is currently performing a task based on user interaction, it will wait for that user interaction to complete before responding to the command from back-end state machine 2020. On the other hand, if front-end state machine 2010 is not currently performing a task based on user interaction, it will respond to the command immediately.

(5) Front-end state machine 2010 may temporarily interrupt processing of the command from back-end state machine 2020, if, for example, the operator attempts to remove a slide rack 220 from the front-end while the front-end is moving. However, front-end state machine 2010 will continue processing the command from back-end state machine 2020 once the user interaction completes. Under normal circumstances, front-end state machine 2010 will wait until it has completely processed the command from back-end state machine 2020 before responding to normal user interaction.

(6) Once front-end state machine 2010 has processed the command from back-end state machine 2020, it will communicate the front-end status to back-end state machine 2020 and resume normal operation.
(7) Back-end state machine 2020 will receive this front-end status from front-end state machine 2010 and complete the processing of the command, received from scanning workflow 2130, to load the slide 114 to be scanned.
(8) Once back-end state machine 2020 has completely processed the command, it will communicate this status to scanning workflow 2130.
(9) Scanning workflow 2130 will receive this status update from back-end state machine 2020 and continue processing of the loaded slide 114.

The above description of the disclosed embodiments is provided to enable any person skilled in the art to make or use the invention. Various modifications to these embodiments will be readily apparent to those skilled in the art, and the general principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

Combinations, described herein, such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, and any such combination may contain one or more members of its constituents A, B, and/or C. For example, a combination of A. and B may comprise one A arid multiple B's, multiple A's and one B, or multiple A's and multiple B's.

What is claimed is:

1. A scanning system comprising:
a plurality of front-end components comprising a carousel and a first set of motors and sensors, the carousel comprising a plurality of rack slots configured to receive a plurality of slide racks, wherein a first portion of the carousel is an exposed portion in which a portion of the carousel is accessible from an external environment of the scanning system and a second portion of the carousel is inaccessible from the external environment, wherein each rack slot is associated, or is associable, with a detector that is positioned to determine whether or not the rack slot is occupied by a slide rack;
a plurality of back-end components for processing the slide rack, the plurality of back-end components comprising a second set of motors and sensors to load and unload slide racks from the carousel and move glass slides between an unloaded slide rack and a scanning stage; and
at least one hardware processor configured to:
control the plurality of back-end components according to a back-end state machine and control the plurality of front-end components according to a front-end state machine that operates independently from the back-end state machine,
wherein the front-end state machine is configured to control the first set of motors and sensors and the back-end state machine is configured to control the second set of motors and sensors,
cause movement of each of the front-end components and the back-end components to respective initial zero positions by controlling the respective front-end state machine and back-end state machine,
generate an inventory of all of the slide racks within the plurality of rack slots of the carousel,
determine if any one of the slide racks is unloaded from the carousel to the back-end components based on the inventory,
in response to the one of the slide racks being unloaded from the carousel, return the one of the slide racks to a corresponding one of the rack slots of the carousel by controlling the respective front-end state machine and back-end state machine, and
position the carousel to expose a starting subset of the plurality of rack slots within the first portion of the carousel by controlling the respective front-end state machine and back-end state machine.

2. The scanning system of claim 1, wherein the at least one hardware processor is further configured to:
identify a largest contiguous segment of empty rack slots from the plurality of rack slots, and
select the largest contiguous segment of empty rack slots as part of the starting subset of the plurality of rack slots.

3. The scanning system of claim 2, wherein each of the plurality of rack slots is associated with an index representing its order among the plurality of rack slots, wherein the at least one hardware processor is further configured to:
when there are two or more largest contiguous segments of adjacent empty rack slots, select one of the two or more largest contiguous segments, as the starting subset, based on the indexes associated with the rack slots within the two or more largest contiguous segments.

4. The scanning system of claim 1, further comprising:
a limit switch; and
an encoder configured to govern the positioning of the carousel,
wherein causing movement of each of the front-end components and the back-end components to respective initial zero positions comprises:
triggering a limit switch by rotating the carousel in a first direction;
backing off the limit switch by rotating the carousel in a second direction, opposite the first direction;
triggering the limit switch by rotating the carousel in the first direction; and
zeroing the encoder.

5. The scanning system of claim 1, further comprising:
a scanning stage configured to scan a slide when loaded onto the scanning stage, wherein the at least one hardware processor is further configured to:
control a push-pull assembly to unload the slide from the scanning stage into a corresponding slide slot in the one of the slide racks, prior to returning the one of the slide racks to the corresponding one of the rack slots.

6. The scanning system of claim 1, wherein the at least one hardware processor is further configured to:
   implement a touch sensor to receive a user selection of a slide rack corresponding to one of the plurality of rack slots,
   if the selected slide rack is being processed by the scanning system, interrupt processing of the selected slide rack, and control an assembly to return the selected slide rack into a corresponding one of the rack slots, and
   position the carousel such that the corresponding one of the rack slots is positioned within the first portion of the carousel accessible from the external environment.

7. The scanning system of claim 1, further comprising:
   a plurality of visual indicators that are each associated with one of the plurality of rack slots positioned within the first portion of the carousel accessible from the external environment, each of the plurality of visual indicators associated with a respective light emitting diode,
   wherein the at least one hardware processor is further configured to, for each of the plurality of rack slots positioned within the first portion of the carousel accessible from the external environment:
      detect a status of the rack slot; and
      control the light emitting diode to implement the visual indicator associated with the rack slot to indicate the detected status.

8. The scanning system of claim 1, wherein the at least one hardware processor is further configured to:
   implement a sensor to detect insertion of a slide rack into one of the plurality of rack slots in the first portion of the carousel accessible from the external environment, and
   in response to detecting insertion of the slide rack into the one of the rack slots, update a status of the one of the rack slots to reflect that the one of the rack slots is occupied by the slide rack.

9. The scanning system of claim 1, further comprising:
   a light curtain formed around the first portion of the carousel accessible from the external environment to detect presence of an object,
   wherein the at least one hardware processor is further configured to prevent the rotation of the carousel based on identifying the object by:
      implementing one or more transmitter and receiver pairs to form the light curtain;
      detecting interruption of the light curtain, and
      preventing rotation of the carousel while the interruption of the light curtain is detected.

10. The scanning system of claim 9, wherein the at least one hardware processor is further configured to:
    determine to rotate the carousel,
    in response to determining to rotate the carousel, delay rotation of the carousel for a delay period, and
    in response to an input received via a touch sensor, reset the delay period whenever an interruption of the light curtain is detected.

11. The scanning system of claim 10, further comprising:
    a display,
    wherein the at least one hardware processor is further configured to:
       control the display to indicate a remaining amount of the delay period.

12. The scanning system of claim 1, wherein the at least one hardware processor is further configured to counter potential drift relative to a position of an encoder reported by a drive motor of the carousel by:
    implementing a counter to monitor a rotational distance traveled by the carousel, and
    in response to determining that the rotational distance exceeds a predetermined threshold, performing drift correction for the carousel by breaking from any active rotational operation, and perform a homing process on the carousel to improve accuracy of the encoder.

13. A non-transitory computer-readable medium having instructions stored thereon, wherein the instructions, when executed by at least one hardware processor of a scanning system, cause the scanning system to:
    cause movement of each of a plurality of front-end components and a plurality of back-end components of the scanning system to respective initial zero positions by controlling a respective front-end state machine and back-end state machine, the plurality of front-end components comprising a carousel and a first set of motors and sensors, the carousel comprising a plurality of rack slots configured to receive a plurality of slide racks, wherein a first portion of the carousel is an exposed portion in which a portion of the carousel is accessible from an external environment of the scanning system and a second portion of the carousel is inaccessible from the external environment, and wherein each rack slot is associated, or is associable, with a detector that is positioned to determine whether or not the rack slot is occupied by a slide rack, the plurality of back-end components comprising a second set of motors and sensors to load and unload slide racks from the carousel and move glass slides between an unloaded slide rack and a scanning stage, wherein the front-end state machine operates independently from the back-end state machine;
    generate an inventory of all of the slide racks within the plurality of rack slots of the carousel;
    determine if any one of the slide racks is unloaded from the carousel to the back-end components based on the inventory;
    in response to the one of the slide racks being unloaded from the carousel, return the one of the slide racks to a corresponding one of the rack slots of the carousel by controlling the respective front-end state machine and back-end state machine; and
    position the carousel to expose a starting subset of the plurality of rack slots within the first portion of the carousel by controlling the respective front-end state machine and back-end state machine.

14. The non-transitory computer-readable medium of claim 13, wherein the instructions, when executed by the at least one hardware processor, further cause the system to:
    identify a largest contiguous segment of empty rack slots from the plurality of rack slots, and
    select the largest contiguous segment of empty rack slots as part of the starting subset of the plurality of rack slots.

15. The non-transitory computer-readable medium of claim 14, wherein each of the plurality of rack slots is associated with an index representing its order among the plurality of rack slots, and wherein the instructions, when executed by the at least one hardware processor, further cause the system to:
    when there are two or more largest contiguous segments of adjacent empty rack slots, select one of the two or more largest contiguous segments, as the starting subset, based on the indexes associated with the rack slots within the two or more largest contiguous segments.

16. The non-transitory computer-readable medium of claim 13, wherein the instructions, when executed by the at least one hardware processor, further cause the system to:
control a carousel belt to rotate the carousel in a first direction until a limit switch is triggered;
control a carousel belt to rotate the carousel in a second direction, opposite the first direction, to back off the limit switch;
control a carousel belt to rotate the carousel in the first direction to trigger the limit switch; and
zero at least one position of an encoder.

17. The non-transitory computer-readable medium of claim 13, wherein the instructions, when executed by the at least one hardware processor, further cause the system to:
control a push bar of a push-pull assembly and one or more pull fingers of the push-pull assembly to unload the slide from a scanning stage into a corresponding slide slot in the one of the slide racks, prior to returning the one of the slide racks to the corresponding one of the rack slots.

18. A method for controlling a scanning system, the method comprising:
causing movement of each of a plurality of front-end components and a plurality of back-end components of the scanning system to respective initial zero positions by controlling a respective front-end state machine and back-end state machine, the plurality of front-end components comprising a carousel and a first set of motors and sensors, the carousel comprising a plurality of rack slots configured to receive a plurality of slide racks, wherein a first portion of the carousel is an exposed portion in which a portion of the carousel is accessible from an external environment of the scanning system and a second portion of the carousel is inaccessible from the external environment, and wherein each rack slot is associated, or is associable, with a detector that is positioned to determine whether or not the rack slot is occupied by a slide rack, the plurality of back-end components comprising a second set of motors and sensors to load and unload slide racks from the carousel and move glass slides between an unloaded slide rack and a scanning stage, wherein the front-end state machine operates independently from the back-end state machine;
generating an inventory of all of the slide racks within the plurality of rack slots of the carousel;
determining if any one of the slide racks is unloaded from the carousel to the back-end components based on the inventory;
in response to the one of the slide racks being unloaded from the carousel, returning the one of the slide racks to a corresponding one of the rack slots of the carousel by controlling the respective front-end state machine and back-end state machine; and
positioning the carousel to expose a starting subset of the plurality of rack slots within the first portion of the carousel by controlling the respective front-end state machine and back-end state machine.

19. The method of claim 18, further comprising:
identifying a largest contiguous segment of empty rack slots from the plurality of rack slots, and
selecting the largest contiguous segment of empty rack slots as part of the starting subset of the plurality of rack slots.

20. The method of claim 19, wherein each of the plurality of rack slots is associated with an index representing its order among the plurality of rack slots, and wherein the method comprises:
when there are two or more largest contiguous segments of adjacent empty rack slots, selecting one of the two or more largest contiguous segments, as the starting subset, based on the indexes associated with the rack slots within the two or more largest contiguous segments.

* * * * *